United States Patent
Melamed et al.

(10) Patent No.: US 7,210,105 B2
(45) Date of Patent: Apr. 24, 2007

(54) SYSTEM AND METHOD FOR SYNCHRONIZING SOFTWARE EXECUTION

(75) Inventors: Douglas Melamed, Pflugerville, TX (US); James Grey, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 558 days.

(21) Appl. No.: 09/798,661

(22) Filed: Mar. 2, 2001

(65) Prior Publication Data

US 2002/0122062 A1  Sep. 5, 2002

(51) Int. Cl.
*G06F 3/00* (2006.01)
*G06F 3/048* (2006.01)

(52) U.S. Cl. .................. 715/779; 715/771; 715/810; 715/966; 715/970

(58) Field of Classification Search .......... 345/966, 345/965, 764, 809, 810, 763; 715/771, 779, 715/810, 966, 970, 763; 719/318
See application file for complete search history.

(56) References Cited

U.S. PATENT DOCUMENTS

| | | | |
|---|---|---|---|
| 5,261,097 A | | 11/1993 | Saxon |
| 5,630,136 A | | 5/1997 | Davidson et al. |
| 5,825,361 A | * | 10/1998 | Rubin et al. ............. 345/839 |
| 6,059,842 A | * | 5/2000 | Dumarot et al. .......... 717/153 |
| 6,167,455 A | * | 12/2000 | Friedman et al. ........ 709/320 |
| 6,336,088 B1 | | 1/2002 | Bauman et al. |
| 6,397,378 B1 | | 5/2002 | Grey et al. |
| 6,611,276 B1 | * | 8/2003 | Muratori et al. ......... 345/772 |
| 6,785,893 B2 | * | 8/2004 | Morris et al. ............ 719/318 |

OTHER PUBLICATIONS

"Jaluna". Jaluna SA Dec. 1999: pp. 1 and 2.*
National Instruments Corporation, LabVIEW, "Test Executive Reference Manual," Aug. 1997.
Johnson, Laura, "Test and Measurement—Understanding Test Executives," Webpage www.testandmeasurement.com.content/news/ , Oct. 16, 2000, pp. 1-9.

* cited by examiner

*Primary Examiner*—Raymond J. Bayerl
*Assistant Examiner*—Namitha Pillai
(74) *Attorney, Agent, or Firm*—Meyertons Hood Kivlin Kowert & Goetzel, P.C.; Jeffrey C. Hood; Jason L. Burgess

(57) ABSTRACT

System and method for synchronizing software execution in a computer system. Threads or processes executing in the computer system are synchronized via various types of synchronization objects. User input indicating a desire to specify a synchronization object operation is received, specifying a particular type of synchronization object on which to perform the operation, in response to which a graphical user interface, is displayed which is useable to specify a plurality of synchronization object operations, e.g., that are specific to a specified type of synchronization object. The graphical user interface enables the user to select a desired operation to perform on a synchronization object. The user may also specify additional configuration information for the operation. In response to the specified synchronization object operation, program instructions that are executable to perform the synchronization object operation may be programmatically created, and may subsequently be executed to perform the specified synchronization object operation.

27 Claims, 53 Drawing Sheets

|  | *Enqueue Type (By Value) – Source* | | |
|---|---|---|---|
| *Dequeue Type – Destination* | Simple Type | Structured Type | ActiveX Reference |
| Simple Type | If types match, dequeue copies the data to the location the user specify. If types do not match, dequeue reports a type mismatch error. | Type mismatch error. | Type mismatch error. |
| Structured Type | Type mismatch error. | Replaces the property the user specify as the dequeue location with a copy of the structured value that the queue stores. | Type mismatch error. |
| ActiveX Reference | Type mismatch error. | Stores an ActiveX reference to the structured value that the queue stores. | Copies the ActiveX reference the queue stores to the location the user specify. |

Dequeue Behaviors for Data Enqueued by Value

FIG. 23

| Dequeue Type – Destination | Enqueue Type (By Reference) – Source | | |
|---|---|---|---|
| | Simple Type | Structured Type | ActiveX Reference |
| Simple Type | If types match, dequeue copies the data to the location the user specify. If types do not match, dequeue reports a type mismatch error. | Type mismatch error. | Type mismatch error. |
| Structured Type | Type mismatch error. | Makes a copy of the structured value that the queue stores by reference, and replaces the property the user specify as the dequeue location with that copy. | Type mismatch error. |
| ActiveX Reference | Stores an ActiveX reference to the simple type as it is stored in the queue. | Stores an ActiveX reference to the structured value that the queue stores. | Stores an ActiveX reference to the ActiveX reference that the queue stores. |

Dequeue Behaviors for Data Enqueued by Reference

| | Set or Pulse Data Type (By Value) – Source | | |
|---|---|---|---|
| Storage Type – Destination | Simple Type | Structured Type | ActiveX Reference |
| Simple Type | If the types match, the step copies the data to the location you specify. If the types do not match, the step reports a type mismatch error. | Type mismatch error. | Type mismatch error. |
| Structured Type | Type mismatch error. | Replaces the property you specify as the storage location with a copy of the structured value that the notification stores. | Type mismatch error. |
| ActiveX Reference | Type mismatch error. | Stores an ActiveX reference to the structured value that the notification stores. | Copies the ActiveX reference the notification stores to the location you specify. |

Wait Behaviors for Data Set or Pulsed by Value

FIG. 33

| | Set or Pulse Data Type (By Reference) – Source | | |
|---|---|---|---|
| Storage Type – Destination | Simple Type | Structured Type | ActiveX Reference |
| Simple Type | If the types match, the step copies the data to the location the user specify. If the types do not match, the step reports a type mismatch error. | Type mismatch error. | Type mismatch error. |
| Structured Type | Type mismatch error. | Makes a copy of the structured value the notification stores by reference and replaces the property the user specify as the storage location with the copy. | Type mismatch error. |
| ActiveX Reference | Stores an ActiveX reference to the simple type that the notification stores. | Stores an ActiveX reference to the structured value that the notification stores. | Stores an ActiveX reference to the ActiveX reference that the notification stores. |

Wait Behaviors for Data Set or Pulsed by Reference

SYSTEM AND METHOD FOR SYNCHRONIZING SOFTWARE EXECUTION

FIELD OF THE INVENTION

The present invention relates to the field of synchronizing software execution, e.g., synchronizing threads or processes. One embodiment of the invention also relates to the field of computer-based testing of products or devices.

DESCRIPTION OF THE RELATED ART

In the software arts, when working with multiple threads or processes, the problem of execution synchronization often arises. As used herein, execution synchronization may refer to any of various techniques enabling multiple threads or processes to execute together effectively. For example, one aspect of execution synchronization pertains to coordinating multiple threads or processes to share data or resources. For example, when one thread is writing to a file, other threads may need to be prevented from doing so at the same time in order to prevent data errors in the file. Also, threads may need to be prevented from reading from the file while it is being written to, in order to ensure that partial or incorrect data is not read.

Another aspect of execution synchronization pertains to defining and enforcing a series of operations that must be performed atomically. For example, consider a program where one thread updates a static data structure containing X and Y coordinates for items to be displayed by another thread. If the update thread alters the X coordinate for an item and is preempted before it can change the Y coordinate, the display thread may be scheduled before the Y coordinate is updated, resulting in the item being displayed at the wrong location.

Other aspects of execution synchronization include: forcing a group of threads to wait for each other until proceeding past a specified location; enabling threads to pass data to each other, e.g., so that a consumer thread can use data produced by a producer thread; notifying one or more threads when a particular event or condition occurs; defining and synchronizing a group of threads to execute as a batch; etc.

Various types of "synchronization objects" may be used in synchronizing execution among multiple threads and processes. For example, one type of synchronization object is a mutex. A mutex (short for mutual exclusion) may be used to guarantee exclusive access to a shared resource, typically by controlling access to the resource through "lock" and "unlock" operations. For example, referring to the above example of the update and display threads, to solve this X,Y coordinate update problem, the update thread may lock (acquire) a mutex indicating that the coordinate data structure is in use before performing the update. The update thread may then unlock (release) the mutex after both coordinates have been processed. The display thread must wait for the mutex to be unlocked before updating the display. This technique of waiting for a mutex is often called "blocking" on a mutex because the thread or process is blocked and cannot continue until the mutex is released. Other types of synchronization objects known in the prior art include semaphores and queues.

Programmers often find it difficult to properly implement execution synchronization using synchronization objects. One reason for this is that in the prior art, program instructions for performing execution synchronization are defined by the programmer at the code-level, using either user-defined or operating system-provided synchronization objects. Thus, in the prior art, the programmer is entirely responsible for coding and managing execution synchronization. This responsibility includes: properly releasing synchronization objects; defining and implementing timeout behavior when waiting to acquire a synchronization object; etc. In a complex application, this can require a significant amount of detailed work on the part of the programmer and can be difficult to accomplish.

One common synchronization problem which often occurs when multiple processes or threads execute concurrently is the problem of "deadlock", which can result in an application stalling or freezing. For example, a common scenario is for a thread A to block and wait until a thread B does some work. If thread A owns some resource which thread B requires, then the system comes to a halt because thread B cannot run until thread A releases the resource, but thread A is waiting for thread B to do something. Another deadlock scenario is for a thread to end up waiting for itself, e.g., by attempting to acquire a resource that the thread already owns.

Thus, execution synchronization can be difficult to implement correctly and serious problems can arise when not implemented correctly. Therefore, an improved system and method for synchronizing execution of software activities (i.e., processes or threads) is desired. It would be desirable for the improved system and method to simplify the task of implementing execution synchronization for an application. In particular, it would be desirable to abstract this task above the code-level, so that the programmer can work at a more intuitive level, e.g., using a graphical user interface (GUI). It would also be desirable to automate certain commonly performed aspects of managing execution synchronization. For example, it may be desirable to enable the programmer to specify via a GUI that a thread should automatically release a synchronization object when the thread ends execution. As another example, it may be desirable to enable the programmer to easily specify the timeout behavior for a synchronization operation via a GUI.

Execution synchronization is a common problem in many types of systems and software environments. One class of systems which has heretofore suffered from a lack of ability to manage execution synchronization is the class of computer-based "test executive" systems. In modern testing environments, software referred to as test executive software may be used to control or perform tests. The test executive typically allows the user to organize and execute a sequence of test modules, e.g., via a graphical user interface. For example, a test sequence may comprise a series of steps, wherein each step references a test module, and wherein each test module is executable to perform and/or control a test of one or more units under test (UUTs). Each step may have a parameter or property configuration that affects execution of the step. Test step parameters or properties may affect or control a wide variety of test aspects, such as whether data-logging is enabled for the test step, whether the step is executed in a loop, etc., as well as product-specific test aspects.

Thus, when executed, test modules corresponding to the steps in the test sequence may be operable to perform a desired sequence of tests on the unit under test. For example, various test modules may interact with instruments that measure and/or control the unit under test. For example, in a manufacturing environment, test executive software may be used to test manufactured products or devices, e.g., by executing various test modules that interact with instruments that measure and/or control the products.

Thus, test executive software operates as the control center for an automated test system. More specifically, the test executive allows the user to create, configure, and/or control test sequence execution for various test applications, such as production and manufacturing test applications. Test executive software typically includes various features, such as test sequencing based on pass/fail results, logging of test results, and report generation, among others.

The following comprises a glossary of test executive nomenclature used herein:

Code Module—A program module, such as a Windows Dynamic Link Library (.dll), Java class file, LabVIEW VI (.vi), etc., that contains one or more functions that perform a specific test or other action.

Test Module—A code module that performs a test.

Step—Any action, such as calling a test module or step module to perform a specific test, that the user can include within a sequence of other actions.

Step Module—The code module that a step calls.

Sequence—A series of steps that the user specifies for execution in a particular order. Whether and when a step is executed can depend on the results of previous steps.

Subsequence—A sequence that another sequence calls. The user specifies a subsequence call as a step in the calling sequence.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, or Microsoft Visual C++, in which the user can create test modules and run-time operator interfaces.

Unit Under Test (UUT)—A device or component that is being tested; may include software and/or hardware elements.

In the prior art, test executive software has not provided users with the ability to manage execution synchronization. For example, it would be desirable to enable test executive users to use various synchronization objects. In particular, it may be desirable to enable test executive users to insert various types of "synchronization steps" into a test sequence and configure the steps, so that execution synchronization for a test sequence can be defined and managed at a high level.

SUMMARY OF THE INVENTION

One embodiment of the present invention comprises a system and method for synchronizing software execution in a computer system. Synchronizing software execution may comprise synchronizing the execution of threads and/or processes executing in the computer system. The threads or processes may be synchronized through the use of various types of synchronization objects. In various embodiments, various types of synchronization objects may be supported, such as: mutex synchronization objects, semaphore synchronization objects, rendezvous synchronization objects, queue synchronization objects, notification synchronization objects, and batch synchronization objects. These types of synchronization objects are described in detail below.

In one embodiment of the method, user input indicating a desire to specify a synchronization object operation may be received. This user input may specify a particular type of synchronization object on which to perform the operation. For example, the user may select a "Configure Mutex" menu item. A graphical user interface, e.g., a dialog box or window, may be displayed in response to the user input indicating the desire to specify a synchronization object operation. The graphical user interface may be useable to specify a plurality of synchronization object operations, e.g., a plurality of operations that are specific to a specified type of synchronization object. For example, for a mutex synchronization object, the plurality of operations may comprise a "create" operation for creating a new mutex synchronization object; a "lock" operation for locking an existing mutex synchronization object; an "unlock" operation for unlocking an existing mutex synchronization object; a "get status" operation for obtaining information regarding a mutex synchronization object; etc. As another example, for a queue synchronization object, the plurality of operations may comprise a "create" operation for creating a new queue synchronization object; an "enqueue" operation for adding an element to the queue; a "dequeue" operation for removing an element from the queue; a "flush" operation to flush the queue; a "get status" operation for obtaining information regarding the queue synchronization object; etc.

The graphical user interface may enable the user to select a desired operation to perform on a synchronization object. User input specifying a first synchronization object operation may be received. Depending on which operation is chosen, the user may also specify additional configuration information for the operation. For example, for a mutex lock operation, the user may specify a name of a mutex synchronization object to lock, a desired lifetime for the lock, a timeout value, etc. Exemplary dialog boxes for various types of synchronization object operations are described below.

In response to the specified synchronization object operation, program instructions that are executable to perform the synchronization object operation may be programmatically created. These program instructions may subsequently be executed to perform the specified synchronization object operation. In various embodiments, the steps of creating and executing the program instructions may be performed in any of various ways. These steps may depend on the type of software implementing the method or the context in which the software is used. For example, in one embodiment, an application development environment may implement the method. In this embodiment, the application development environment may provide tools, e.g., dialog boxes such as described above, for simplifying the task of writing program code to perform execution synchronization for a multi-threaded application under development. Thus, in this example, creating the program instructions may comprise automatically including one or more lines of code, e.g., function or method calls, in the user's program, wherein the included code is operable to perform the specified synchronization object. Executing the program instructions may comprise executing the instructions that are created when the included source code is compiled or interpreted.

Any of various other types of software may also implement embodiments of the method. For example, in another embodiment, the method may be implemented in a test executive software application. The method may be employed to enable the user to specify execution synchronization behavior for multiple processes or threads executing to perform tests of one or more units under test.

As described above, test executive software may enable the user to create a test sequence to test a unit under test, wherein the test sequence comprises a plurality of steps. In one embodiment, one or more synchronization steps may be included in the test sequence, in response to user input requesting inclusion of the synchronization steps. Each synchronization step may be configured to perform a synchronization operation, in response to user input specifying the synchronization operation. For example, the user input may be received via a graphical user interface for configuring the synchronization step, similarly as described above. In one embodiment, there may be multiple synchronization step types available for inclusion in a test sequence, wherein each synchronization step type corresponds to a particular type of synchronization object, such as a mutex synchronization object, a semaphore synchronization object, a rendezvous synchronization object, a queue synchronization object, a notification synchronization object, a batch synchronization object, etc. Thus, the synchronization operation specified for a synchronization step may be an operation specific to a particular type of synchronization object. One embodiment of a set of synchronization step types that may be included in a test sequence and their associated synchronization operations is described.

Configuring a synchronization step to perform a synchronization operation may comprise associating program instructions with the synchronization step, such that the program instructions are executable to perform the specified synchronization operation. User input specifying configuration information for each synchronization operation may be received, such as a name of a synchronization object on which to perform the operation or a timeout value for the operation. The configuration information may be used in associating the appropriate program instructions with the synchronization steps.

The test sequence may then be executed, wherein executing the test sequence comprises executing the one or more synchronization steps, i.e., executing the program instructions associated with the one or more synchronization steps in order to perform the specified synchronization operations. The test sequence may be executed multiple times concurrently, e.g., by multiple threads or processes, and the one or more synchronization steps in the test sequence may coordinate the execution of the multiple threads or processes to test a unit under test, according to the synchronization operations specified by the user.

BRIEF DESCRIPTION OF THE DRAWINGS

A better understanding of the present invention can be obtained when the following detailed description of the preferred embodiment is considered in conjunction with the following drawings, in which:

FIGS. 6–53 illustrate exemplary graphical user interfaces for configuring synchronization steps for a test sequence.

Figure 1:
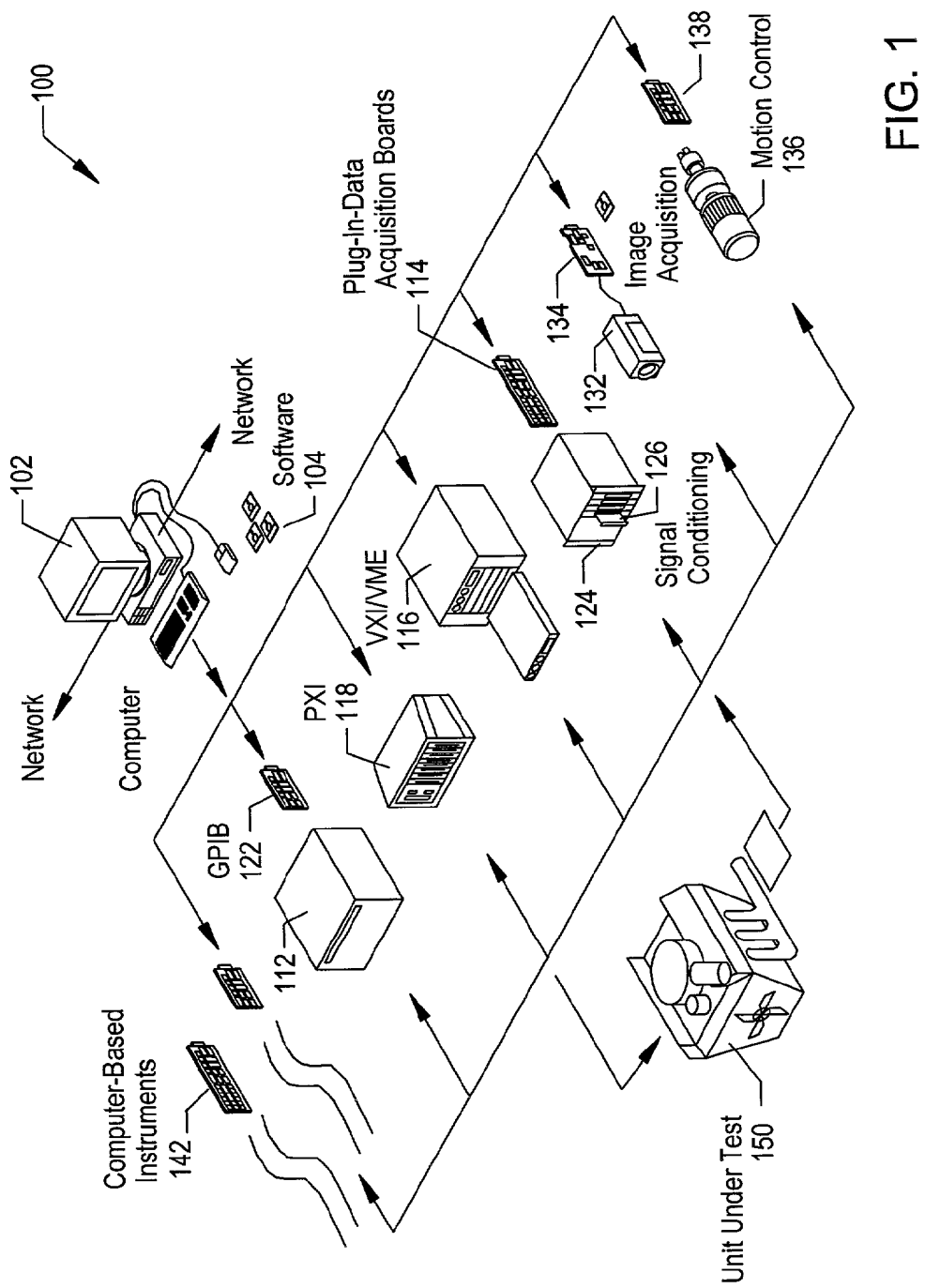
FIG. 1 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999, issued as U.S. Pat. No. 6,401,220.

FIG. 1—Instrumentation System

FIG. 1 illustrates an exemplary instrumentation control system 100. The system 100 comprises a host computer 102 which connects to one or more instruments. The host computer 102 comprises a CPU, a display screen, memory, and one or more input devices such as a mouse or keyboard as shown. The computer 102 may connect through the one or more instruments to analyze, measure or control a unit under test (UUT) or process 150. For example, the computer 102 may include a test executive application for performing automated tests of the unit under test. It is noted that FIG. 1 is exemplary only, and various embodiments of the present invention may be used in any of various systems, as desired.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via a GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 is coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 preferably includes a memory medium on which one or more computer programs according to the present invention are stored. The memory medium may store software operable to receive user input specifying synchronization object operations via a graphical user interface and operable to programmatically create program instructions in response to the user input, wherein the program instructions are executable to perform the specified synchronization object operations. In one embodiment, the memory medium may store test executive software for creating and/or controlling an automated test system. The test executive software may allow the user to create, configure, and/or control test sequence execution for various test applications, such as production and manufacturing test applications. As described below, the test executive software may provide support for including various synchronization steps in a test sequence, wherein the synchronization steps perform synchronization object operations specified by the user when the test sequence is executed.

The term "memory medium" is intended to include an installation media, e.g., a CD-ROM, or floppy disks 104, a computer system memory such as DRAM, SRAM, EDO RAM, etc., or a non-volatile memory such as a magnetic medium, e.g., a hard drive, or optical storage. The host computer CPU executing code and data from the memory medium may comprise a means for receiving user input specifying synchronization object operations and creating program instructions executable to perform the specified synchronization object operations according to the methods described below.

Figure 2:
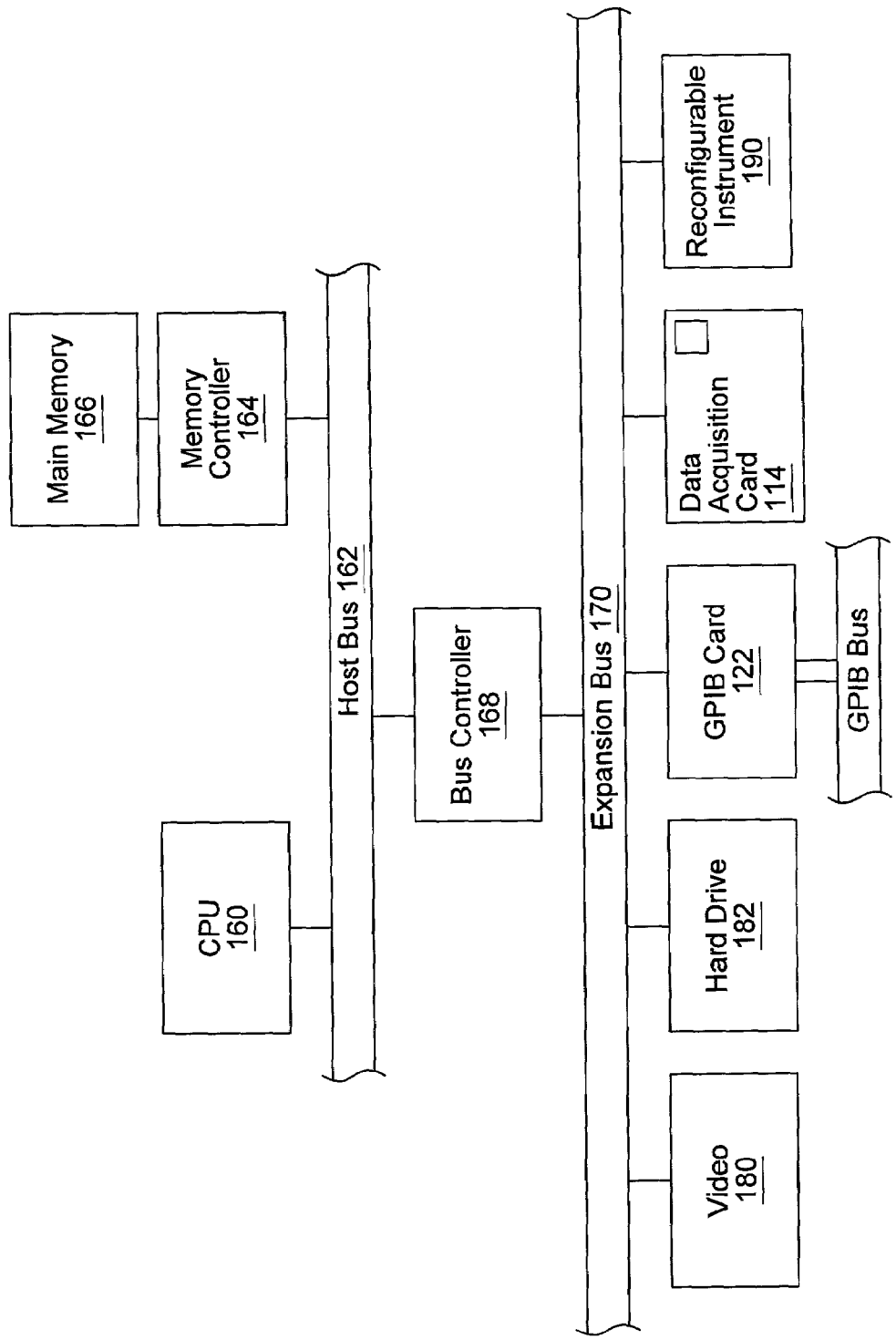
FIG. 2 is a block diagram of the computer system of FIG. 1.

FIG. 2—Computer System Block Diagram

FIG. 2 is a block diagram of the computer system illustrated in FIG. 1. It is noted that any type of computer system configuration or architecture can be used as desired, and FIG. 2 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention. The main memory 166 may also store operating system software as well as other software for operation of the computer system, as well known to those skilled in the art. The operation of computer programs stored in the main memory 166 is discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1) and a GPIB interface card 122 which provides a GPIB bus interface to the GPIB instrument 112 (of FIG. 1). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. Program instructions may be downloaded and executed on the reconfigurable instrument 190. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 1.

Figure 3:
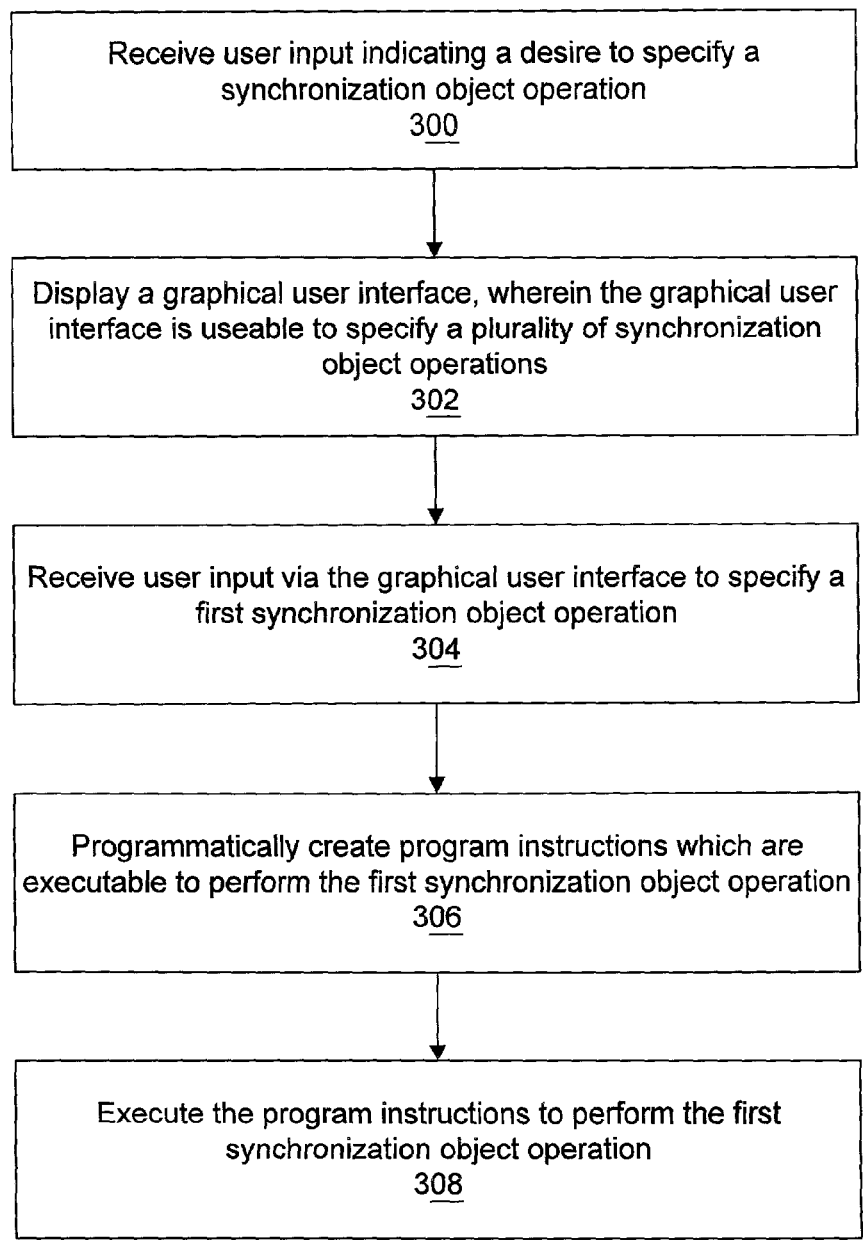
FIG. 3 is a flowchart diagram illustrating one embodiment of a method for synchronizing software execution in a computer system.

FIG. 3—Method for Synchronizing Software Execution

FIG. 3 is a flowchart diagram illustrating one embodiment of a method for synchronizing software execution in a computer system, such as the computer system described above with reference to FIGS. 1 and 2. Synchronizing software execution may comprise synchronizing the execution of threads and/or processes executing in the computer system. The threads or processes may be synchronized through the use of various types of synchronization objects. In various embodiments, various types of synchronization objects may be supported, such as: mutex synchronization objects, semaphore synchronization objects, rendezvous synchronization objects, queue synchronization objects, notification synchronization objects, and batch synchronization objects. These types of synchronization objects are described in detail below.

In step 300, user input indicating a desire to specify a synchronization object operation may be received. This user input may specify a particular type of synchronization object on which to perform the operation. For example, the user may select a "Configure Mutex" menu item.

In step 302, a graphical user interface, e.g., a dialog box or window, may be displayed in response to the user input indicating the desire to specify a synchronization object operation. The graphical user interface may be useable to specify a plurality of synchronization object operations, e.g., a plurality of operations that are specific to a type of synchronization object specified in step 300. For example, for a mutex synchronization object, the plurality of operations may comprise a "create" operation for creating a new mutex synchronization object; a "lock" operation for locking an existing mutex synchronization object; an "unlock" operation for unlocking an existing mutex synchronization object; a "get status" operation for obtaining information regarding a mutex synchronization object; etc. As another example, for a queue synchronization object, the plurality of operations may comprise a "create" operation for creating a new queue synchronization object; an "enqueue" operation for adding an element to the queue; a "dequeue" operation for removing an element from the queue; a "flush" operation to flush the queue; a "get status" operation for obtaining information regarding the queue synchronization object; etc.

The graphical user interface may enable the user to select a desired operation to perform on a synchronization object. In step 304, user input specifying a first synchronization object operation may be received. Depending on which operation is chosen, the user may also specify additional configuration information for the operation. For example, for a mutex lock operation, the user may specify a name of a mutex synchronization object to lock, a desired lifetime for the lock, a timeout value, etc. Exemplary dialog boxes for various types of synchronization objects and synchronization object operations are described below.

In step 306, program instructions that are executable to perform the synchronization object operation specified in step 304 may be programmatically created. In step 308, these program instructions may be executed to perform the specified synchronization object operation. In various embodiments, steps 306 and 308 may be performed in any of various ways. These steps may depend on the type of software implementing the method or the context in which the software is used. For example, in one embodiment, an application development environment may implement the method of FIG. 3. In this embodiment, the application development environment may provide tools, e.g., dialog boxes such as described above, for simplifying the task of writing program code to perform execution synchronization for a multi-threaded application under development. Thus, in this example, step 306 may comprise automatically including one or more lines of source code, e.g., function or method calls, in the user's program, wherein the included source code is operable to perform the specified synchronization object operation. Step 308 may comprise executing the instructions that are created when the included source code is compiled or interpreted.

Any of various other types of software may also implement embodiments of the method of FIG. 3. For example, in another embodiment, the method may be implemented in a test executive software application. As described below, the method may be employed to enable the user to specify execution synchronization behavior for multiple processes or threads executing to perform tests of one or more units under test.

Test Executive Software Components

Figure 4:
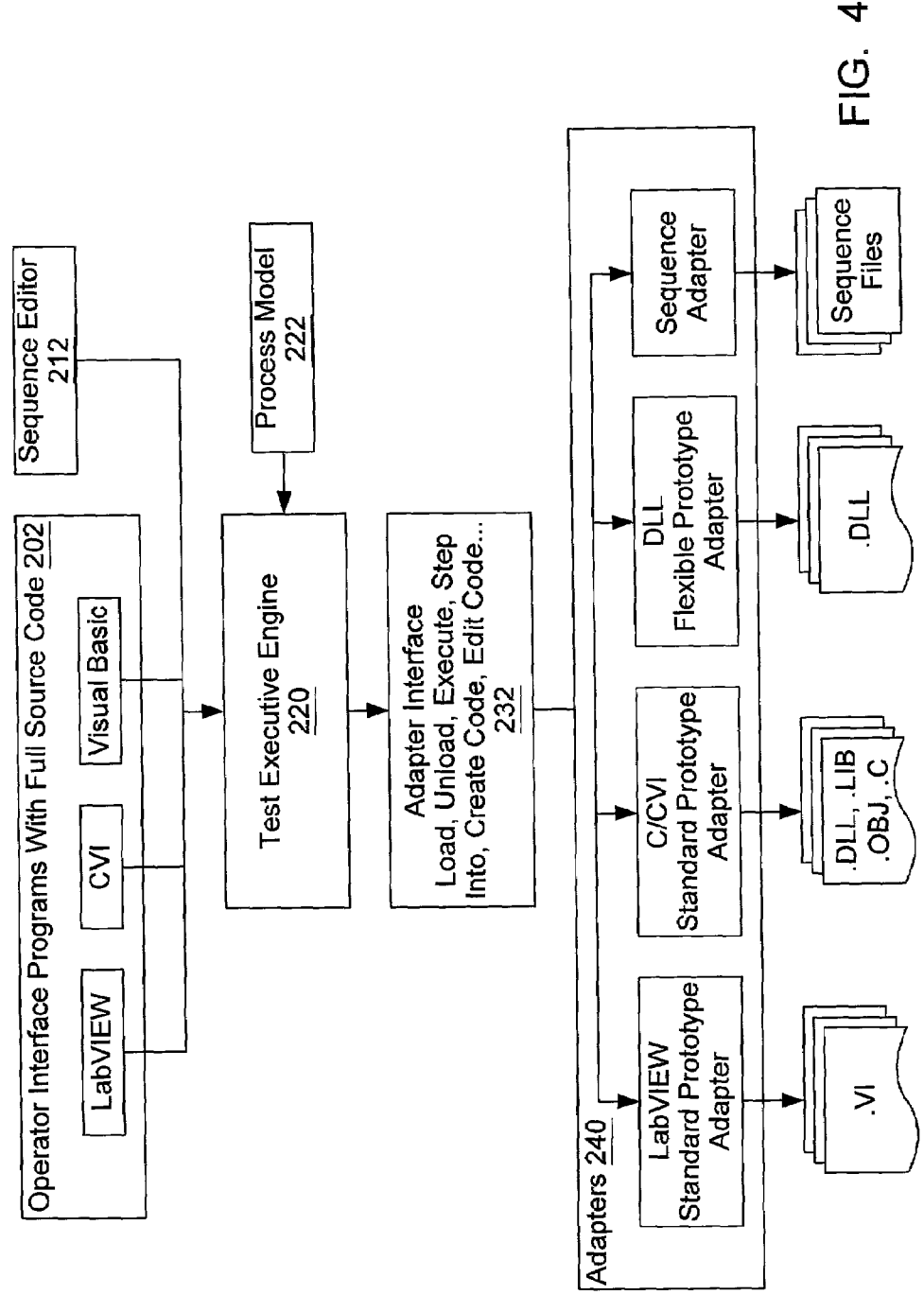
FIG. 4 illustrates a test executive application software architecture according to one embodiment of the present invention.

FIG. 4 is a block diagram illustrating high-level architectural relationships between elements of one embodiment of a test executive software application. It is noted that FIG. 4 is exemplary, and the present invention may be utilized in conjunction with any of various test executive software applications. In one embodiment, the elements of FIG. 4 are comprised in the TestStand test executive product from National Instruments. As shown, the test executive software of FIG. 4 includes operator interface programs 202 for interfacing to various software programs. The operator interface programs 202 shown in FIG. 4 are for interfacing to the LabVIEW, LabWindows CVI, and Visual Basic programs. However, additional operator interface programs 202 may be included for interfacing to other programs.

The test executive software of FIG. 4 also includes a sequence editor 212 for editing test sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 4 include the LabVIEW standard prototype adapter, the C/CVI prototype adapter, the DLL flexible prototype adapter, and the sequence adapter. The LabVIEW standard prototype adapter interfaces to programs having a VI extension, i.e., LabVIEW graphical programs. The C/CVI prototype adapter interfaces to programs having a .dll, lib, .obj, or .c extension. The DLL flexible prototype adapter interfaces to programs having a .dll extension. The sequence adapter interfaces to sequence file programs.

As shown in FIG. 4, the test executive engine 220 plays a pivotal role in the test executive architecture. The test executive engine 220 runs test sequences. Sequences comprise steps that can call external code modules. By using module adapters 240 that have the standard adapter interface 232, the test executive engine 220 can load and execute different types of code modules. Test executive sequences can call subsequences through the common adapter interface 232. The test executive may use a special type of sequence called a process model to direct the high-level sequence flow. The test executive engine 220 exports an ActiveX Automation API used by the sequence editor 212 and run-time operator interfaces 202.

Test Executive Sequence Editor

The sequence editor 212 is an application program in which the user creates, modifies, and debugs sequences. The sequence editor 212 provides the user easy access to the test executive features, such as step types and process models. The sequence editor 212 may include debugging tools found in application development environments such as Lab-VIEW, LabWindows/CVI, and Microsoft Visual C/C++. These may include features such as breakpoints, single stepping, stepping into or over function calls, tracing, a variable display, and a watch window.

In one embodiment, in the sequence editor 212, the user may start multiple concurrent executions. Multiple instances of the same sequence can be executed, and different sequences can be executed at the same time. Each execution instance has its own execution window. In trace mode, the execution window displays the steps in the currently executing sequence. When execution is suspended, the execution window may displays the next step to execute and provide single-stepping options. As described below, the user may utilize the sequence editor 212 to interactively create a test sequence which includes various synchronization steps to coordinate multiple concurrent executions of the sequence.

Test Executive Engine

The test executive engine 220 may be used for creating, editing, executing, and debugging sequences. The test executive engine 220 may also provide an application programming interface (API) that enables another program to interface with the test executive engine 220 in order to perform these actions. In one embodiment, the test executive engine 220 comprises a set of DLLs that export an object-based or component-based API, preferably an ActiveX Automation API. The sequence editor 212 and run-time operator interfaces 202 may use the Test Executive Engine API (Engine API). In one embodiment, the Engine API may be called from any programming environment that supports access to ActiveX Automation servers. Thus, the Engine API may be called from test modules, including test modules that are written in LabVIEW and LabWindows/CVI, Visual C++, etc.

Figure 5:
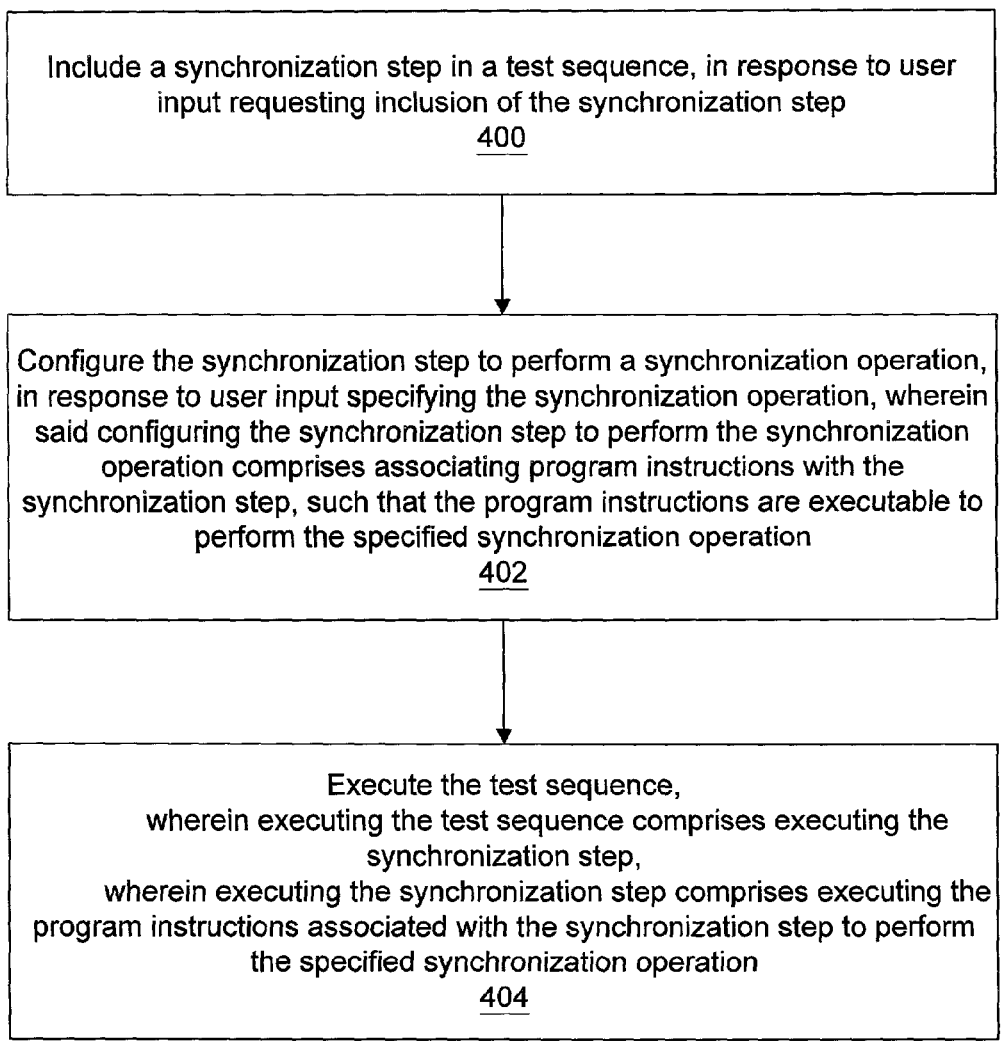
FIG. 5 is a flowchart diagram illustrating one embodiment of a method for synchronizing multiple concurrent executions of a test sequence.

FIG. 5—Method for Synchronizing Multiple Concurrent Test Sequence Executions

FIG. 5 is a flowchart diagram illustrating one embodiment of a method for synchronizing multiple concurrent executions of a test sequence. In step 400, a synchronization step may be included in a test sequence, in response to user input requesting inclusion of the synchronization step.

In step 402, the synchronization step may be configured to perform a synchronization operation, in response to user input specifying the synchronization operation, wherein said configuring the synchronization step to perform the synchronization operation comprises associating program instructions with the synchronization step, such that the program instructions are executable to perform the specified synchronization operation.

In step 404, the test sequence may be executed, wherein said executing the test sequence comprises executing the synchronization step, wherein said executing the synchronization step comprises executing the program instructions associated with the synchronization step to perform the specified synchronization operation.

The sections below describe one embodiment of a set of synchronization step types that may be included in a test sequence and their associated synchronization operations.

Synchronization Step Types

This section describes step types used to synchronize, pass data between, and perform other operations in multiple threads of an execution or multiple running executions in the same process. The user may configure these synchronization steps using dialog boxes. In the preferred embodiment, the user is not required to write code modules for synchronization steps.

Synchronization Objects

Synchronization step types may create and/or control a particular type of synchronization object. In one embodiment, the types of synchronization objects include:

Mutex—A mutex may be used to guarantee exclusive access to a resource. For example, if several execution threads write to a device that does not have a thread-safe driver, the user can use a mutex to make sure that only one thread accesses the device at a time.

Semaphore—A semaphore may be used to limit access to a resource to a specific number of threads. A semaphore is similar to a mutex, except that it restricts access to the number of threads that the user specifies rather than just one thread. For example, the user can use a semaphore to restrict access to a communications channel to a limited number of threads so that each thread has sufficient bandwidth.

Rendezvous—A rendezvous may be used to make a specific number of threads wait for each other before they proceed past a location the user specifies. For example, if different threads configure different aspects of a testing environment, the user can use a rendezvous to ensure that none of the threads proceeds beyond the configuration process until all threads have completed their configuration tasks.

Queue—A queue may be used to pass data from a thread that produces it to a thread that processes it. For example, a thread that performs tests asynchronously with respect to the main sequence might use a queue to receive commands from the main sequence.

Notification—A notification may be used to notify one or more threads when a particular event or condition occurs. For example, if a dialog box is displayed by a separate thread, a notification can be used to signal another thread when the user dismisses the dialog.

Batch—A batch may be used to define and synchronize a group of threads. This is useful when the user wants to test a group of units-under-test (UUTs) simultaneously. Each UUT may be tested in a separate thread, and the user may use a Batch Specification step to include the UUT threads in one batch. The user may use a Batch Synchronization step to control the interaction of the UUT threads as they execute the test steps. More specifically, the user may place Batch Synchronization steps around one or more test steps to create a "synchronized section". The user can configure a synchronized section so that only one UUT enters the section at a time, no UUTs enter the section until all are ready, and/or no UUTs proceed beyond the section until all are done. This is useful for example when, for a particular test, the user has only one test resource which must be applied to each UUT in turn. The user can also configure a synchronized section to guarantee that only one thread executes the steps in the section. This is useful for an action that applies to the entire batch, such as raising the temperature in an environmental chamber. Having a separate thread for each UUT allows the user to exploit parallelism where the user can, while enforcing serialization when necessary. It also allows the user to use preconditions and other branching options so that each UUT has its own flow of execution.

In one embodiment, the user does not have to create a batch. For example, within the TestStand test executive environment, the TestStand Batch process model does this for the user. The model uses Batch Specification steps to group TestSocket execution threads together so that the user can use Batch Synchronization steps to synchronize them in the user sequence file. If the user wants to create a synchronized section around a single step, the user can do so using the Synchronization tab of the Step Properties dialog box rather than by using explicit Batch Synchronization steps. For more information on the TestStand Batch process model, please refer to the Batch Process Model section of the Process Models chapter of the TestStand product documentation, available from National Instruments Corporation.

Common Attributes of Synchronization Objects

Synchronization objects may share various common attributes. In one embodiment, the user may specify the following attributes in the step type configuration dialog box for each synchronization object:

Name—When the user creates a synchronization object, the user can specify a unique name with a string literal or an expression that evaluates to a string. If an object with the same name and type already exists, the user can create a reference to the existing object. Otherwise the user may create a reference to a new synchronization object. By creating a reference to an existing object, the user can access the same synchronization object from multiple threads or executions.

In one embodiment, if the user specifies an empty string as the name for a synchronization object, then an unnamed synchronization object may be created that the user can access through an ActiveX reference variable. To associate an unnamed synchronization object with an ActiveX reference variable, the user may select an object lifetime of "Using ActiveX Reference". To access a synchronization object across threads without creating a reference in each thread, the user may store a reference to the synchronization object in an ActiveX reference variable and access the object from multiple threads using the variable.

In one embodiment, by default, a synchronization object is accessible only from the process in which the user creates it. However, in one embodiment the user can make a synchronization object accessible from other processes, such as multiple instances of an operator interface, by using an asterisk (*) as the first character in the name. In addition, the user can create a synchronization object on a specific machine by beginning the name with the machine name, such as "\\machinename\syncobjectname". The user can then use this name to access the synchronization object from any machine on the network. For example, the user may set up the TestStand test executive engine as a server for remote execution, e.g., through DCOM.

Lifetime—The user may specify a lifetime for each reference to a synchronization object, such that the object exists for at least as long as the reference exists. The object can, however, exist longer if another reference to the object has a different lifetime.

In one embodiment, the reference lifetime choices are "Same as Thread", "Same as Sequence", or "Using ActiveX Reference". If the user refers to the synchronization object only by name, then the user may set its reference lifetime to "Same as Thread" or "Same as Sequence". This guarantees that the object lives as long as the thread or sequence in which the user creates the reference. If the user wants to control the lifetime of the object reference explicitly, or if the user wishes to refer to the object using an ActiveX reference variable, the user may choose the "Using ActiveX Reference" option. The user can use the ActiveX reference to the object in place of its name when performing operations on the object. The user can also use the reference from other threads without performing a Create operation in each thread. An ActiveX reference releases its object when the user sets the variable equal to Nothing, reuses the variable to store a different reference, or the variable goes out of scope. When the last ActiveX reference to a synchronization object releases, the object may be automatically disposed of.

Some synchronization objects have an operation, such as Lock or Acquire, for which the user can specify a lifetime that determines the duration of the operation.

Timeout—Most of the synchronization objects can perform one or more operations that timeout if they do not complete within the time interval the user specifies. The user can specify to treat a timeout as an error condition or the user can explicitly check for the occurrence of a timeout by checking the value of the Step.Result.TimeoutOccurred property.

Synchronization Step Types

In the preferred embodiment, for each type of synchronization object, a corresponding step type is provided to create and/or control objects of that synchronization object type. For the batch synchronization object, there are two step types, Batch Specification and Batch Synchronization. For other synchronization objects, the name of the step type is the same as the name of the synchronization object type the step type controls. Also, in various embodiments there may be additional synchronization step types. For example, the following two synchronization step types may be provided:

Wait—A Wait step may be used to wait for an execution or thread to complete or for a time interval to elapse.

Thread Priority—A Thread Priority step may be used to adjust the operating system priority of a thread.

To use any synchronization step type, the user may insert a step of that type and may configure the step, e.g., using a dialog box or wizard. For example, the user may select a "Configure" item from a context menu for the step to display a configuration dialog box. In the configuration dialog box, the user may select an operation for the step to perform. The user can then specify settings for the selected operation. Some operations may store output values to variables the user specifies. If the control for an output value is labeled as an optional output, the user can leave the control empty.

Configuring Synchronization Steps

The following sections describe the functionality, the configuration dialog box, and the custom properties of various synchronization step types.

Mutex Step Type

Mutex steps may be used to ensure that only one thread can access a particular resource or data item at a time. For example, if the value of a global variable is examined and updated from multiple threads or executions, the user can use a mutex to ensure that only one thread examines and updates the global variable at a time. If multiple threads are waiting to lock a mutex, they preferably do so in first in first out (FIFO) order as the mutex becomes available.

In one embodiment, a thread can lock the same mutex an unlimited number of times without unlocking it. To release the mutex, the thread may balance each lock operation with an unlock operation.

Create Operation

Figure 6:
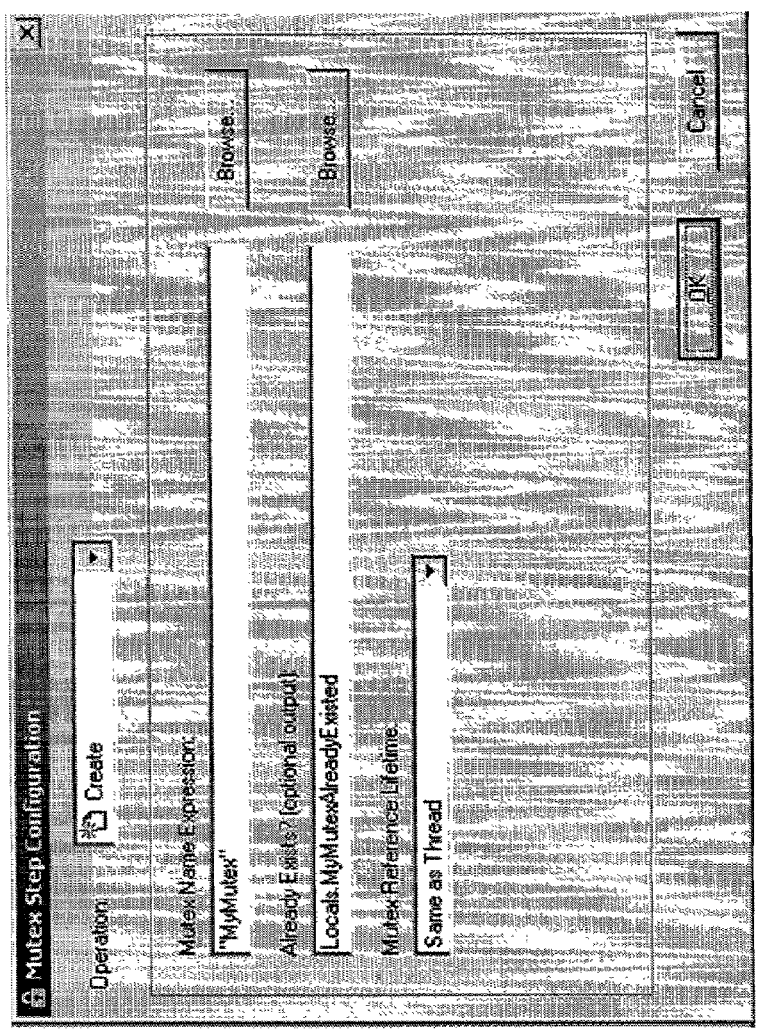

To use a mutex, the user may first create a reference to a new or existing mutex object. For example, to create a mutex reference, the user may insert a Mutex step. The user may then configure the Mutex step, e.g., by selecting a "Configure Mutex" item from a context menu for the step. FIG. 6 illustrates an exemplary dialog box for configuring a Mutex step, in which a "Create" option has been selected for the operation. The following GUI controls enable the user to configure the Create operation:

Mutex Name Expression—This control may be used to specify a name for the synchronization object using a string literal or an expression that evaluates to a string. Synchronization object names are described in more detail above.

Already Exists—This control may be used to specify a location to store a Boolean value that indicates whether the synchronization object already exists.

Mutex Reference Lifetime—This control may be used to specify a lifetime for the reference to the synchronization object.

Lock Operation

Figure 7:
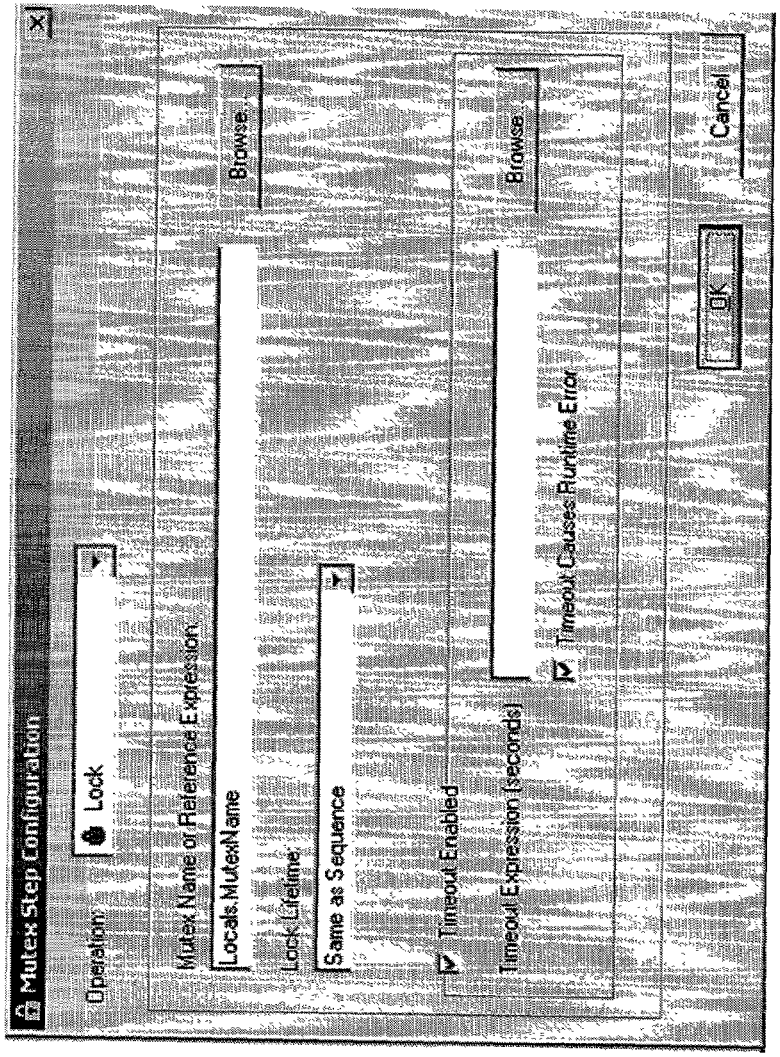

To use a mutex to guarantee that only one thread executes certain steps at a time, the user may insert a Mutex step before the steps the user want to protect and configure the Mutex step to perform a Lock operation. FIG. 7 illustrates an exemplary dialog box for configuring a Mutex step, in which a "Lock" option has been selected for the operation. The following GUI controls enable the user to configure the Lock operation:

Mutex Name or Reference Expression—This control may be used to specify the mutex on which to perform the operation. The user can specify the mutex by name or by an ActiveX reference received when the mutex is created with the Using ActiveX Reference lifetime option.

Lock Lifetime—This control may be used to specify how long the user wants the thread to hold the lock. Synchronization object lifetime settings are described in more detail above. Once the lifetime of the last lock for the owning thread ends, the mutex again becomes available for a thread to lock.

Timeout Enabled, Timeout Expression, Timeout Causes Run-Time Error—These controls may be used to specify the timeout behavior when waiting to acquire the Lock. If a timeout occurs, the property Step.Result.TimeoutOccurred is set to True.

Early Unlock Operation

Figure 8:
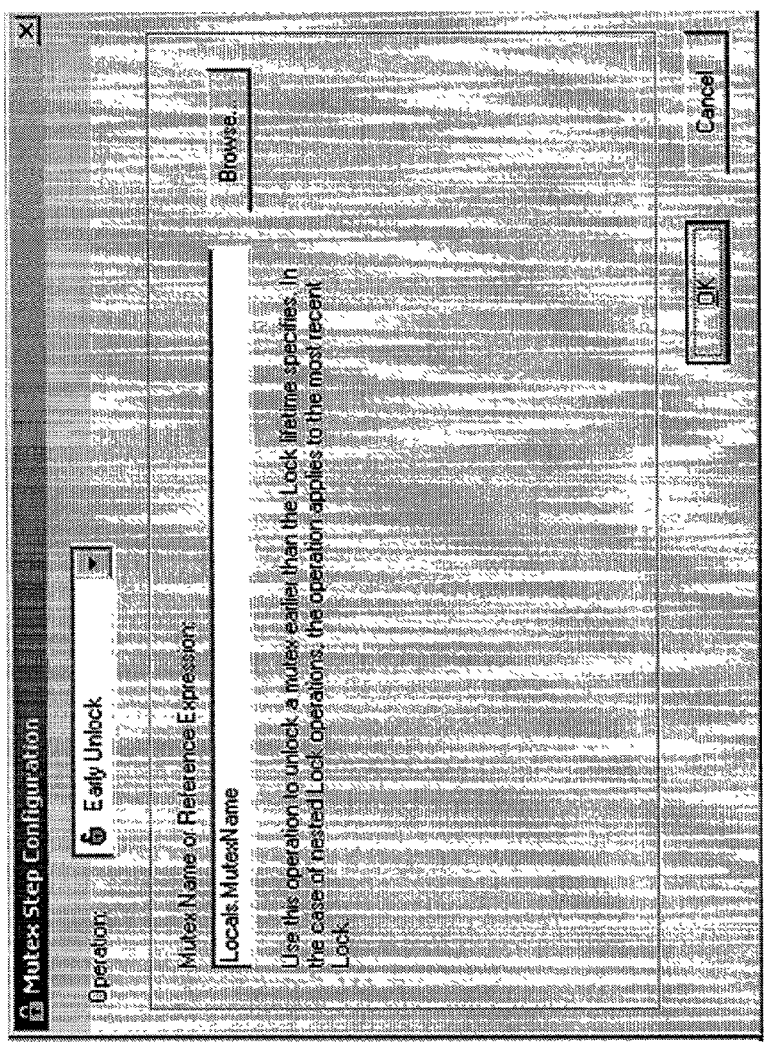

To release the lock before the lock lifetime expires, the user may insert a Mutex step and configure the Mutex step to perform an Early Unlock operation. FIG. 8 illustrates an exemplary dialog box for configuring a Mutex step, in which an "Early Unlock" option has been selected for the operation. The following GUI control enables the user to configure the Early Unlock operation:

Mutex Name or Reference Expression—This control may be used to specify the mutex on which to perform the Early Unlock operation. The user can specify the mutex by name or by an ActiveX reference received when the mutex is created with the Using ActiveX Reference lifetime option.

Get Status Operation

Figure 9:
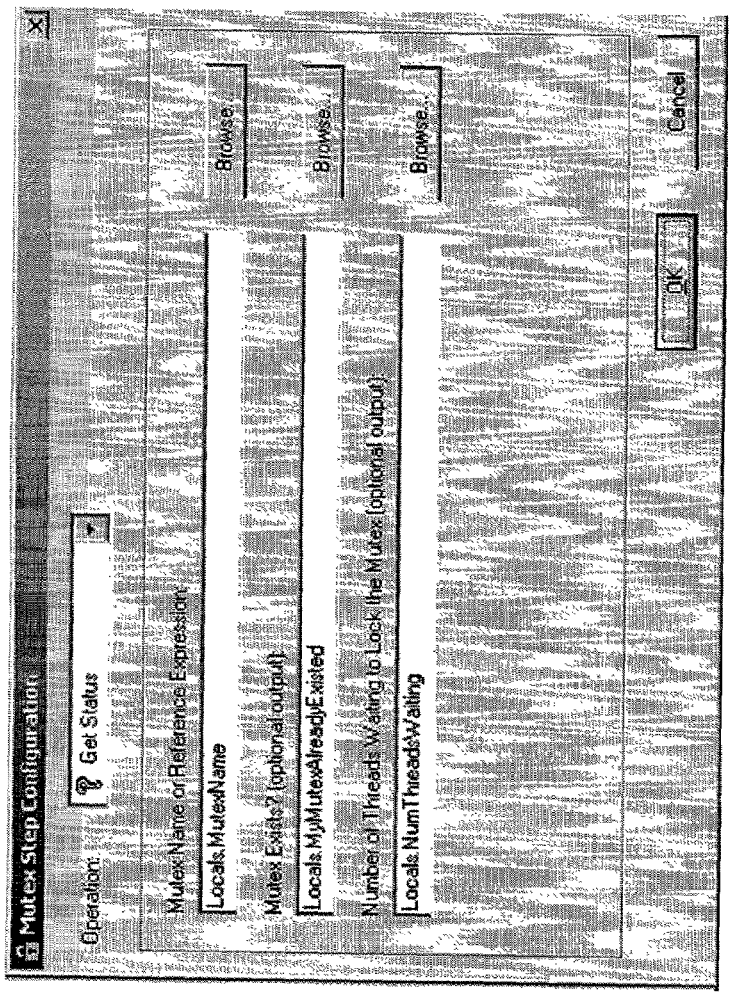

To obtain information about an existing mutex or to determine if a particular mutex exists, the user may insert a Mutex step and configure the Mutex step to perform a Get Status operation. FIG. 9 illustrates an exemplary dialog box for configuring a Mutex step, in which a "Get Status" option has been selected for the operation. The following GUI controls enable the user to configure the Get Status operation:

Mutex Name or Reference Expression—This control may be used to specify the mutex on which to perform the operation. The user can specify the mutex by name or by an ActiveX reference received when the mutex is created with the Using ActiveX Reference lifetime option.

Mutex Exists?—This control may be used to specify a location to store a Boolean value that indicates whether the mutex exists.

Number of Threads Waiting to Lock the Mutex—This control may be used to specify a location to store the number of threads waiting to lock the mutex.

Mutex Step Properties

Figure 10:
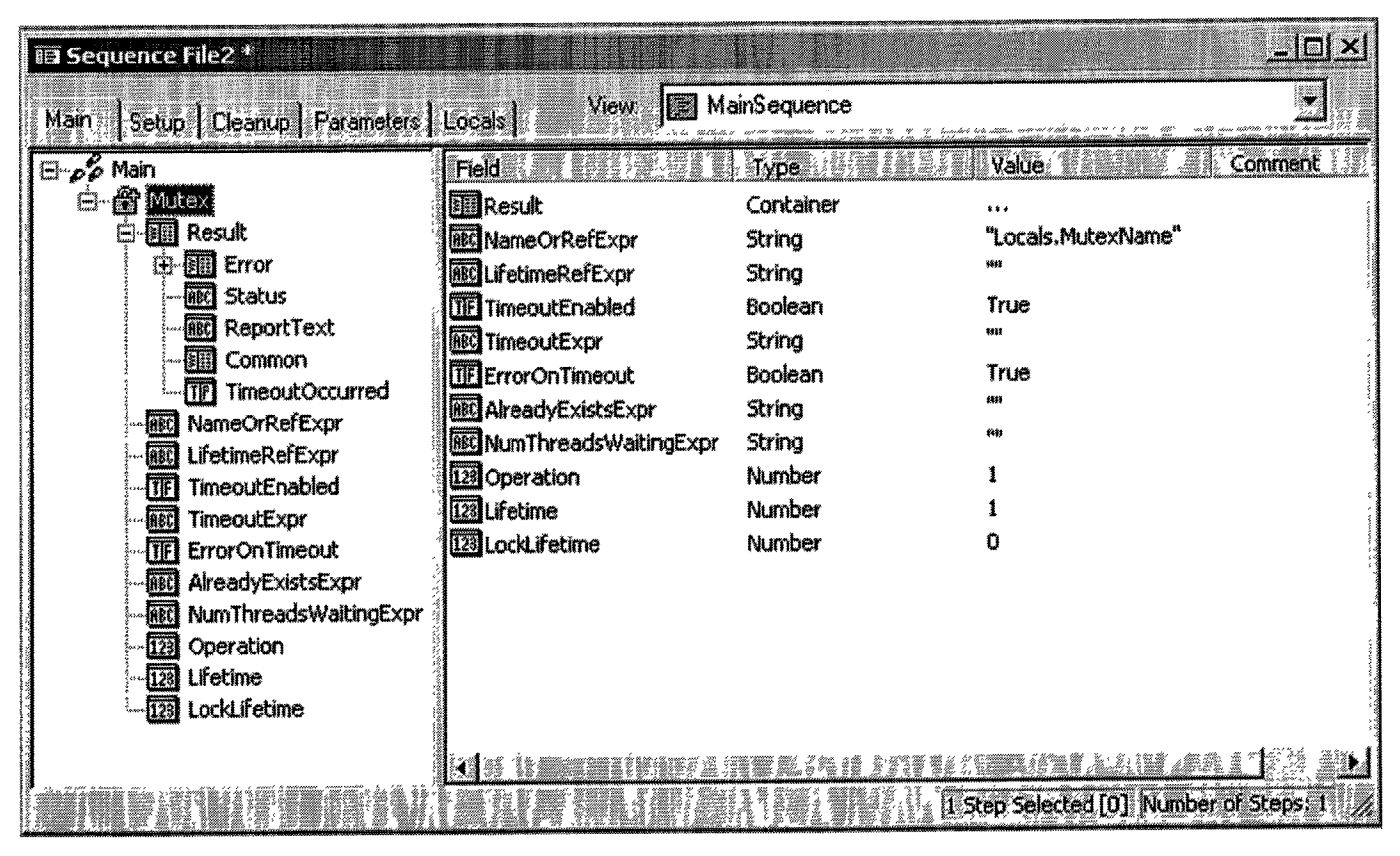

The Mutex step type may define various Mutex step properties in addition to the common custom properties. For example, FIG. 10 illustrates the following Mutex step properties:

Step.Result.TimeoutOccurred is set to True if the Lock operation times out. This property exists only if the step is configured for the Lock operation.

Step.NameOrRefExpr contains the Mutex Name Expression for the Create operation and the Mutex Name or Reference Expression for all other mutex operations.

Step.LifetimeRefExpr contains the ActiveX Reference Expression for the mutex lifetime or lock lifetime when the user sets either lifetime to Use ActiveX Reference.

Step.TimeoutEnabled contains the Timeout Enabled setting for the Lock operation.

Step.TimeoutExpr contains the Timeout Expression, in seconds, for the Lock operation.

Step.ErrorOnTimeout contains the Timeout Causes Run-Time Error setting for the Lock operation.

Step.AlreadyExistsExpr contains the Already Exists expression for the Create operation or the Mutex Exists expression for the Get Status operation.

Step.NumThreadsWaitingExpr contains the Number of Threads Waiting to Lock the Mutex expression for the Get Status operation.

Step.Operation contains a value that specifies the operation the step is configured to perform. In one embodiment, the valid values are 0=Create, 1=Lock, 2=Early Unlock, 3=Get Status.

Step.Lifetime contains a value that specifies the lifetime setting to use for the Create operation. In one embodiment, the valid values are 0=Same as Sequence, 1=Same as Thread, 2=Use ActiveX Reference.

Step.LockLifetime contains a value that specifies the lifetime setting to use for the Lock operation. In one embodiment, the valid values are 0=Same as Sequence, 1=Same as Thread, 2=Use ActiveX Reference.

Semaphore Step Type

Semaphore steps may be used to limit concurrent access to a resource to a specific number of threads. A semaphore stores a numeric count and allows threads to increment (release) or decrement (acquire) the count as long as the count stays equal to or greater than zero. If a decrement would cause the count to go below zero, the thread attempting to decrement the count blocks until the count increases. When multiple threads are waiting to decrement a semaphore, the semaphore preferably unblocks the threads in first in first out (FIFO) order whenever another thread increments the semaphore count.

A semaphore with an initial count of one may behave like a mutex, with one exception. Like a mutex, a one-count semaphore may restrict access to a single thread at a time. However, in one embodiment, unlike a mutex, a thread cannot acquire a one-count semaphore multiple times without releasing it each time. In the preferred embodiment, when a thread attempts to acquire the semaphore a second time without releasing it, the count is zero and the thread blocks.

Create Operation

Figure 11:
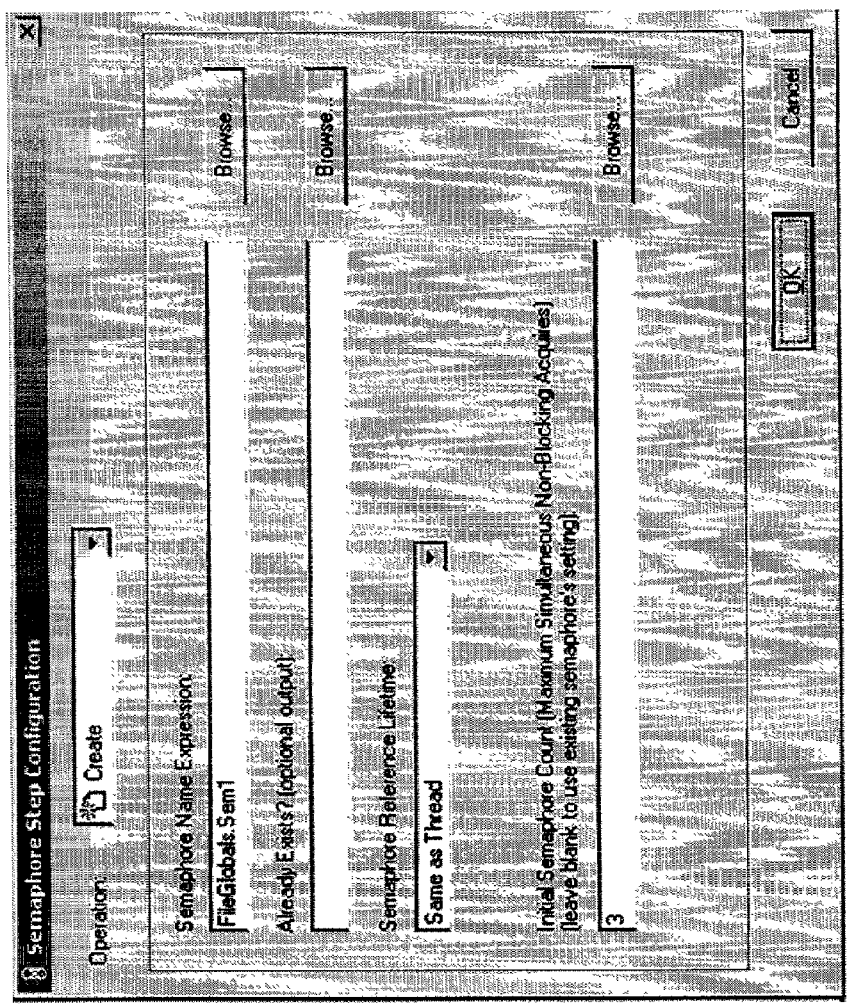

To use a semaphore, the user may first create a reference to a new or existing semaphore object. For example, to create a semaphore reference, the user may insert a Semaphore step. The user may then configure the Semaphore step, e.g., by selecting a "Configure Semaphore" item from a context menu for the step. FIG. 11 illustrates an exemplary dialog box for configuring a Semaphore step, in which a "Create" option has been selected for the operation. The following GUI controls enable the user to configure the Create operation:

Semaphore Name Expression—This control may be used to specify a unique name for the synchronization object using a string literal or an expression that evaluates to a string. Synchronization object names are described in more detail above.

Already Exists—This control may be used to specify a location to store a Boolean value that indicates whether the synchronization object already exists.

Semaphore Reference Lifetime—This control may be used to specify a lifetime for the reference to the synchronization object.

Initial Semaphore Count—This control may be used to specify the initial value for the count. This value must be greater than or equal to 0. If the user knows that the semaphore already exists, the user can leave this setting blank. If the semaphore already exists and the user specifies an initial count that differs from the existing initial count, the step may report an error at run time.

Acquire Operation

Figure 12:
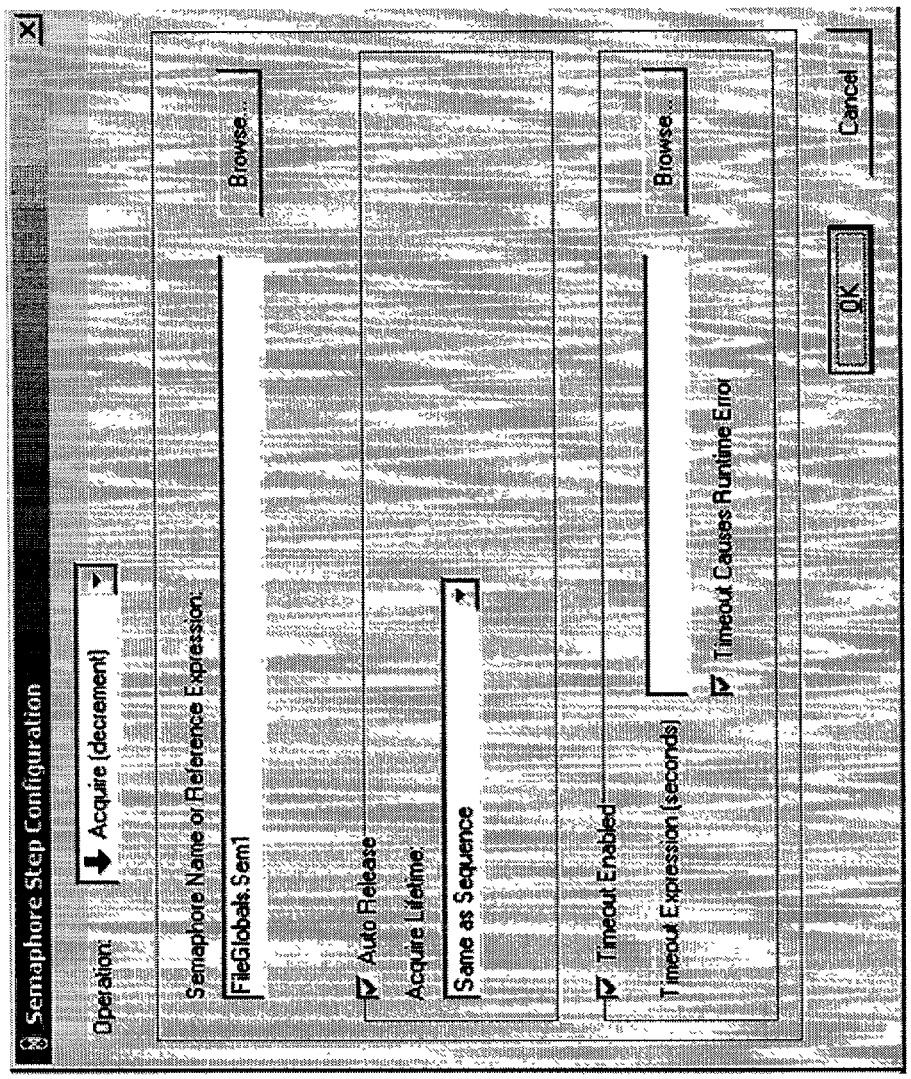

To access a resource that a semaphore protects, the user may perform an Acquire (decrement) operation on the semaphore. FIG. 12 illustrates an exemplary dialog box for configuring a Semaphore step, in which an "Acquire (decrement)" option has been selected for the operation. The following GUI controls enable the user to configure the Acquire (decrement) operation:

Semaphore Name or Reference Expression—This control may be used to specify the semaphore on which to perform the operation. The user can specify the semaphore by name or by an ActiveX reference received when the semaphore is created with the Using ActiveX Reference lifetime option.

Auto Release—This control may be used to specify whether to release (increment) the semaphore automatically when the lifetime the user specifies expires.

Acquire Lifetime—This control may be used to specify how long the thread holds the semaphore after the thread acquires the semaphore. The thread may release the semaphore automatically when the lifetime of the acquire ends. Synchronization object lifetime settings are described in more detail above.

Timeout Enabled, Timeout Expression, Timeout Causes Run-Time Error—These controls may be used to specify the timeout behavior when waiting to acquire the semaphore. If a timeout occurs, the property Step.Result.TimeoutOccurred is set to True.

Release Operation

Figure 13:
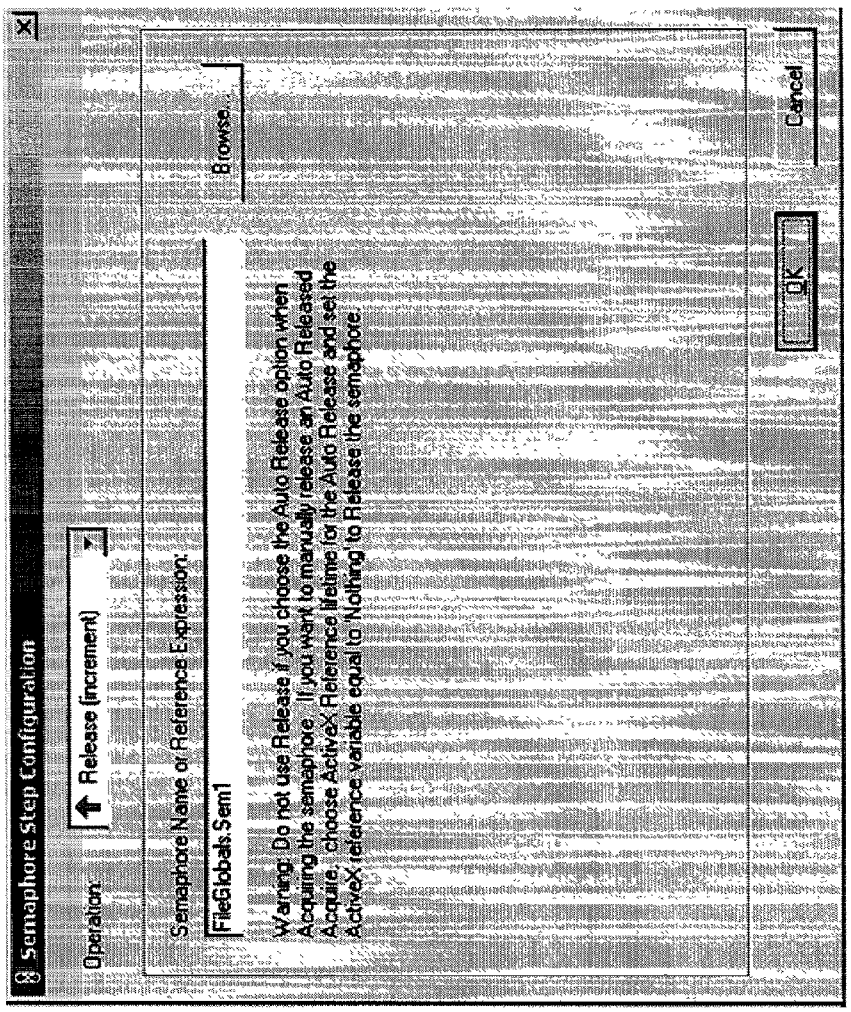

The Release (increment) operation may be used when the user wants direct control over the count or if the user uses semaphores in a way that requires unmatched increments and decrements. If the user enables Auto Release in the Acquire operation, the semaphore should not be explicitly released using the Release (increment) operation. FIG. 13 illustrates an exemplary dialog box for configuring a Semaphore step, in which a "Release (increment)" option has been selected for the operation. The following GUI control enables the user to configure the Release (increment) operation:

Semaphore Name or Reference Expression—This control may be used to specify the semaphore on which to perform the operation. The user can specify the semaphore by name or by an ActiveX reference received when the semaphore is created with the Using ActiveX Reference lifetime option.

The Release (increment) operation immediately increments the count for the semaphore. If the user performs the Acquire operation with the Auto Release option enabled, the Release (increment) operation should not be used. Typically, the user uses the Release (increment) operation only on semaphores that require unmatched increments and decrements. For example, if the user creates a semaphore with an initial count of zero, all threads block when they perform an Acquire. The user can then perform Release (increment) operations to release the threads when desired.

Get Status Operation

Figure 14:

To obtain information about the current state of the semaphore, the user may insert a Semaphore step and configure the Semaphore step to perform a Get Status operation. FIG. 14 illustrates an exemplary dialog box for configuring a Semaphore step, in which a "Get Status" option has been selected for the operation. The following GUI controls enable the user to configure the Get Status operation:

Semaphore Name or Reference Expression—This control may be used to specify the semaphore on which to perform the operation. The user can specify the semaphore by name or by an ActiveX reference received when the semaphore is created with the Using ActiveX Reference lifetime option.

Semaphore Exists?—This control may be used to specify a location to store a Boolean value that indicates whether the semaphore exists.

Number of Threads Waiting to Acquire the Semaphore—This control may be used to specify a location to store the number of threads waiting to acquire the semaphore.

Initial Semaphore Count—This control may be used to specify a location to store the initial semaphore count.

Current Count—This control may be used to specify a location to store the current value of the internal count.

Semaphore Step Properties

Figure 15:
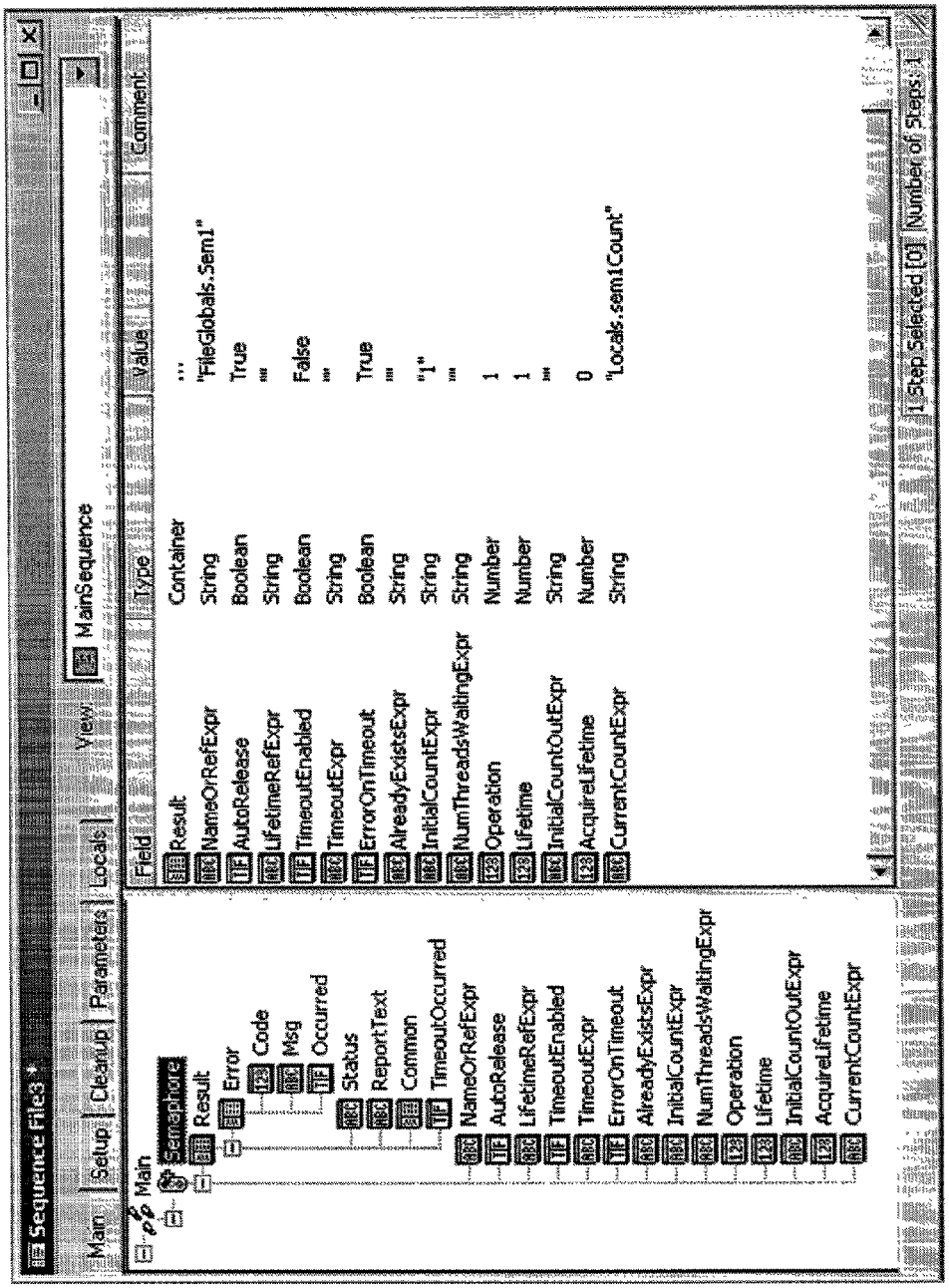

The Semaphore step type may define various Semaphore step properties in addition to the common custom properties. For example, FIG. 15 illustrates the following Semaphore step properties:

Step.Result.TimeoutOccurred is set to True if the Acquire operation times out. This property exists only if the step is configured for the Acquire operation.

Step.NameorRefExpr contains the Semaphore Name Expression for the Create operation and the Semaphore Name or Reference Expression for all of the other operations.

Step.AutoRelease contains a Boolean value that specifies whether the Acquire operation automatically performs a Release when the Acquire lifetime expires.

Step.LifetimeRefExpr contains the ActiveX Reference Expression for the semaphore lifetime or acquire lifetime when the user sets either lifetime to Use ActiveX Reference.

Step.TimeoutEnabled contains the Timeout Enabled setting for the Acquire operation.

Step.TimeoutExpr contains the Timeout Expression, in seconds, for the Acquire operation.

Step.ErrorOnTimeout contains the Timeout Causes Run-Time Error setting for the Acquire operation.

Step.AlreadyExistsExpr contains the Already Exists expression for the Create operation or the Semaphore Exists expression for the Get Status operation.

Step.InitialCountExpr contains the numeric expression that the Create operation uses for the initial count of the semaphore.

Step.NumThreadsWaitingExpr contains the Number of Threads Waiting to Acquire the Semaphore expression for the Get Status operation.

Step.Operation contains a value that specifies the operation the step performs. In one embodiment, the valid values are 0=Create, 1=Acquire, 2=Release, 3=Get Status.

Step.Lifetime contains a value that specifies the lifetime setting for the Create operation. In one embodiment, the valid values are 0=Same as Sequence, 1=Same as Thread, 2=Use ActiveX Reference.

Step.InitialCountOutExpr contains the Initial Semaphore Count expression for the Get Status operation.

Step.AcquireLifetime contains a value that specifies the lifetime setting for the Acquire operation. In one embodiment, the valid values are 0=Same as Sequence, 1=Same as Thread, 2=Use ActiveX Reference. The Acquire operation uses this setting only when Step.AutoRelease is set to True.

Step.CurrentCountExpr contains the Current Count expression for the Get Status operation.

Rendezvous Step Type

A rendezvous synchronization object may be used to make threads wait for each other before they proceed past a location the user specifies. As each thread performs the rendezvous operation, the thread blocks. When the number of blocked threads reaches the total specified by the user when the user creates the rendezvous, the rendezvous unblocks all its waiting threads and the threads resume execution.

Create Operation

Figure 16:
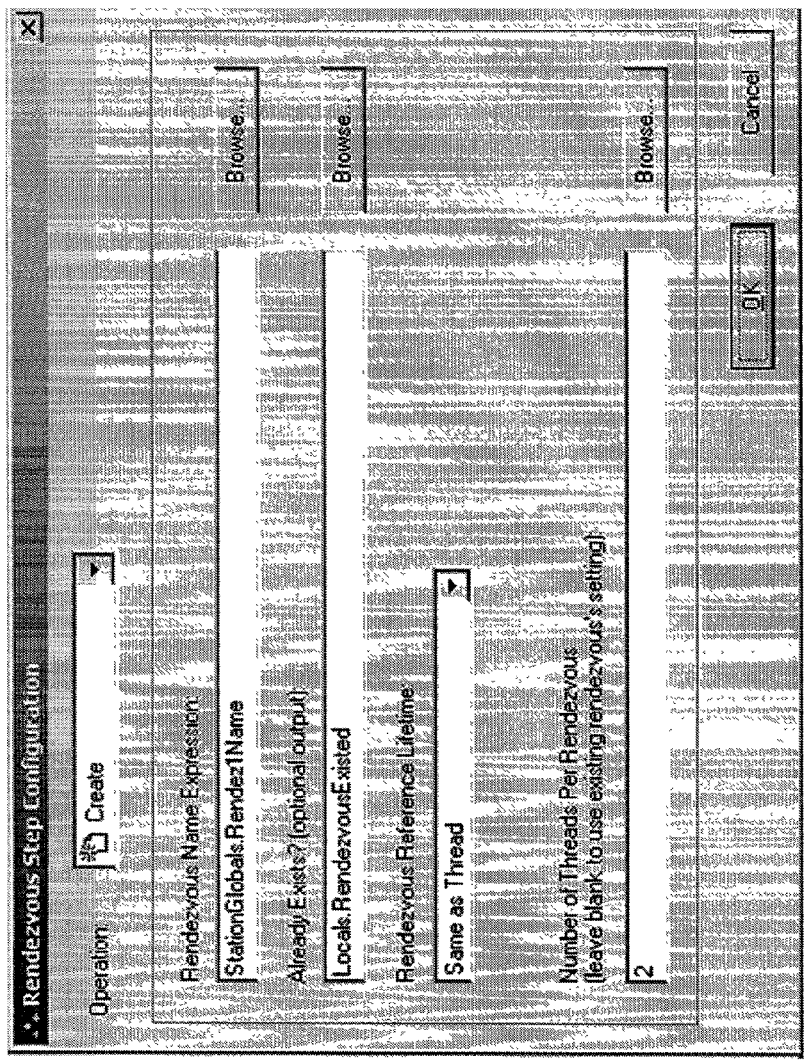

FIG. 16 illustrates an exemplary dialog box for configuring a Rendezvous step, in which a "Create" option has been selected for the operation. The following GUI controls enable the user to configure the Create operation:

Rendezvous Name Expression—This control may be used to specify a unique name for the synchronization object using a string literal or an expression that evaluates to a string. Synchronization object names are described in more detail above.

Already Exists—This control may be used to specify a location to store a Boolean value that indicates whether the synchronization object already exists.

Rendezvous Reference Lifetime—This control may be used to specify a lifetime for the reference to the synchronization object.

Number of Threads Per Rendezvous—This control may be used to specify the number of threads that must rendezvous before the step permits the threads to continue execution past the rendezvous point. This value must be greater than zero. If the user knows that the rendezvous already exists, the user can leave this setting blank. If the user specifies a value different than the setting in the existing rendezvous, the step may report an error at run time.

Rendezvous Operation

Figure 17:
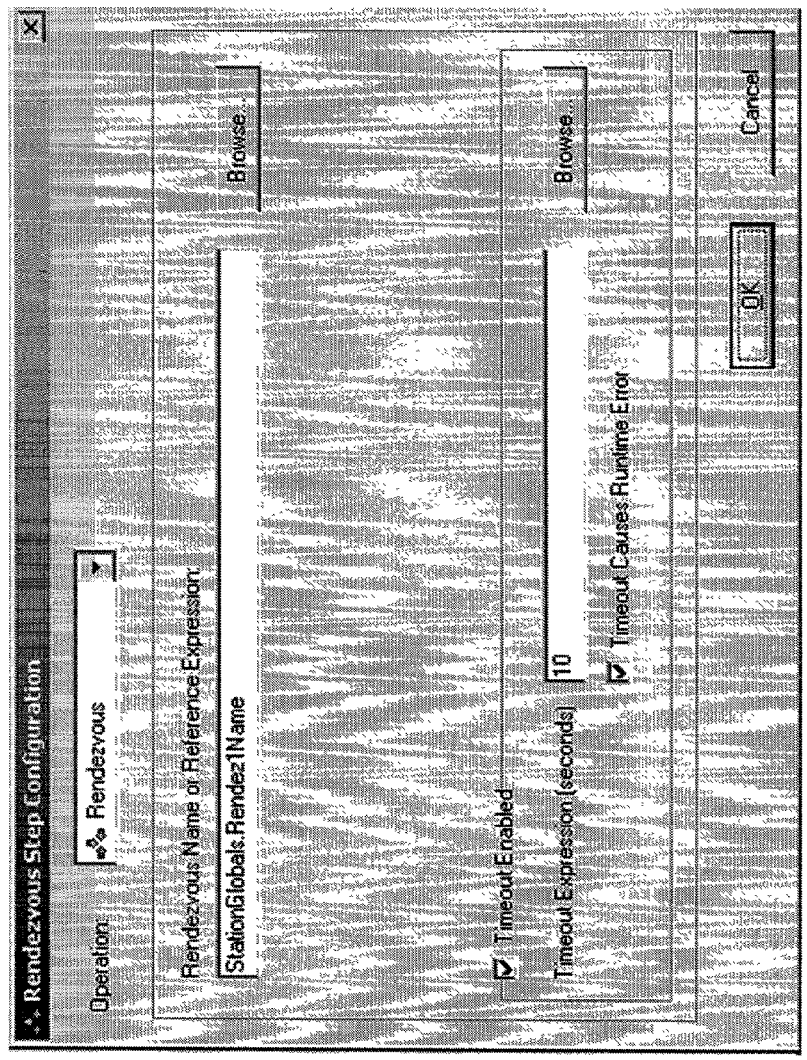

FIG. 17 illustrates an exemplary dialog box for configuring a Rendezvous step, in which a "Rendezvous" option has been selected for the operation. The following GUI controls enable the user to configure the Rendezvous operation:

Rendezvous Name or Reference Expression—This control may be used to specify the rendezvous on which to perform the operation. The user can specify the rendezvous by name or by an ActiveX reference received when the rendezvous is created with the Using ActiveX Reference lifetime option.

Timeout Enabled, Timeout Expression, Timeout Causes Run-Time Error—These controls may be used to specify a timeout and timeout behavior when waiting to rendezvous with other threads. If a timeout occurs, the property Step.Result.TimeoutOccurrediS set to True.

Get Status Operation

Figure 18:
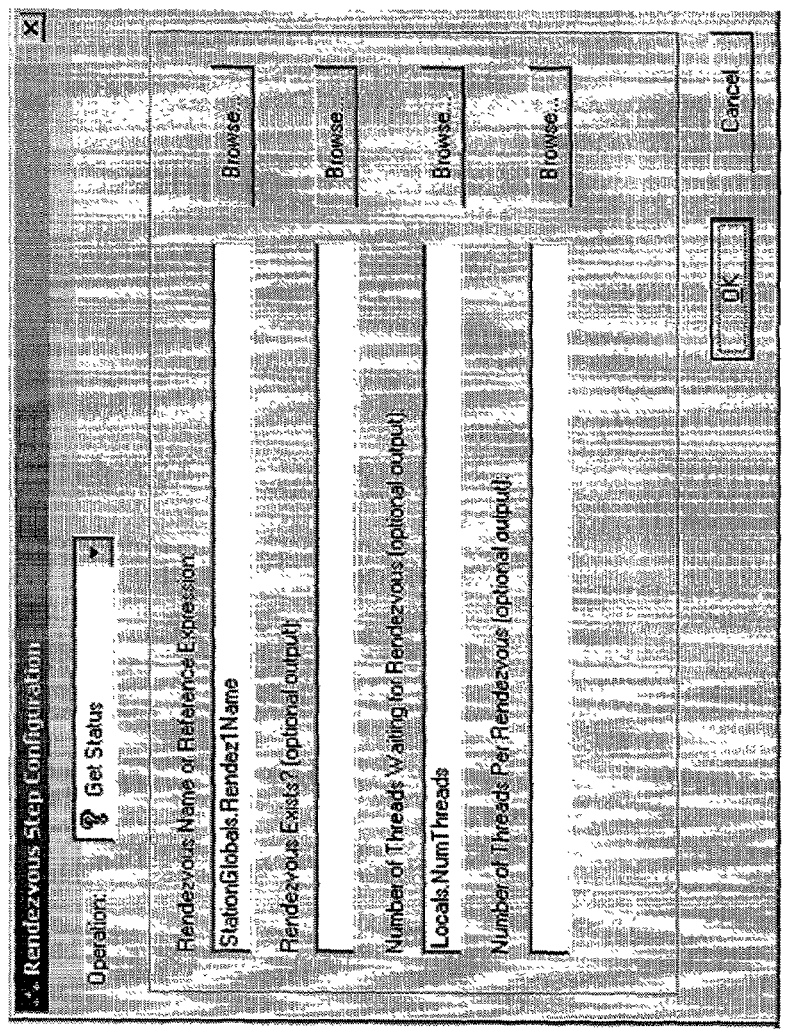

To obtain information about the current state of the rendezvous, the user may use the Get Status operation. FIG. 18 illustrates an exemplary dialog box for configuring a Rendezvous step, in which a "Get Status" option has been selected for the operation. The following GUI controls enable the user to configure the Get Status operation:

Rendezvous Name or Reference Expression—This control may be used to specify the rendezvous on which to perform the operation. The user can specify the rendezvous by name or by an ActiveX reference received when the rendezvous is created with the Using ActiveX Reference lifetime option.

Rendezvous Exists?—This control may be used to specify a location to store a Boolean value that indicates whether the rendezvous exists.

Number of Threads Waiting for Rendezvous—This control may be used to specify a location to store the number of threads waiting on the rendezvous operation.

Number of Threads Per Rendezvous—This control may be used to specify a location to store the number of threads that must rendezvous before the step permits the threads to continue execution past the rendezvous point.

Rendezvous Step Properties

Figure 19:
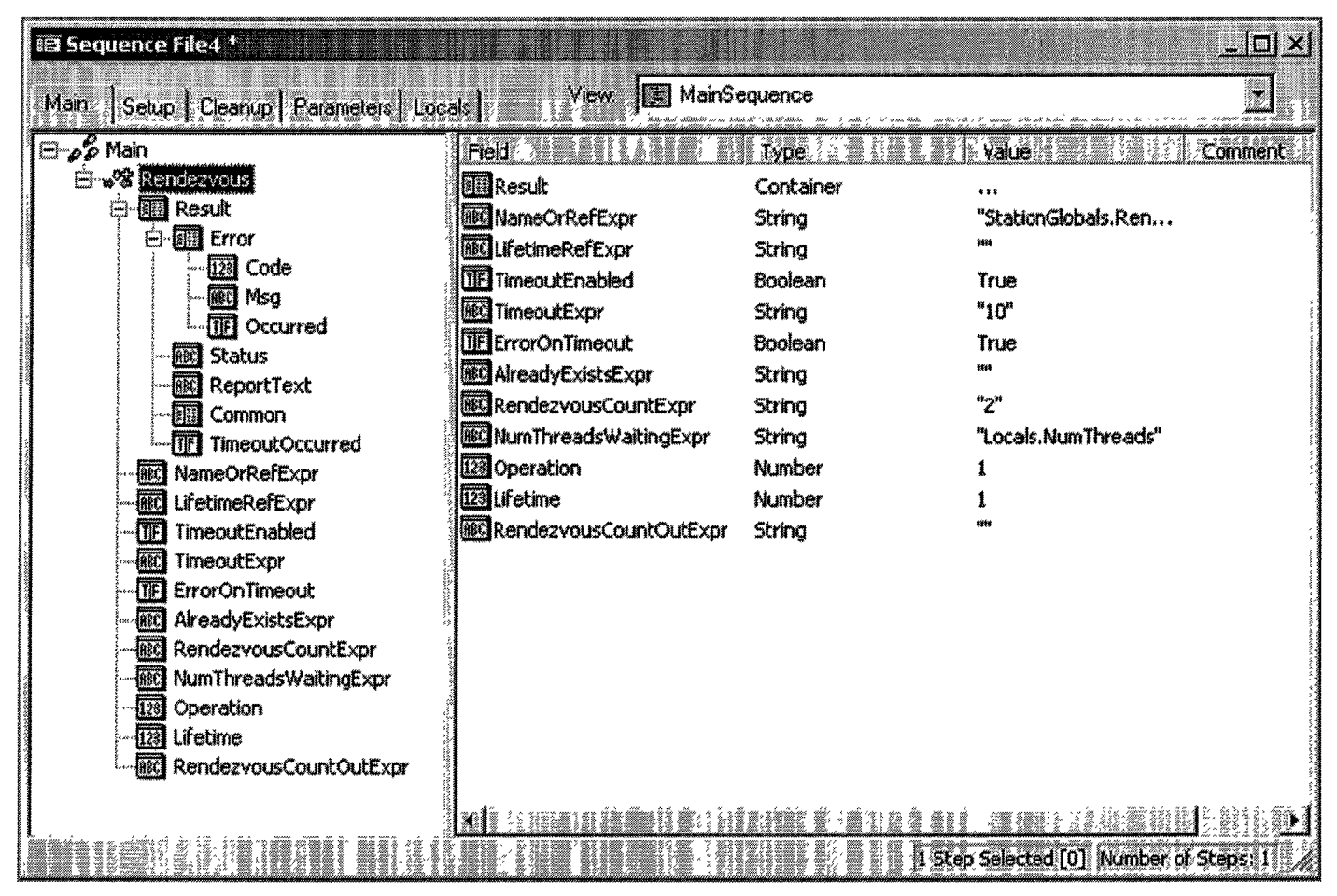

The Rendezvous step type may define various Rendezvous step properties in addition to the common custom properties. For example, FIG. 19 illustrates the following Rendezvous step properties:

Step.Result.TimeoutOccurred is set to true if the rendezvous operation times out. This property exists only if the step is configured for the rendezvous operation.

Step.NameOrRefExpr contains the Rendezvous Name Expression for the Create operation and the Rendezvous Name or Reference Expression for other rendezvous operations.

Step.LifetimeRefExpr contains the ActiveX Reference Expression for the rendezvous lifetime when the user sets the lifetime to Use ActiveX Reference.

Step.TimeoutEnabled contains the Timeout Enabled setting for the rendezvous operation.

Step.TimeoutExpr contains the Timeout Expression, in seconds, for the rendezvous operation.

Step.ErrorOnTimeout contains the Timeout Causes Run-Time Error setting for the rendezvous operation.

Step.AlreadyExistsExpr contains the Already Exists expression for the Create operation or the Rendezvous Exists expression for the Get Status operation.

Step.RendezvousCountExpr contains the Number of Threads Per Rendezvous expression for the Create operation.

Step.NumThreadsWaitingExpr contains the Number of Threads Waiting for Rendezvous expression for the Get Status operation.

Step.Operation contains a value that specifies the operation the step performs. In one embodiment, the valid values are 0 Create, 1 Rendezvous, 2=Get Status.

Step.Lifetime contains a value that specifies the lifetime for the Create operation. In one embodiment, the valid values are 0=Same as Sequence, 1=Same as Thread, 2=Use ActiveX Reference.

Step.RendezvousCountOutExpr contains the Number of Threads Per Rendezvous expression for the Get Status operation.

Queue Step Type

Queue steps may be used to synchronize the production and consumption of data among threads. A queue has two primary operations, Enqueue and Dequeue. The Enqueue operation places a data item on the queue and the Dequeue operation removes an item from the queue. Normally, the Enqueue operation blocks when the queue is full and the Dequeue operation blocks when the queue is empty. If multiple threads block on the same queue operation, the threads preferably unblock in first in first out (FIFO) order.

Create Operation

Figure 20:
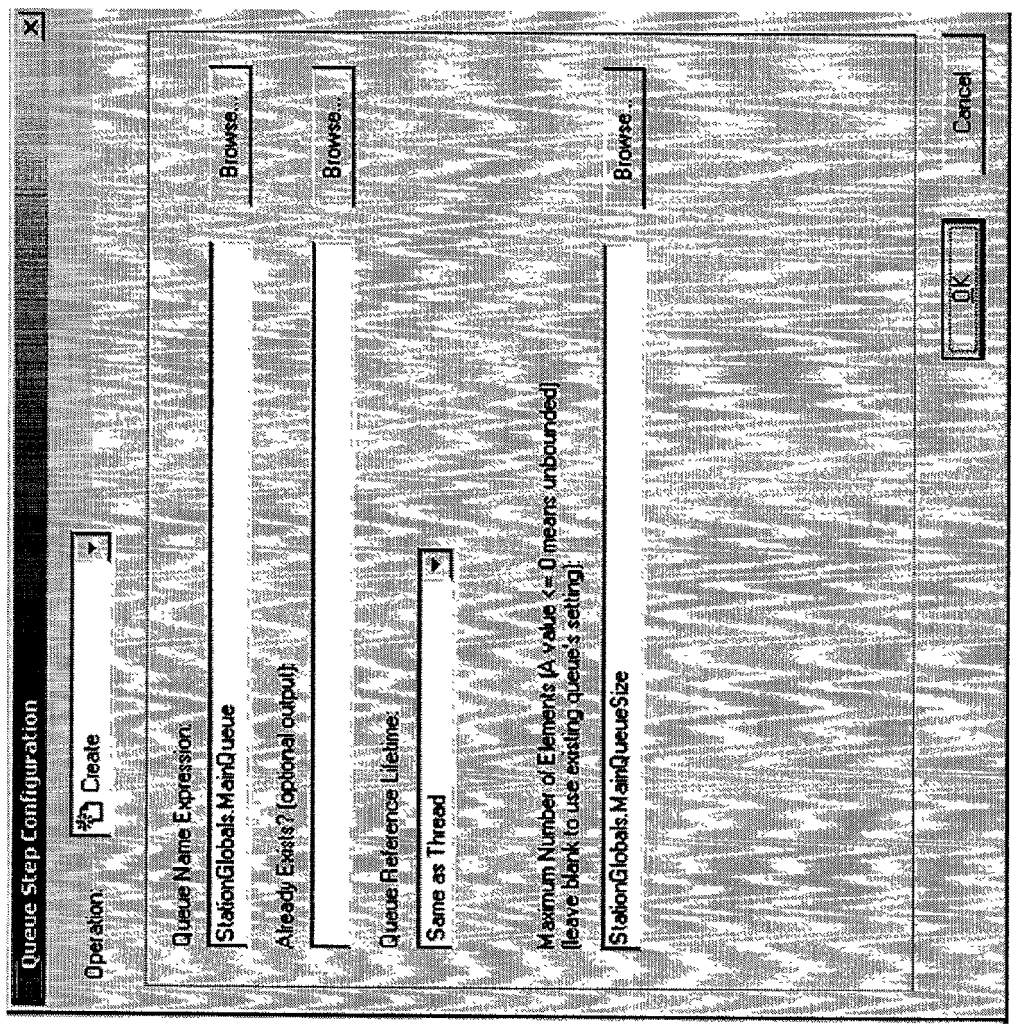

To use a queue, the user may first create a reference to a new or existing queue object. For example, the user may insert a Queue step and then configure the Queue step, e.g., by selecting a "Configure Queue" item from a context menu for the step. FIG. 20 illustrates an exemplary dialog box for configuring a Queue step, in which a "Create" option has been selected for the operation. The following GUI controls enable the user to configure the Create operation:

- Queue Name Expression—This control may be used to specify a unique name for the synchronization object using a string literal or an expression that evaluates to a string. Synchronization object names are described in more detail above.
- Already Exists—This control may be used to specify a location to store a Boolean value that indicates whether the synchronization object already exists.
- Queue Reference Lifetime—This control may be used to specify a lifetime for the reference to the synchronization object.
- Maximum Number of Elements—This control may be used to specify the maximum number of items that the queue can store. A value less than or equal to zero specifies that the queue does not have a maximum number of elements. If the user knows that the queue already exists, the user can leave this setting blank. If the user specifies a value different than the maximum number of elements for the existing queue, the step may report an error at run time.

Enqueue Operation

Figure 21:
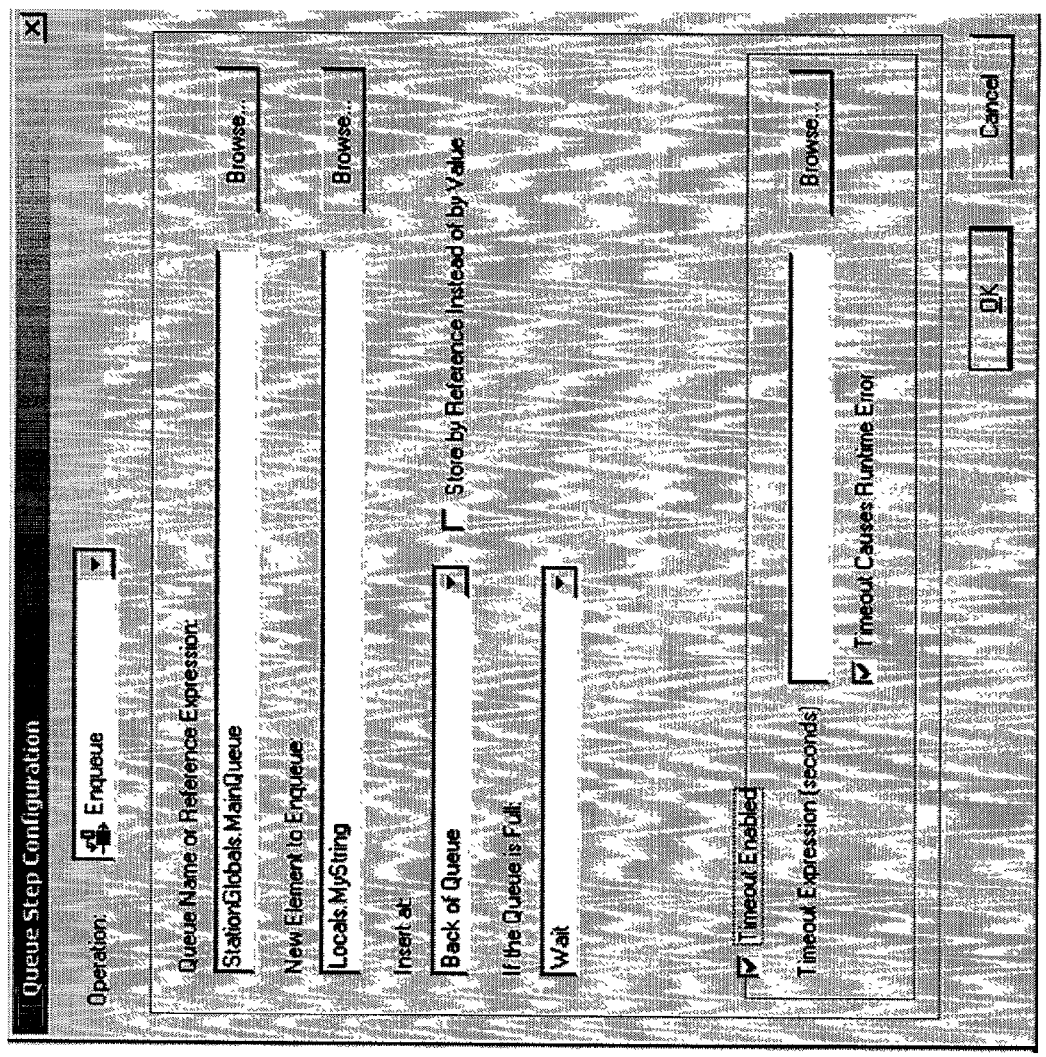

The Enqueue operation may be used to add new elements to the queue. FIG. 21 illustrates an exemplary dialog box for configuring a Queue step, in which an "Enqueue" option has been selected for the operation. The following GUI controls enable the user to configure the Enqueue operation:

- Queue Name or Reference Expression—This control may be used to specify the queue on which to perform the operation. The user can specify the queue by name or by an ActiveX reference received when the queue is created with the Using ActiveX Reference lifetime option.
- New Element to Enqueue—This control may be used to specify the data to insert into the queue. The data can be any type, including a number, string, Boolean, ActiveX reference, structured type (container), or arrays of these types. The user may later dequeue the element into a location with the appropriate type. By default, the queue may store a copy of the data the user enqueues. However, if the user enables the Store by Reference Instead of by Value option, the Enqueue operation may store a reference to the data value instead, e.g., an ActiveX reference. The user may then dequeue this reference into an ActiveX reference variable and access the data. For example, the TestStand test executive environment provides a TestStand ActiveX API PropertyObject interface and ActiveX Automation Adapter that may be used to access the data.
- Insert At—This control may be used to specify where to store the new queue element. In one embodiment, the choices are Back of Queue and Front of Queue.
- Store by Reference Instead of by Value—This control may be used to specify how to store the data the user specifies in the New Element to Enqueue control. The user may enable the option to store an ActiveX reference to the data. The user may disable the option to store a copy of the data.
- If the Queue is Full—This control may be used to specify what to do if the queue is full. In one embodiment, the choices are Wait, Discard Front Element, Discard Back Element, and Do Not Enqueue. If the user chooses the Wait option, the thread blocks until the queue is no longer full. All other options return immediately.
- Timeout Enabled, Timeout Expression, Timeout Causes Run-Time Error—These controls may be used to specify a timeout and timeout behavior for when the queue is full. The timeout only applies if the user specifies the Wait option for the If the Queue is Full setting. If a timeout occurs, the property Step.Result.TimeoutOccurred is set to True.

Dequeue Operation

Figure 22:
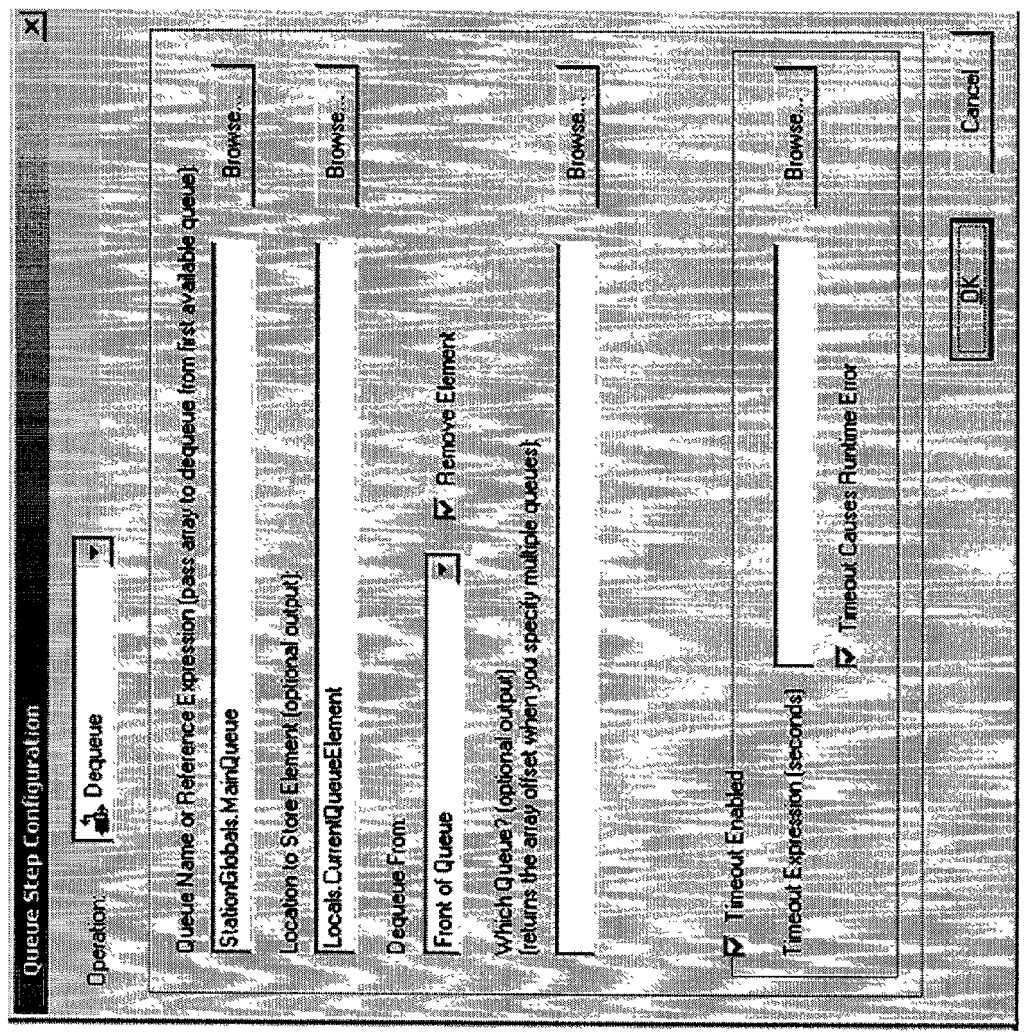

The Dequeue operation may be used to remove an element and/or store the data from an element. FIG. 22 illustrates an exemplary dialog box for configuring a Queue step, in which a "Dequeue" option has been selected for the operation. The following GUI controls enable the user to configure the Dequeue operation:

- Queue Name or Reference Expression—This control may be used to specify the queue on which to perform the operation. The user can specify the queue by name or by an ActiveX reference received when the queue is created with the Using ActiveX Reference lifetime option. The user can specify multiple queues using either a string array containing the names of the queues, or an ActiveX reference array containing ActiveX references to the queues. When the user specifies multiple queues, the Dequeue operation dequeues an element from the first queue the user specifies that has an element available. The user can ascertain which queue the operation dequeues from by using the Which Queue control to specify a location to store the array offset of the queue.
- Location to Store Element—This control may be used to specify the location in which to store the queue element, e.g., wherein the type of the location is compatible with the data that the element stores. The user may leave this control blank if the user does not want to store the data. FIG. 23 is a table illustrating the outcomes, according to one embodiment, when data is enqueued by value. FIG. 24 is a table illustrating the outcomes, according to one embodiment, when data is enqueued by reference. In FIGS. 23 and 24, the outcomes shown depend on the type of data in the queue and the data type of the storage location. In these tables, "Simple Type" refers to a number, string, Boolean, array of any type, or other simple type, and "Structured Type" refers to an instance of a user-defined type where the root property is a container.
- Dequeue From—This control may be used to specify where in the queue to dequeue from. In one embodiment, the options are Front of Queue and Back of Queue.
- Remove Element—This control may be used to specify whether the operation removes the element from the queue. If the user does not enable this option, the operation retrieves the value of the element without removing it from the queue.

Which Queue—This control may be used to specify a location to store the array offset of the queue on which the Dequeue operation occurs. Typically, the Which Queue control is not used unless the user is dequeuing from multiple queues. Dequeuing from multiple queues is described above.

Timeout Enabled, Timeout Expression, Timeout Causes Run-Time Error—These controls may be used to specify a timeout and timeout behavior when waiting to dequeue an element. If a timeout occurs, the property Step.Result.TimeoutOccurred is set to True.

Flush Operation

Figure 25:
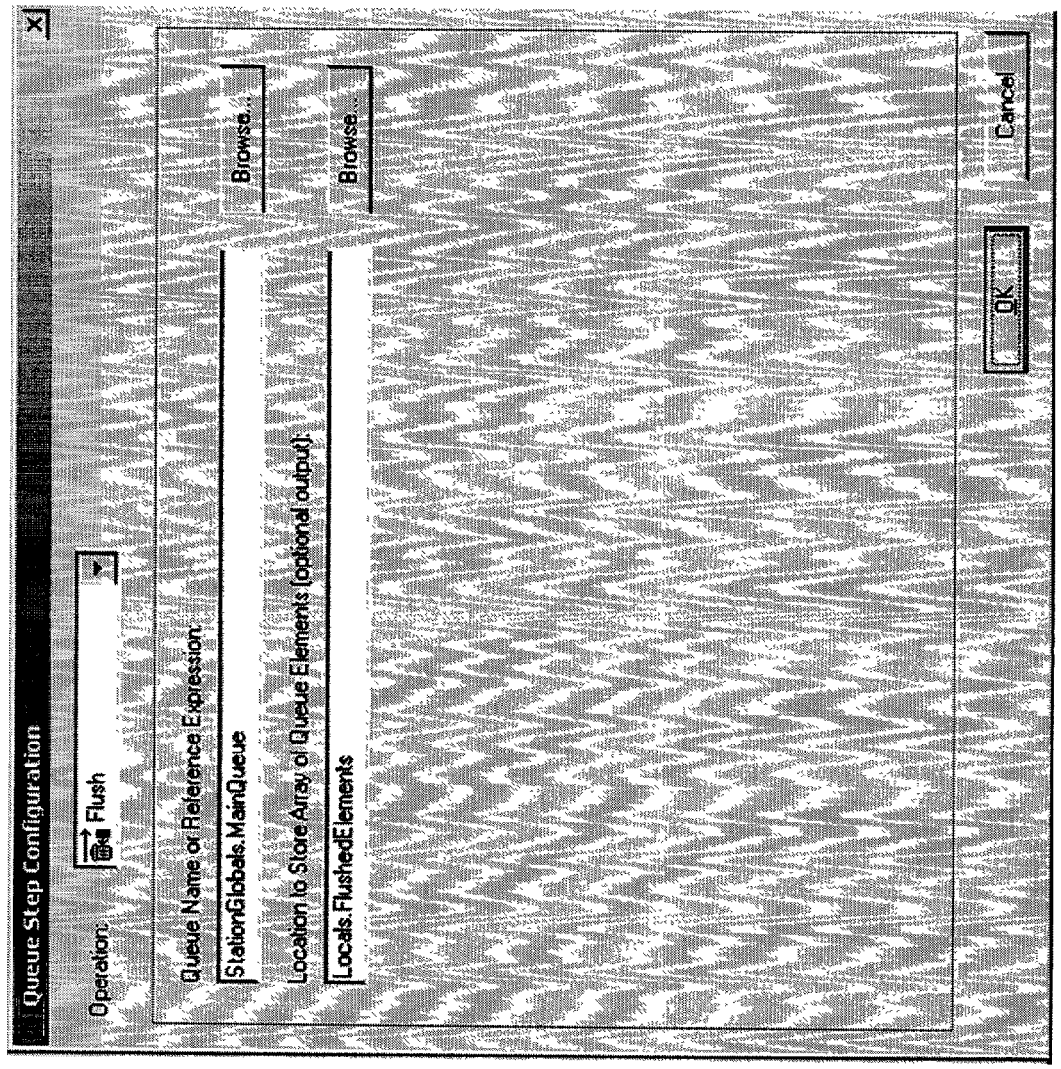

The Flush operation may be used to empty the queue and optionally retrieve all its elements. FIG. 25 illustrates an exemplary dialog box for configuring a Queue step, in which a "Flush" option has been selected for the operation. The following GUI controls enable the user to configure the Flush operation:

Queue Name or Reference Expression—This control may be used to specify the queue on which to perform the operation. The user can specify the queue by name or by an ActiveX reference received when the queue is created with the Using ActiveX Reference lifetime option.

Location to Store Array of Queue Elements—This control may be used to specify an array property in which to store the elements of the queue, in which the queue elements are of the same data type as the specified array. This output is optional.

Get Status Operation

Figure 26:
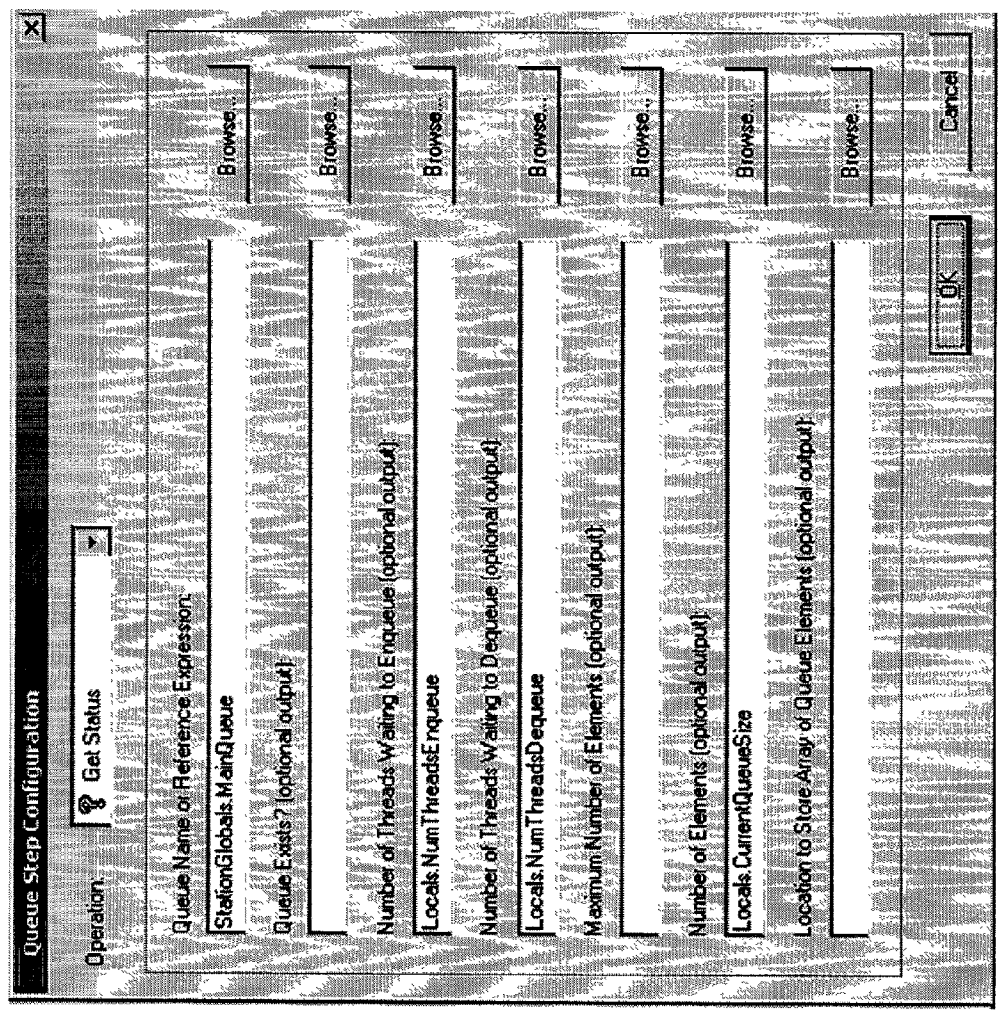

The Get Status operation may be used to obtain information about the current state of a queue. FIG. 26 illustrates an exemplary dialog box for configuring a Queue step, in which a "Get Status" option has been selected for the operation. The following GUI controls enable the user to configure the Get Status operation:

Queue Name or Reference Expression—This control may be used to specify the queue on which to perform the operation. The user can specify the queue by name or by an ActiveX reference received when the queue is created with the Using ActiveX Reference lifetime option.

Queue Exists—This control may be used to specify a location to store a Boolean value that indicates whether the synchronization object exists.

Number of Threads Waiting to Enqueue—This control may be used to specify a location to store the number of threads waiting to enqueue data.

Number of Threads Waiting to Dequeue—This control may be used to specify a location to store the number of threads waiting to dequeue data.

Maximum Number of Elements—This control may be used to specify a location to store the maximum number of elements of the queue.

Number of Elements—This control may be used to specify a location to store the number of elements in the queue.

Location to Store Array of Queue Elements—This control may be used to specify an array property in which to store the elements of the queue, in which the queue elements are of the same data type as the specified array. This feature is optional.

Queue Step Properties

Figure 27:
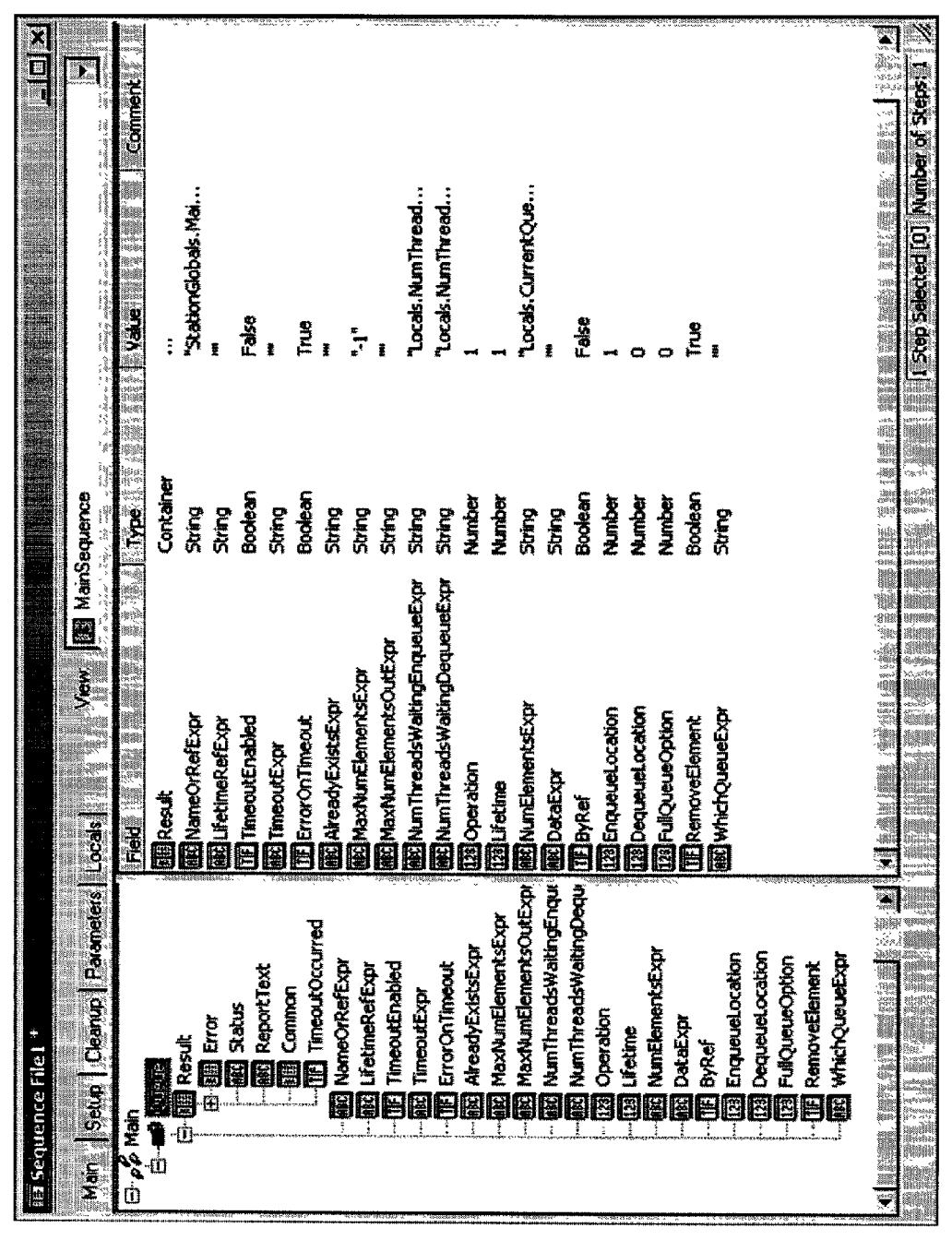

The Queue step type may define various Queue step properties in addition to the common custom properties. For example, FIG. 27 illustrates the following Queue step properties:

Step.Result.TimeoutOccurred is set to True if an Enqueue or Dequeue operation times out. This property exists only if the step is configured for the Enqueue or Dequeue operation.

Step.NameOrRefExpr contains the Queue Name Expression for the Create operation and the Queue Name or Reference Expression for all other operations. In the case of the Dequeue operation, this expression can specify an array of names or references.

Step.LifetimeRefExpr contains the ActiveX Reference Expression for the queue lifetime when the user set the lifetime to Use ActiveX Reference.

Step.TimeoutEnabled contains the Timeout Enabled setting for the Enqueue or Dequeue operation.

Step.TimeoutExpr contains the Timeout Expression, in seconds, for the Enqueue or Dequeue operation.

Step.ErrorOnTimeout contains the Timeout Causes Run-Time Error setting for the Enqueue or Dequeue operation.

Step.AlreadyExistsExpr contains the Already Exists expression for the Create operation or the Queue Exists expression for the Get Status operation.

Step.MaxNumElementsExpr contains the expression that specifies the maximum number of elements of the queue for the Create operation.

Step.MaxNumElementsOutExpr contains the expression that specifies where to store the maximum number of elements of the queue for the Get Status operation.

Step.NumThreadsWaitingEnqueueExpr contains the expression that specifies where to store the number of threads that are waiting to enqueue for the Get Status operation.

Step.NumThreadsWaitingDequeueExpr contains the expression that specifies where to store the number of threads that are waiting to dequeue for the Get Status operation.

Step.Operation contains a value that specifies the operation the step performs. In one embodiment, the valid values are 0=Create, 1=Enqueue, 2=Dequeue, 3=Flush, 4=Get Status.

Step.Lifetime contains a value that specifies the lifetime setting for the Create operation. In one embodiment, the valid values are 0="Same as Sequence", 1="Same as Thread", 2="Use ActiveX Reference".

Step.NumElementsExpr contains the expression that specifies where to store the current number of elements in the queue for the Get Status operation.

Step.DataExpr contains the "New Element to Enqueue" expression when the user configures the step for the Enqueue operation, the "Location to Store Element" expression when the user configures the step for the Dequeue operation, and the "Location to Store Array of Queue Elements" expression when the user configures the step for the Flush or Get Status operation.

Step.ByRef contains the Boolean value that specifies whether the step stores a queue element by ActiveX reference instead of by value for the Enqueue operation.

Step.EnqueueLocation contains a value that specifies the location to store the queue element for the Enqueue operation. In one embodiment, the valid values are 0=Front of Queue, 1=Back of Queue Step.DequeueLocation contains a value that specifies the location to remove the queue element from for the Dequeue operation. In one embodiment, the valid values are 0=Front of Queue, 1=Back of Queue Step.FullQueueOption contains a value that specifies the options for the If the Queue is Full setting of the Enqueue operation. In one embodiment, the valid values are 0=Wait, 1=Discard Front Element, 2=Discard Back Element, 3=Do Not Enqueue.

Step.RemoveElement contains a Boolean value that specifies whether the step removes the element from the queue when it performs the Dequeue operation.

Step.WhichQueueExpr contains the expression that specifies where to store the array offset of the queue on which the Dequeue operation occurs.

Notification Step Type

Notification steps may be used to notify one or more threads when a particular event or condition has been met. The user also can pass data to the notified threads.

Create Operation

Figure 28:
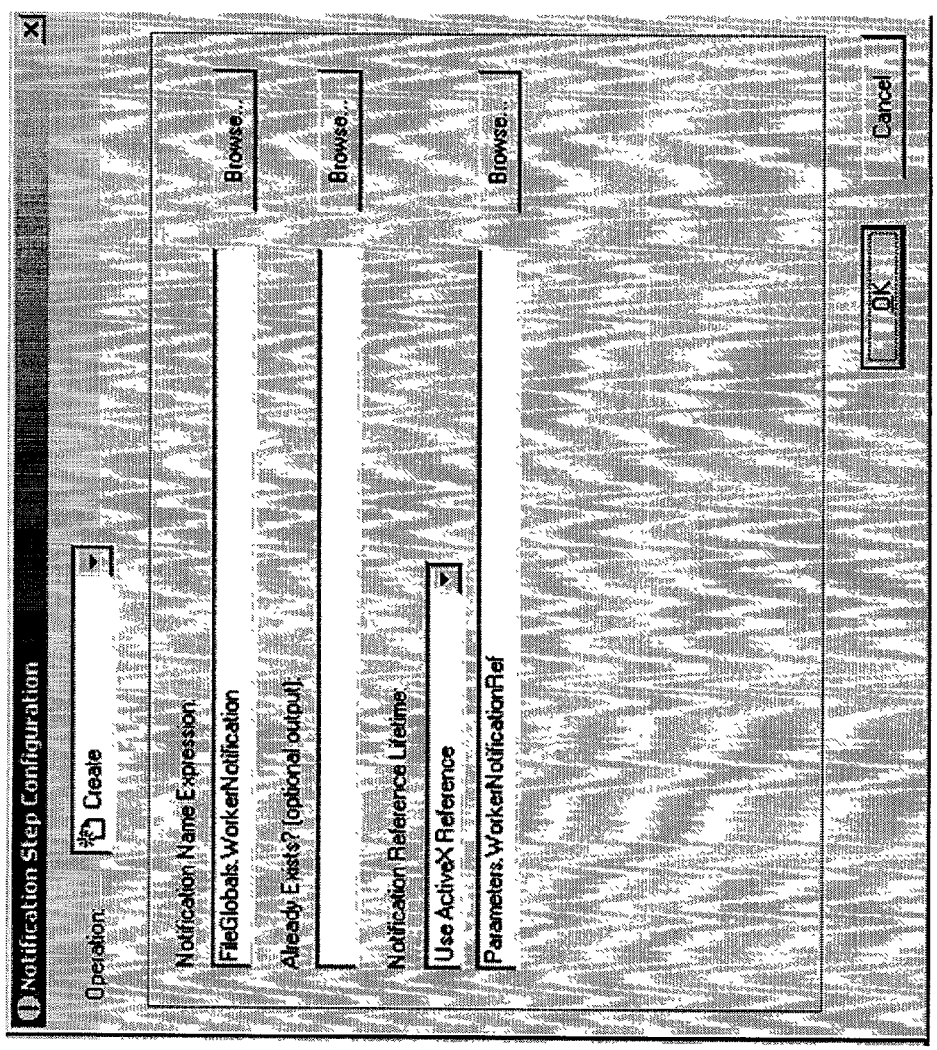

To use a notification, the user may first create a reference to a new or existing notification object. For example, the user may insert a Notification step and then configure the Notification step, e.g., by selecting a "Configure Notification" item from a context menu for the step. FIG. 28 illustrates an exemplary dialog box for configuring a Notification step, in which a "Create" option has been selected for the operation. The following GUI controls enable the user to configure the Create operation:

Notification Name Expression—This control may be used to specify a unique name for the synchronization object using a string literal or an expression that evaluates to a string. Synchronization object names are described in more detail above.

Already Exists—This control may be used to specify a location to store a Boolean value that indicates whether the synchronization object already exists.

Notification Reference Lifetime—This control may be used to specify the lifetime of the reference to the synchronization object.

Set Operation

Figure 29:
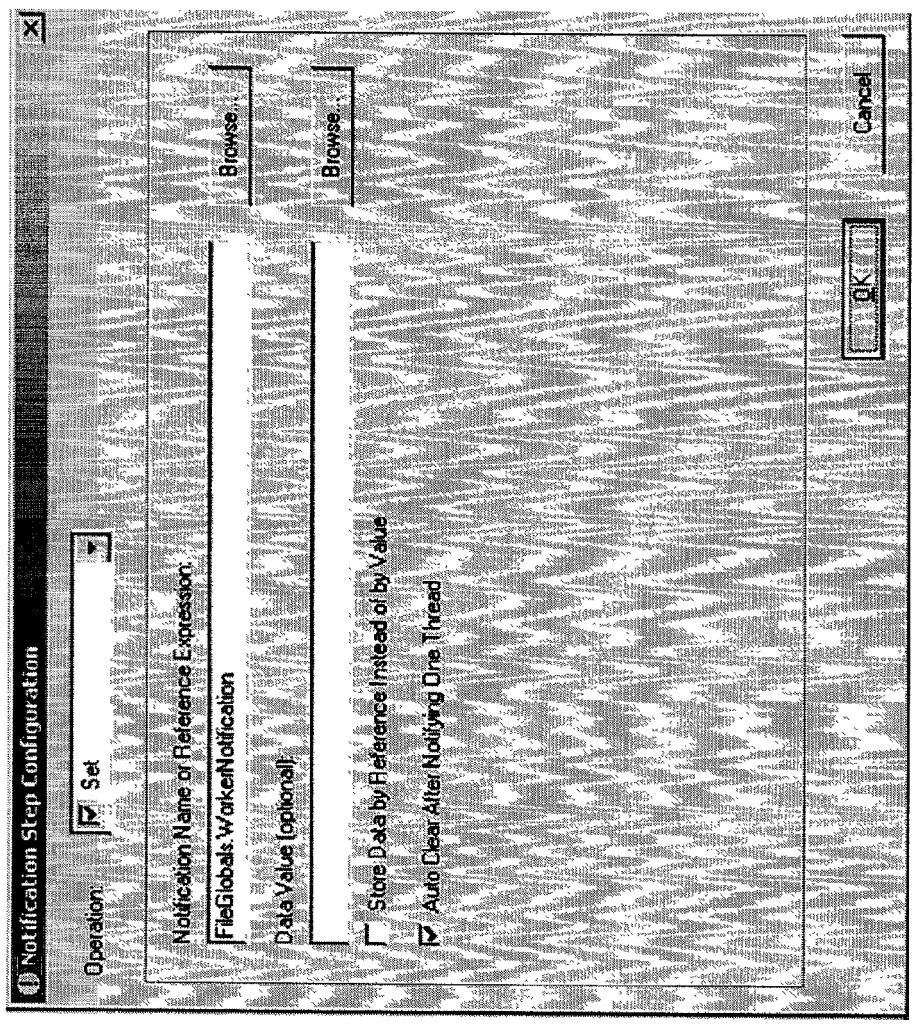

The Set operation may be used to notify one or more threads that an event has occurred or a condition has been met. When the notification is in a Set state, Wait operations on the notification succeed immediately. FIG. 29 illustrates an exemplary dialog box for configuring a Notification step, in which a "Set" option has been selected for the operation. The following GUI controls enable the user to configure the Set operation:

Notification Name or Reference Expression—This control may be used to specify the notification on which to perform the operation. The user can specify the notification by name or by an ActiveX reference received when the notification is created with the Using ActiveX Reference lifetime option.

Data Value—This control may be used to specify an optional data element to store with the set state of the notification. Threads that wait on the notification can then optionally retrieve this data. The data can be any type, including a number, string, Boolean, ActiveX reference, structured type (container), or arrays of these types. When a thread later waits on the notification, the element may be stored into a location of the appropriate type. By default, the notification may store a copy of the value. However, if the user enables the Store Data by Reference Instead of by Value option, the operation may store a reference, e.g., an ActiveX reference, to the value instead. If this reference is later stored into an ActiveX reference variable in the Wait operation, the data may be accessed. For example, the TestStand test executive environment provides a TestStand ActiveX API PropertyObject interface and ActiveX Automation Adapter that may be used to access the data.

Store Data by Reference Instead of by Value—This control may be used to specify how to store the data specified in the Data Value control. The user may enable the option to store a reference to the property. The user may disable the option to store a copy of the data.

Auto Clear After Notifying One Thread—This control may be used to specify whether to clear the state of the notification after one thread receives the notification. Once the state of a notification is cleared, subsequent Wait operations block until another Set operation is performed.

Clear Operation

Figure 30:
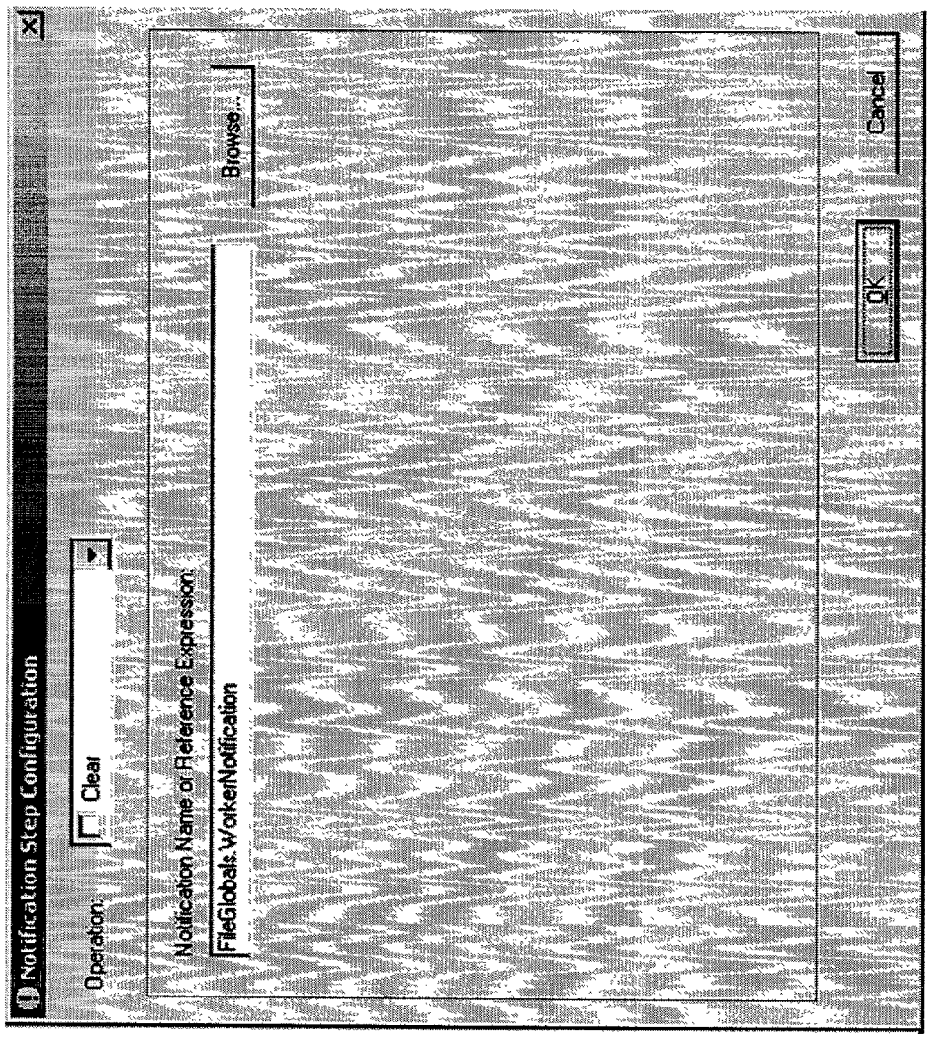

The Clear operation may be used to clear the state of a notification so that subsequent Wait operations block until the next Set operation. FIG. 30 illustrates an exemplary dialog box for configuring a Notification step, in which a "Clear" option has been selected for the operation. The following GUI controls enable the user to configure the Clear operation:

Notification Name or Reference Expression—This control may be used to specify the notification on which to perform the operation. The user can specify the notification by name or by an ActiveX reference received when the notification is created with the Using ActiveX Reference lifetime option.

Pulse Operation

Figure 31:
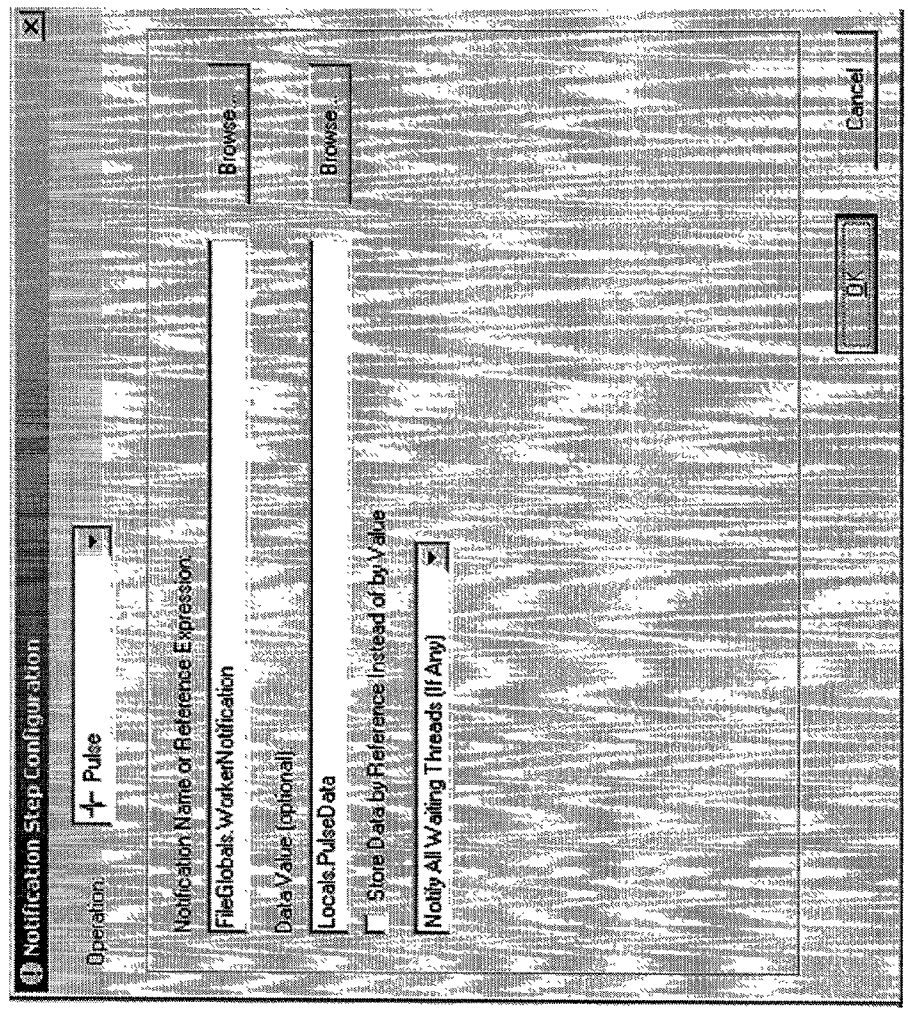

The Pulse operation may be used to notify one or all currently waiting threads. This operation differs from the Set operation in that it notifies only threads that are already waiting when the Pulse operation occurs. Threads that wait on the notification after a Pulse operation occurs block until a Set or Pulse operation is performed on the notification again. A Pulse operation places the notification in a Cleared state, even if the notification was in a Set state before the Pulse operation. FIG. 31 illustrates an exemplary dialog box for configuring a Notification step, in which a "Pulse" option has been selected for the operation. The following GUI controls enable the user to configure the Pulse operation:

Notification Name or Reference Expression—This control may be used to specify the notification on which to perform the operation. The user can specify the notification by name or by an ActiveX reference received when the notification is created with the Using ActiveX Reference lifetime option.

Data Value—This control may be used to specify an optional data element to send with the pulse notification. The data can be of any type (e.g., number, string, Boolean, ActiveX reference, structured type (container), or arrays of these types). When a thread later waits on the notification, the element may be stored into a location of the appropriate type. By default, the notification may store a copy of the specified data value. However, if the user enables the Store Data by Reference Instead of by Value option, the operation may store a reference, e.g., an ActiveX reference, to the value instead. If this reference is later stored into an ActiveX reference variable in the Wait operation, the data may be accessed. For example, the TestStand test executive environment provides a TestStand ActiveX API PropertyObject interface and ActiveX Automation Adapter that may be used to access the data.

Store Data by Reference Instead of by Value—This control may be used to specify how to store the data the user specify in the "Data Value" control. The user may enable the option to store an ActiveX reference to the property. The user may leave the option disabled to store a copy of the data.

Notify All/First Waiting Thread/s (If Any)—This control may be used to specify whether to notify all currently waiting threads or just the first waiting thread.

Wait Operation

Figure 32:
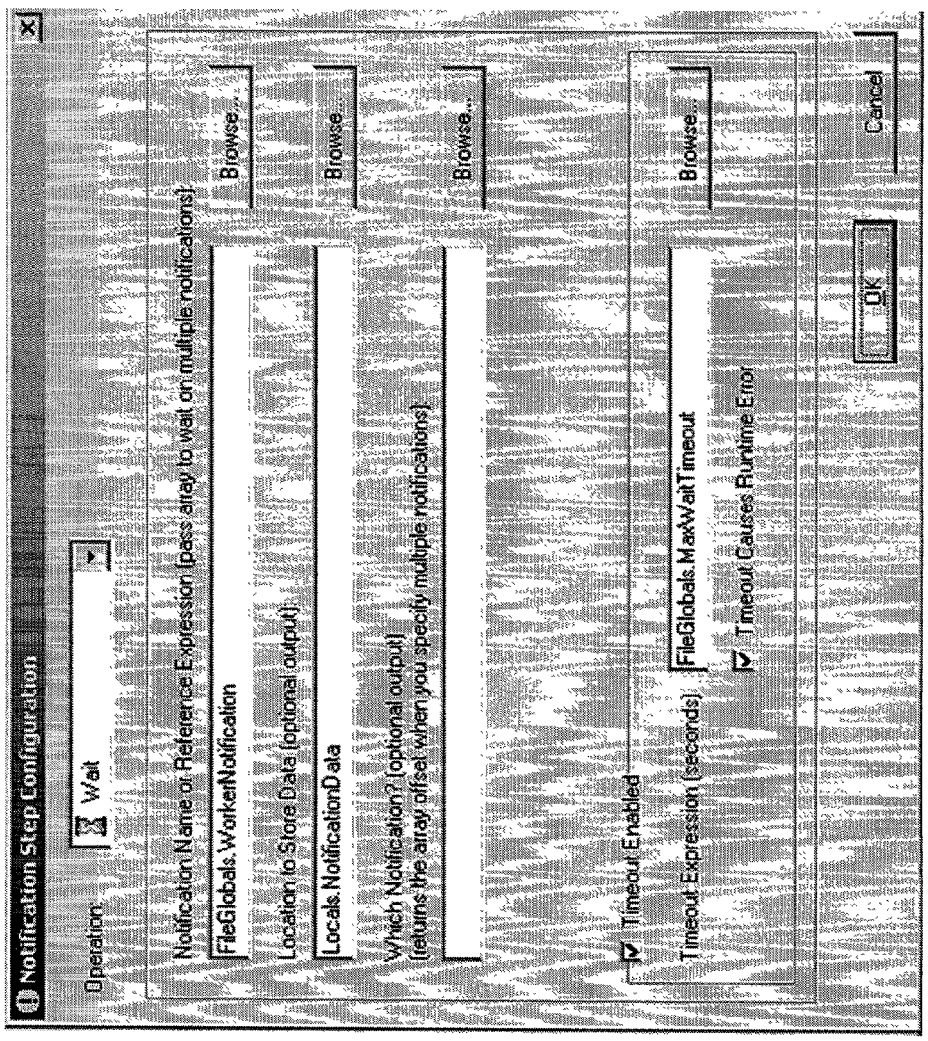

The Wait operation may be used to wait until a Set or Pulse operation is performed on the notification. If the notification is already in a Set state, the Wait operation completes immediately. FIG. 32 illustrates an exemplary dialog box for configuring a Notification step, in which a "Wait" option has been selected for the operation. The following GUI controls enable the user to configure the Wait operation:

Notification Name or Reference Expression (can pass array)—This control may be used to specify the notification on which to perform the operation. The user can specify the notification by name or by an ActiveX reference received when the notification is created with the Using ActiveX Reference lifetime option. The Wait operation may allow the user to specify multiple notifications using either a string array containing the names of the notifications or an ActiveX reference array containing ActiveX references to the notifications. When the user specifies multiple notifications, the Wait operation may wait until a Set or Pulse operation is performed on any of the notifications in the array. If more than one of the notifications is set or pulsed, the Wait operation may respond to the notification that appears first in the array. To ascertain which notification the Wait operation responds to, the Which Notification control may be used to specify a location to store the array offset of the notification.

Location to Store Data—This control may be used to specify a location to store the notification data, e.g., wherein the type of the location is compatible with the data that the notification sends. The user may leave this control blank if the user does not want to store the data. FIG. 33 is a table illustrating the outcomes, according to one embodiment, when notification data is stored by value. FIG. 34 is a table illustrating the outcomes, according to one embodiment, when notification data is stored by reference. In these tables, "Simple Type" refers to a number, string, Boolean, array of any type, or other simple type, and "Structured Type" refers to an instance of a user-defined type where the root property is a container.

Which Notification—This control may be used to specify a location to store the array offset of the notification to which the operation responds. Typically, this control is only used when waiting for multiple notifications. Waiting for multiple notifications is described above.

Timeout Enabled, Timeout Expression, Timeout Causes Run-Time Error—These controls may be used to specify a timeout and timeout behavior when waiting for a notification. If a timeout occurs, the property Step.Result.TimeoutOccurred is set to True.

Get Status Operation

Figure 35:
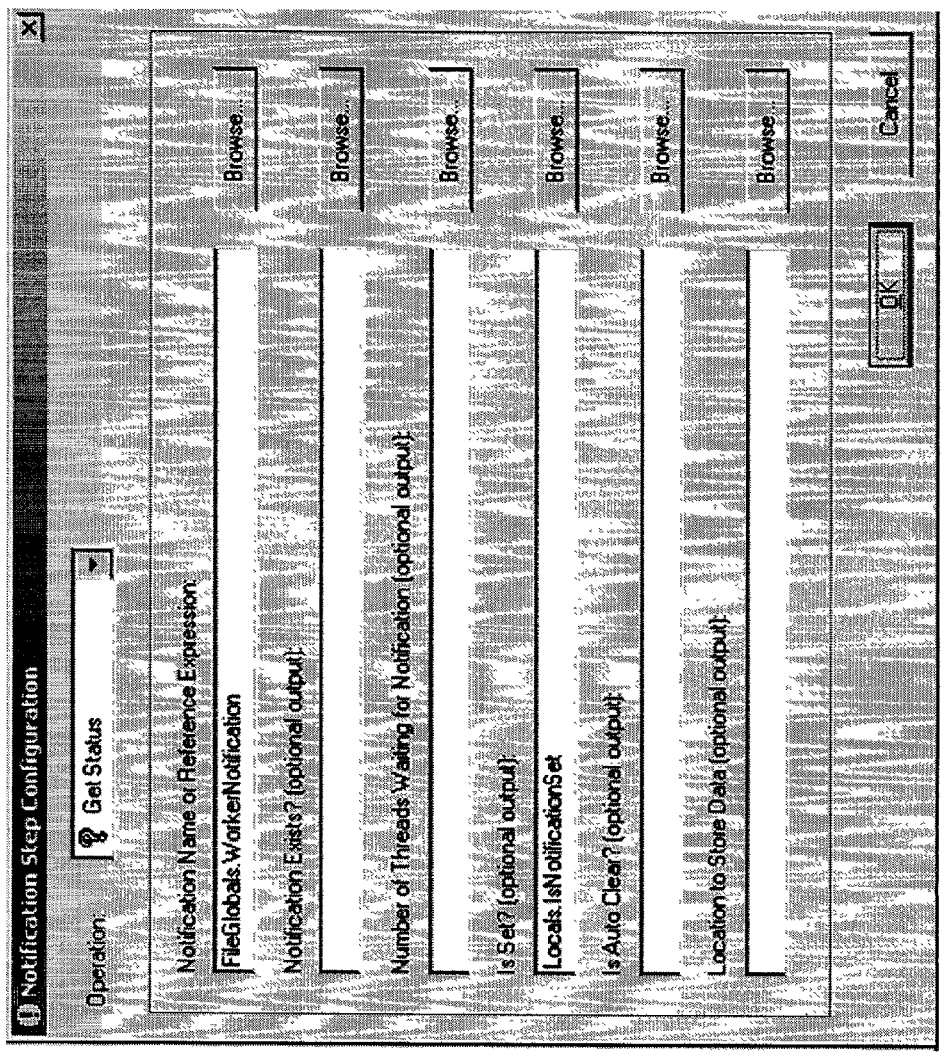

The Get Status operation may be used to get information about the state of the notification object. FIG. 35 illustrates an exemplary dialog box for configuring a Notification step, in which a "Get Status" option has been selected for the operation. The following GUI controls enable the user to configure the Get Status operation:

Notification Name or Reference Expression—This control may be used to specify the synchronization object on which to perform the operation. The user can specify the notification by name or by an ActiveX reference received when the notification is created with the Using ActiveX Reference lifetime option.

Notification Exists—This control may be used to specify a location to store a Boolean value that indicates whether the synchronization object exists.

Number of Threads Waiting for Notification—This control may be used to specify a location to store a numeric value that indicates the number of threads waiting on the notification.

Is Set—This control may be used to specify a location to store a Boolean value that indicates whether the notification is in a Set state.

Is Auto Clear—This control may be used to specify a location to store a Boolean value that indicates whether the notification clears itself after one thread receives the notification.

Location to Store Data—This control may be used to specify a location to store the notification data, if any, wherein the type of the location is compatible with the data that the notification sends. The user may leave this control blank if the user does not want to store the data.

Notification Step Properties

Figure 36:
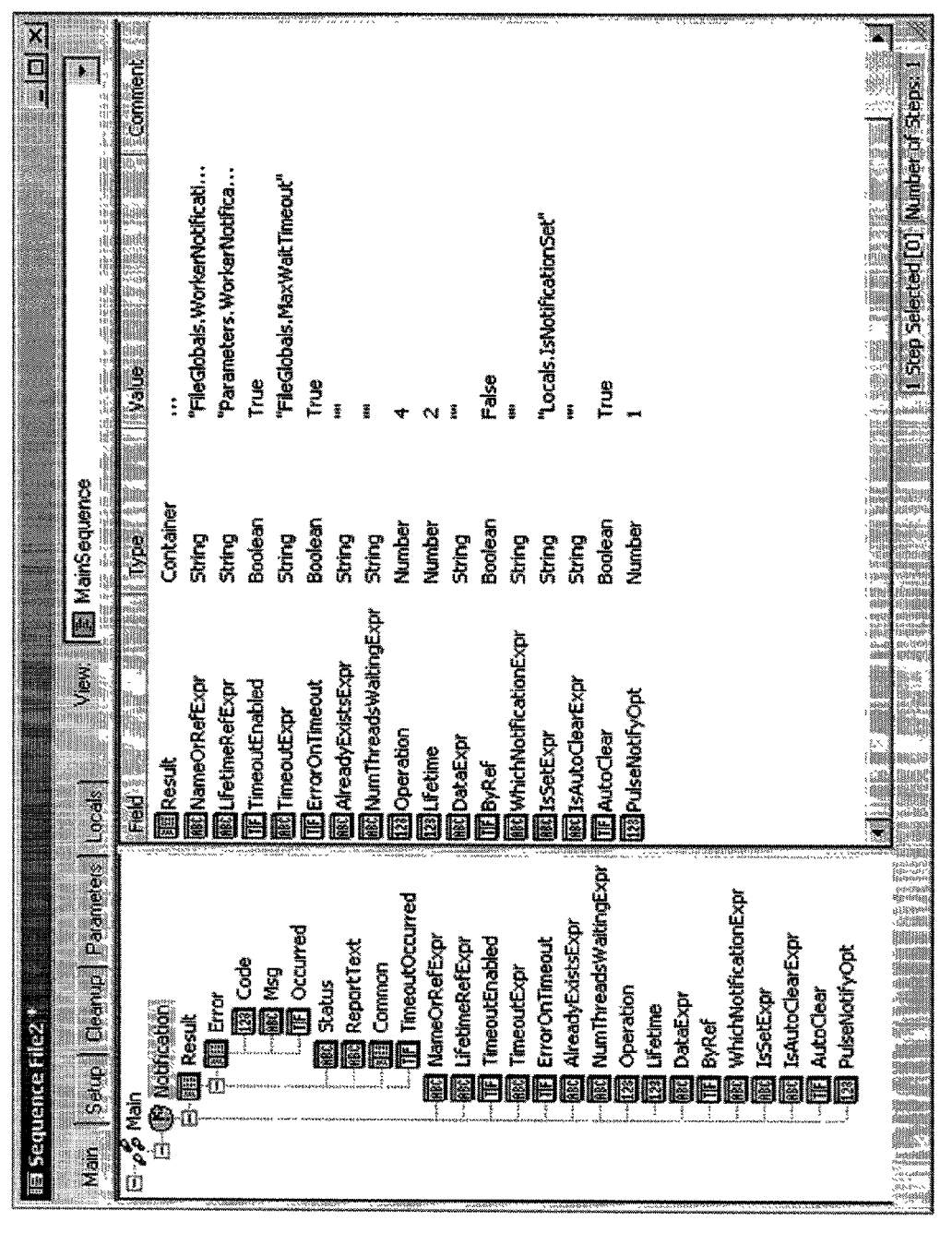

The Notification step type may define various Notification step properties in addition to the common custom properties. For example, FIG. 36 illustrates the following Notification step properties:

Step.Result.TimeoutOccurred is set to True if a Wait operation times out. This property exists only if the step is configured for the Wait operation.

Step.NameOrRefExpr contains the Notification Name Expression for the Create operation and the Notification Name or Reference Expression for all other operations. In the case of the Wait operation, this expression can optionally specify an array of names or references.

Step.LifetimeRefExpr contains the ActiveX reference expression for the notification lifetime when the user sets the lifetime to Use ActiveX Reference.

Step.TimeoutEnabled contains the Timeout Enabled setting for the Wait operation.

Step.TimeoutExpr contains the Timeout Expression, in seconds, for the Wait operation.

Step.ErrorOnTimeout contains the Timeout Causes Run-Time Error setting for the Wait operation.

Step.AlreadyExistsExpr contains the Already Exists expression for the Create operation or the Notification Exists expression for the Get Status operation.

Step.NumThreadsWaitingExpr contains the expression that specifies where to store the number of threads that are waiting on the notification for the Get Status operation.

Step.Operation contains a value that specifies the operation the step is set to perform. In one embodiment, the valid values are 0=Create, 1=Set, 2=Clear, 3=Pulse, 4=Wait, 5=Get Status.

Step.Lifetime contains a value that specifies the lifetime setting for the Create operation. In one embodiment, the valid values are 0=Same as Sequence, 1=Same as Thread, 2=Use ActiveX Reference.

Step.DataExpr contains the Data Value expression for the Set or Pulse operation, or the Location to Store Data expression for the Wait or Get Status operation.

Step.ByRef contains the Boolean value that specifies whether to store the data by ActiveX reference instead of by value for a Set or Pulse operation.

Step.WhichNotificationExpr contains the expression that specifies where to store the array offset of the notification to which the Wait operation responds.

Step.IsSetExpr contains the expression that specifies where to store the Boolean value that indicates whether the notification is in a Set state. The Get Status operation uses this expression.

Step.IsAutoClearExpr contains the expression that specifies where to store the Boolean value that indicates whether the notification is configured to auto clear. The Get Status operation uses this expression.

Step.AutoClear contains the Auto Clear setting for the Set operation.

Step.PulseNotifyopt contains the setting for the Pulse operation that indicates the threads to which a pulse notification is sent. In one embodiment, the valid values are 0=Notify First Waiting Thread, 1=Notify All Waiting Threads.

Batch Specification Step Type

When the user writes a process model, the user can use Batch Specification steps to define a group of threads where each thread in the group runs an instance of the client sequence. The user can define a group so that batch synchronization operations can be performed on the threads in the group. For example, the TestStand Batch process model uses Batch Specification steps to create a batch that contains a thread for each TestSocket. For more information on the TestStand Batch process model, please refer to the section on the Batch process model in the Process Models chapter of the TestStand User manual, available from National Instrument Corp. For more information on batch synchronization, please see the section below on the Batch Synchronization step type.

Create Operation

Figure 37:
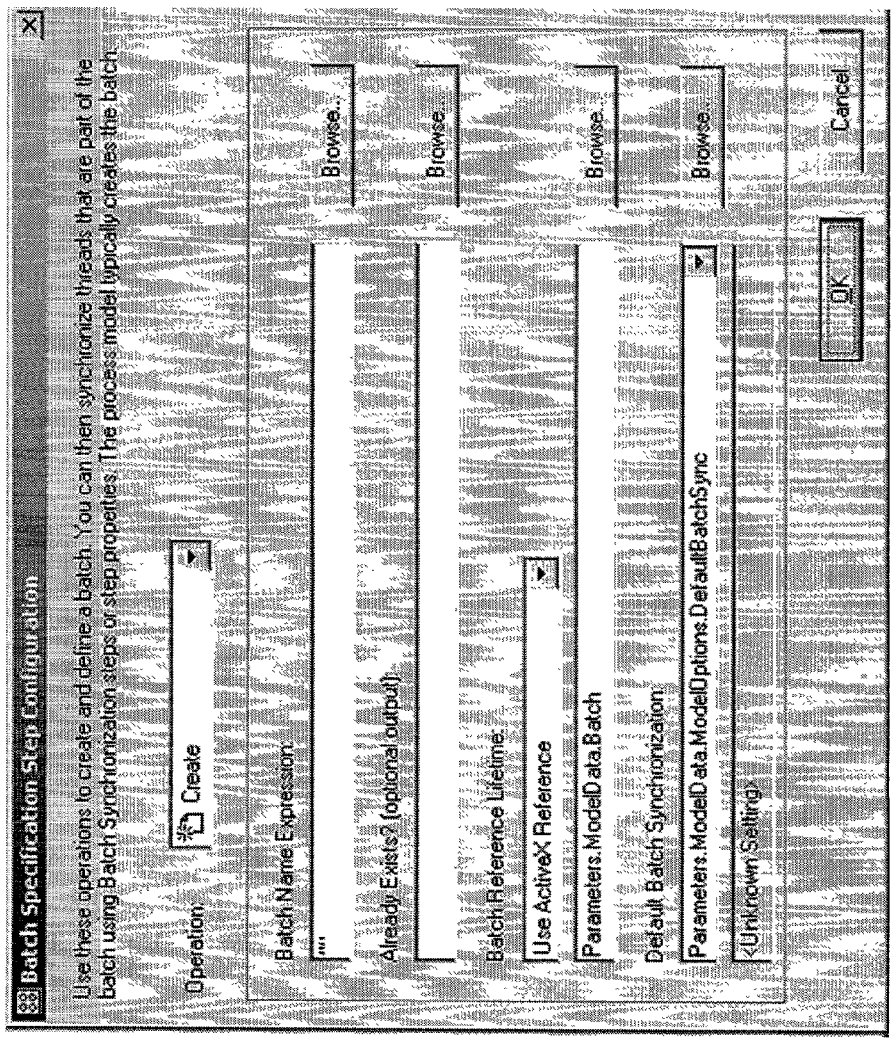

To create a reference to a new or existing batch object, the user may insert a Batch Specification step and configure the step, e.g., by selecting a "Configure Batch Specification" item from a context menu for the step. FIG. 37 illustrates an exemplary dialog box for configuring a Batch Specification step, in which a "Create" option has been selected for the operation. The following GUI controls enable the user to configure the Create operation:

Batch Name Expression—This control may be used to specify a unique name for the synchronization object using a string literal or an expression that evaluates to a string. Synchronization object names are described in more detail above.

Already Exists—This control may be used to specify a location to store a Boolean value that indicates whether the synchronization object already exists.

Batch Reference Lifetime—This control may be used to specify the lifetime of the reference to the synchronization object.

Default Batch Synchronization—This control may be used to specify the default method of batch synchronization to use with the batch object.

Add Thread Operation

Figure 38:
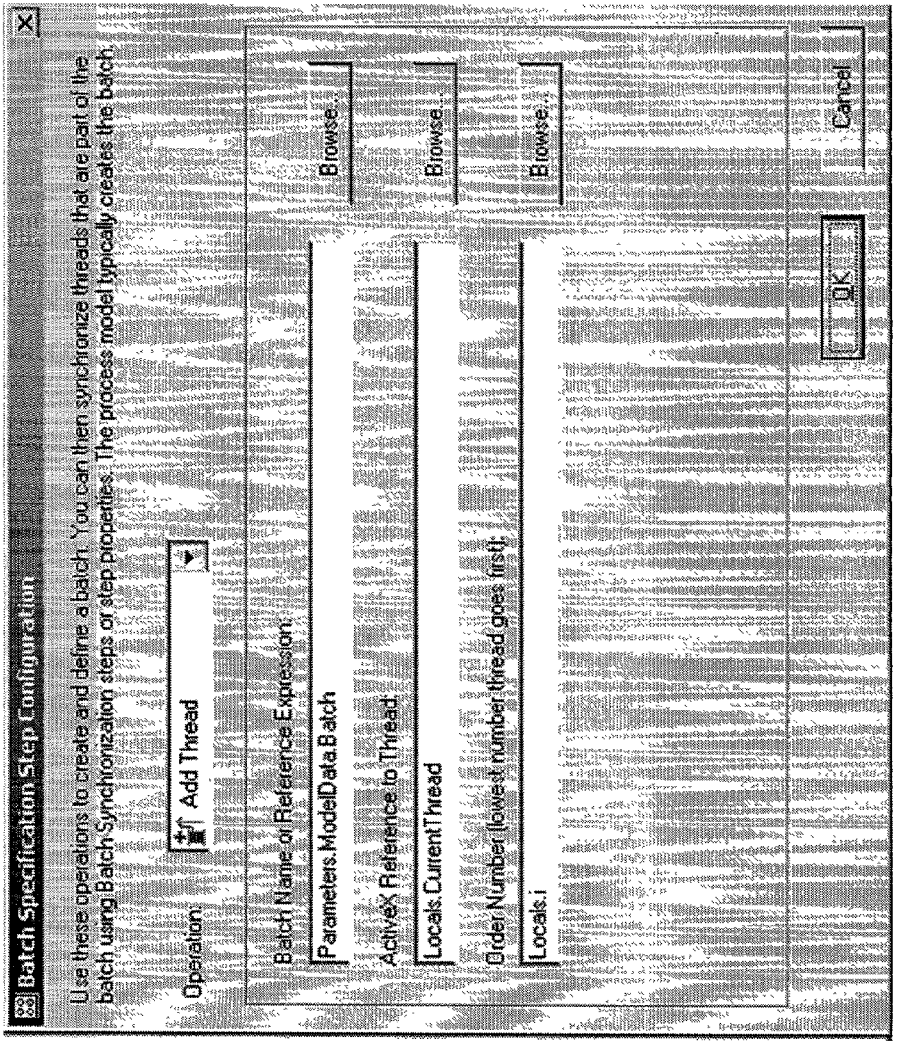

The Add Thread operation may be used to add a thread to a group of batch threads. FIG. 38 illustrates an exemplary dialog box for configuring a Batch Specification step, in which an "Add Thread" option has been selected for the operation. The following GUI controls enable the user to configure the Add Thread operation:

Batch Name or Reference Expression—This control may be used to specify the batch on which to perform the operation. The user can specify the batch by name or by an ActiveX reference received when the batch is created with the Using ActiveX Reference lifetime option.

ActiveX Reference to Thread—This control may be used to specify a thread to add to the batch. A thread can belong to only one batch at a time. Adding a thread to a batch removes the thread from its previous batch, if any. Additionally, when a thread terminates, it removes itself from the batch.

Order Number—This control may be used to specify the order in which threads enter synchronized sections. Threads with a lower order number enter a synchronized section before threads with a higher order number.

Remove Thread Operation

Figure 39:
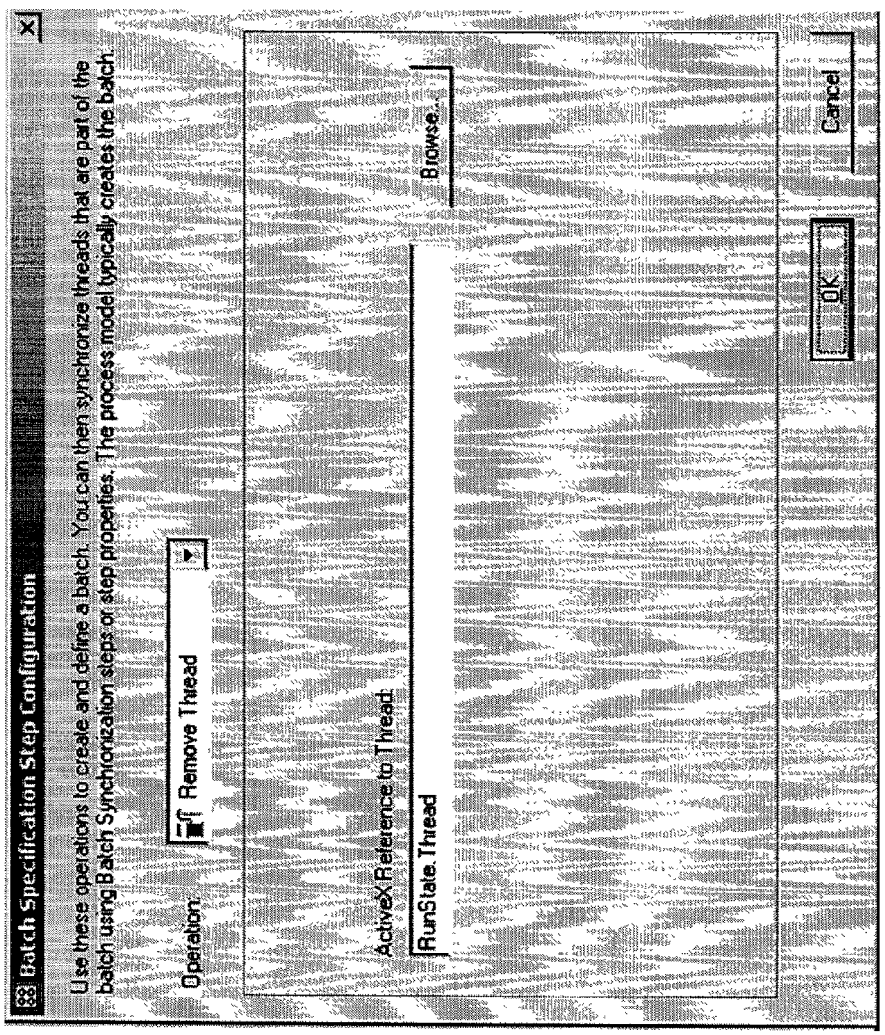

The Remove Thread operation may be used to remove a thread from a group of batch threads. FIG. 39 illustrates an exemplary dialog box for configuring a Batch Specification step, in which a "Remove Thread" option has been selected for the operation. The following GUI controls enable the user to configure the Remove Thread operation:

ActiveX Reference to Thread—This control may be used to specify the thread to remove from its batch.

Get Status Operation

Figure 40:
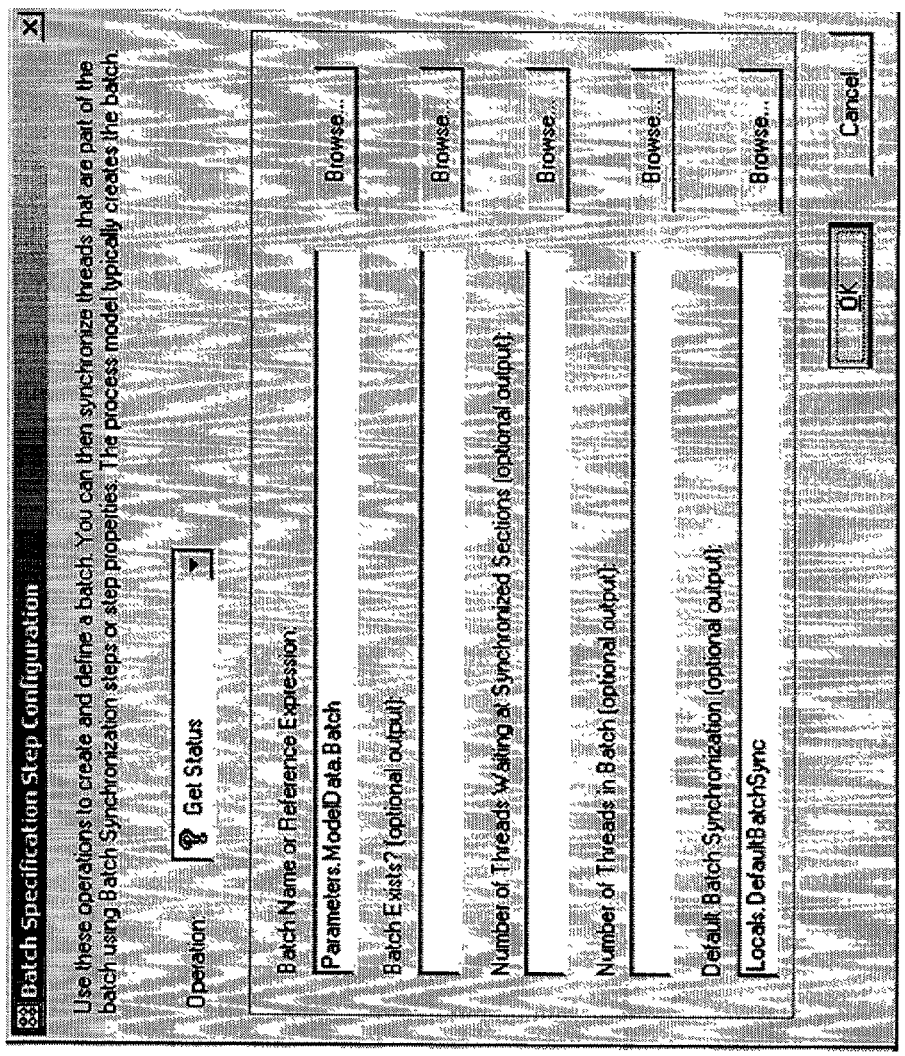

The Get Status operation may be used to obtain information about the current state of the batch. FIG. 40 illustrates an exemplary dialog box for configuring a Batch Specification step, in which a "Get Status" option has been selected for the operation. The following GUI controls enable the user to configure the Get Status operation:

Batch Name or Reference Expression—This control may be used to specify the batch on which to perform the operation. The user can specify the batch by name or by an ActiveX reference received when the batch is created with the Using ActiveX Reference lifetime option.

Batch Exists?—This control may be used to specify a location to store a Boolean value that indicates whether the batch already exists.

Number of Threads Waiting at Synchronized Sections—This control may be used to specify a location to store a numeric value that indicates the number of threads waiting to enter or exit synchronized sections.

Number of Threads in Batch—This control may be used to specify a location to store the numeric value indicating the number of threads that are currently part of the batch.

Default Batch Synchronization—This control may be used to specify a location to store a numeric value indicating the default method of batch synchronization that the batch uses.

Batch Specification Step Properties

Figure 41:
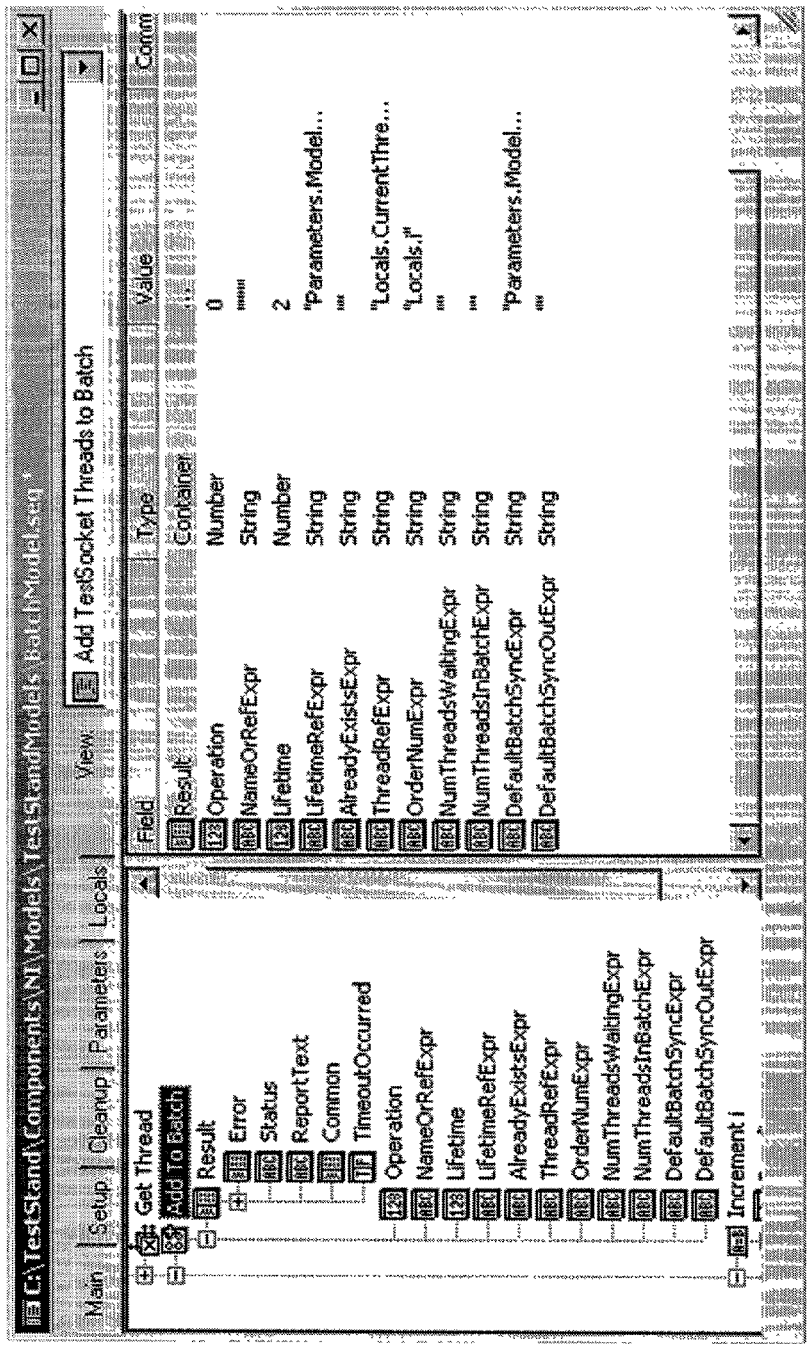

The Batch Specification step type may define various Batch Specification step properties in addition to the common custom properties. For example, FIG. 41 illustrates the following Batch Specification step properties:

Step.Operation contains a value that specifies the operation the step performs. In one embodiment, the valid values are 0=Create, 1=Add Thread, 2=Remove Thread, 3=Get Status.

Step.NameOrRefExpr contains the Name expression for the Create operation and the Name or Reference expression for other batch operations.

Step.Lifetime contains a value that specifies the lifetime for the Create operation. In one embodiment, the valid values are 0="Same as Sequence", 1="Same as Thread", 2="Use ActiveX Reference".

Step.LifetimeRefExpr contains the ActiveX reference expression for the batch lifetime when the user sets the lifetime to "Use ActiveX Reference".

Step.AlreadyExistsExpr contains the "Already Exists" expression for the Create operation or the "Batch Exists" expression for the Get Status operation.

Step.ThreadRefExpr contains the "ActiveX Reference to Thread" expression for the Add Thread and Remove Thread operations.

Step.OrderNumExpr contains the "Order Number" expression for the Add Thread operation.

Step.NumThreadsWaitingExpr contains the "Number of Threads Waiting at Synchronized Sections" expression for the Get Status operation.

Step.NumThreadsInBatchExpr contains the "Number of Threads in Batch" expression for the Get Status operation.

Step.DefaultBatchSyncExpr contains the "Default Batch Synchronization" expression for the Create operation.

Step.DefaultBatchSyncOutExpr contains the "Default Batch Synchronization" expression for the Get Status operation.

Batch Synchronization Step Type

Batch Synchronization steps may be used to define sections of a sequence in which to synchronize multiple threads that belong to one batch. Typically, the user uses these steps in a sequence executed using the Batch process model.

Synchronized Sections

Batch Synchronization steps may be used to define synchronized sections by placing a step at the beginning and end of a section of steps in a sequence and specifying an Enter operation for the beginning step and an Exit operation for the ending step. The Enter and Exit steps may be placed in the same sequence, but do not have to be placed in the same step group. There may be various types of synchronized sections. For example, in one embodiment, there are three types of synchronized sections: "serial section", "parallel section", and "one-thread-only section". In one embodiment, all synchronized sections have the following properties in common:

Each thread in a batch that enters a synchronized section blocks at the Enter step until all other threads in the batch arrive at their respective instances of the Enter step.

Each thread in a batch that reaches the end of the synchronized section blocks at the Exit step until all other threads in the batch arrive at their respective instances of the Exit step.

Serial Sections

A serial section may be used to ensure that each thread in the batch executes the steps in the section sequentially and in the order specified when the batch is created. When all threads in a batch arrive at their respective instances of an Enter step for a serial section, the threads may be released one at a time in ascending order according to Order Numbers assigned to the threads when the threads are added to the batch using the Batch Specification step. As each thread reaches the Exit step for the section, the next thread in the batch may proceed from the Enter step. After all the threads in the batch arrive at the Exit step, they exit the section together.

Parallel Sections

When all threads in a batch arrive at their respective instances of an Enter step for a parallel section, the threads may be released all at once. Each thread that arrives at the Exit step for the section may block until all threads in the batch reach that step.

One-Thread-Only Sections

A one-thread-only section may be used to specify that only one thread in the batch executes the steps in the section. Typically, this section type is used to perform an operation that applies to the batch as a whole, such as raising the temperature in a test chamber. When all threads in a batch arrive at their respective instances of an Enter step for a one-thread-only section, only the thread with the lowest Order Number may be released. When that thread arrives at the Exit step for the section, all remaining threads in the batch step may jump from the Enter step to the Exit step, skipping the steps within the section. The threads in the batch may then exit the section together.

Mismatched Sections

Sections become "mismatched" when all threads in a batch are blocked at an Enter or an Exit operation, but they are not all blocked at the same Enter or Exit operation. This can occur when a sequence has a conditional flow of execution due to preconditions, post actions, or other flow control operations. In one embodiment, when mismatched sections are detected, the situation may be handled as follows:

The thread that is at the Enter or Exit step that appears earliest in the hierarchy of sequences and subsequences proceeds as if all threads in the batch are at the same step.

If multiple Enter and Exit operations are equally early in the hierarchy of sequences and subsequences, Enter operations proceed first.

Nested Sections

Nesting of sections can occur either within the same sequence or as a result of calling a subsequence inside of a synchronized section when the subsequence also contains a synchronized section. When one section is nested inside another, the inner section may be honored if the type of the outer section is Serial or Parallel. For example, if one serial section is nested in another serial section, each thread that enters the outer section may proceed only until the Enter step of the inner section and may then wait for the other threads to reach the same step. The inner section may be ignored if the type of the outer section is "One-Thread-Only".

Enter Synchronized Section Operation

Figure 42:
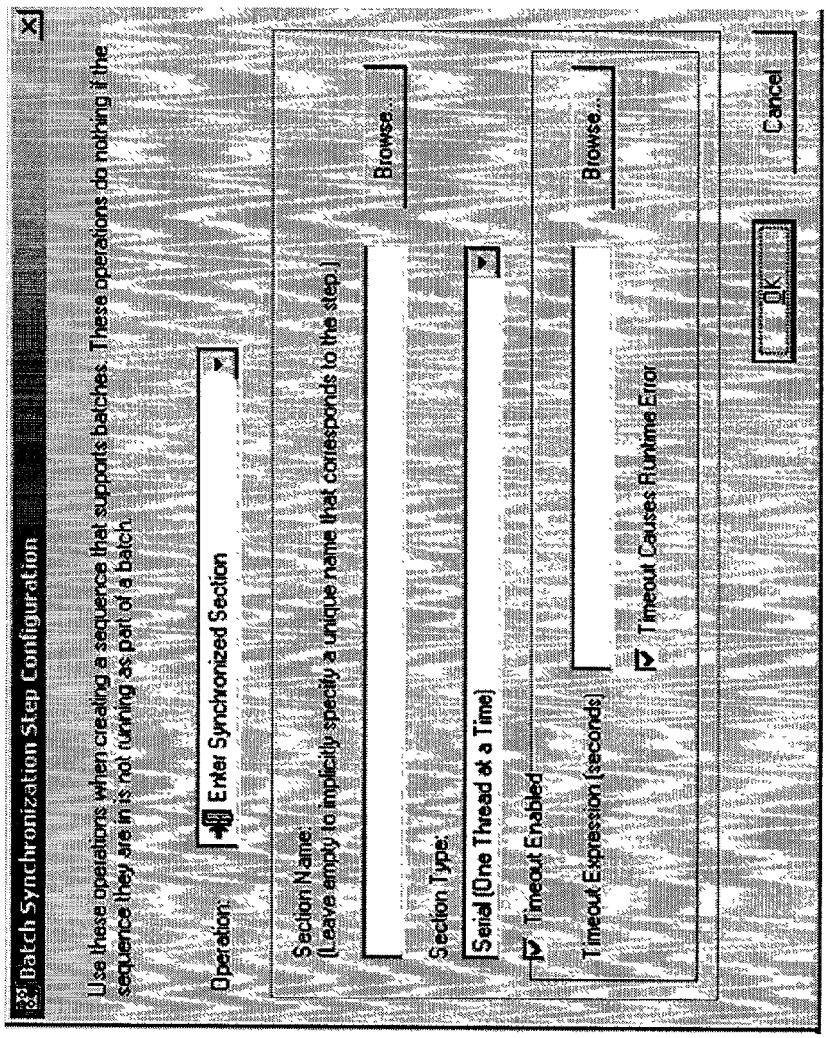

The Enter Synchronized Section operation may be used to mark the beginning of a synchronized section and to define the type of synchronization for that section. FIG. 42 illustrates an exemplary dialog box for configuring a Batch Synchronization step, in which an "Enter Synchronized Section" option has been selected for the operation. The following GUI controls enable the user to configure the Enter Synchronized Section operation:

Section Name—This control may be used to specify a name for the synchronized section, or the control may be left blank if the user wants a unique name to be automatically generated based on the step name.

Section Type—This control may be used to specify the type of synchronized section.

Timeout Enabled, Timeout Expression, Timeout Causes Run-Time Error—These controls may be used to specify a timeout and timeout behavior for when a thread must wait at the Enter step. If a timeout occurs, the property Step.Result.TimeoutOccurredis set to True.

Exit Synchronized Section Operation

Figure 43:

The Exit Synchronized Section operation may be used to mark the end of a synchronized section. FIG. 43 illustrates an exemplary dialog box for configuring a Batch Synchronization step, in which an "Exit Synchronized Section" option has been selected for the operation. The following GUI controls enable the user to configure the Exit Synchronized Section operation:

Section Name—This control may be used to specify the name of the synchronized section to exit, or the control may be left blank to refer the most nested section.

Timeout Enabled, Timeout Expression, Timeout Causes Run-Time Error—These controls may be used to specify a timeout and timeout behavior for when a thread must wait at the Exit step. If a timeout occurs, the property Step.Result.TimeoutOccurred is set to True.

Exit All Sections in Current Sequence Operation

Figure 44:
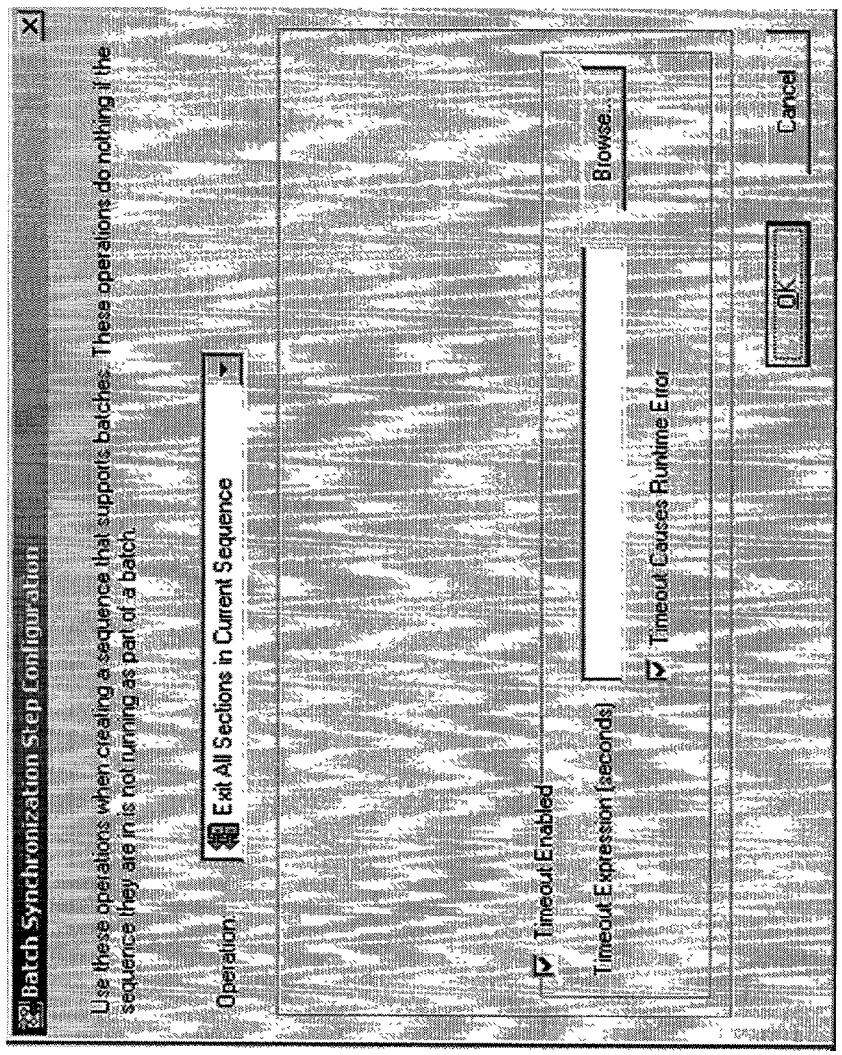

The Exit All Sections in Current Sequence operation may be used to exit all the sections that a thread has entered in the current sequence. This is useful when the flow of execution for a thread jumps out of a synchronized section into a Cleanup step group because of a run-time error. Putting an Exit All Sections in Current Sequence step in the Cleanup step group ensures that the thread does not cause other threads to block at the end of that synchronized section or any nested synchronized sections. FIG. 44 illustrates an exemplary dialog box for configuring a Batch Synchronization step, in which an "Exit All Sections in Current Sequence" option has been selected for the operation. The following GUI controls enable the user to configure the Exit All Sections in Current Sequence operation:

Timeout Enabled, Timeout Expression, Timeout Causes Run-Time Error—These controls may be used to specify a timeout and timeout behavior for when a thread must wait at the Exit step. If a timeout occurs, the property Step.Result.TimeoutOccurrediS set to True.

Batch Synchronization Step Properties

Figure 45:
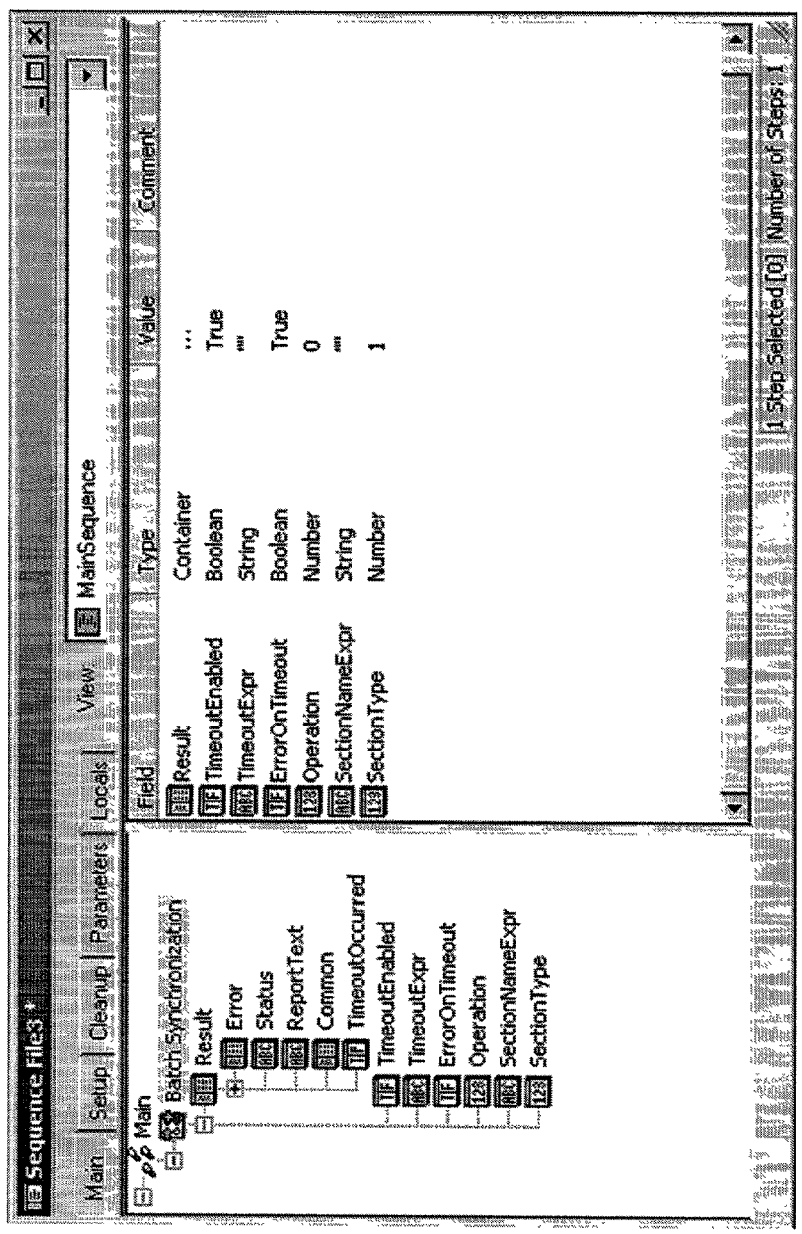

The Batch Synchronization step type may define various Batch Synchronization step properties in addition to the common custom properties. For example, FIG. 45 illustrates the following Batch Synchronization step properties:

Step.Result.TimeoutOccurred is set to True if an Enter or Exit operation times out.

Step.TimeoutEnabled contains the timeout enabled setting for the Enter or Exit operation.

Step.TimeoutExpr contains the timeout expression, in seconds, for the Enter or Exit operation.

Step.ErrorOnTimeout contains the Timeout Causes Run-Time Error setting for the Enter or Exit operation.

Step.Operation contains a value that specifies the operation the step performs. In one embodiment, the valid values are 0=Enter Synchronized Section, 1=Exit Synchronized Section, 2=Exit All Sections in Current Sequence.

Step.SectionNameExpr contains the expression that specifies the name of the section for the Enter or Exit operation.

Step.SectionType contains a value that specifies the type of section the Enter operation defines. In one embodiment, the valid values are 1=Serial, 2=Parallel, 3=One Thread Only.

Wait Step Type

Wait steps may be used to wait for an execution or thread to complete or for a time interval to elapse.

Wait for Time Interval Operation

Figure 46:
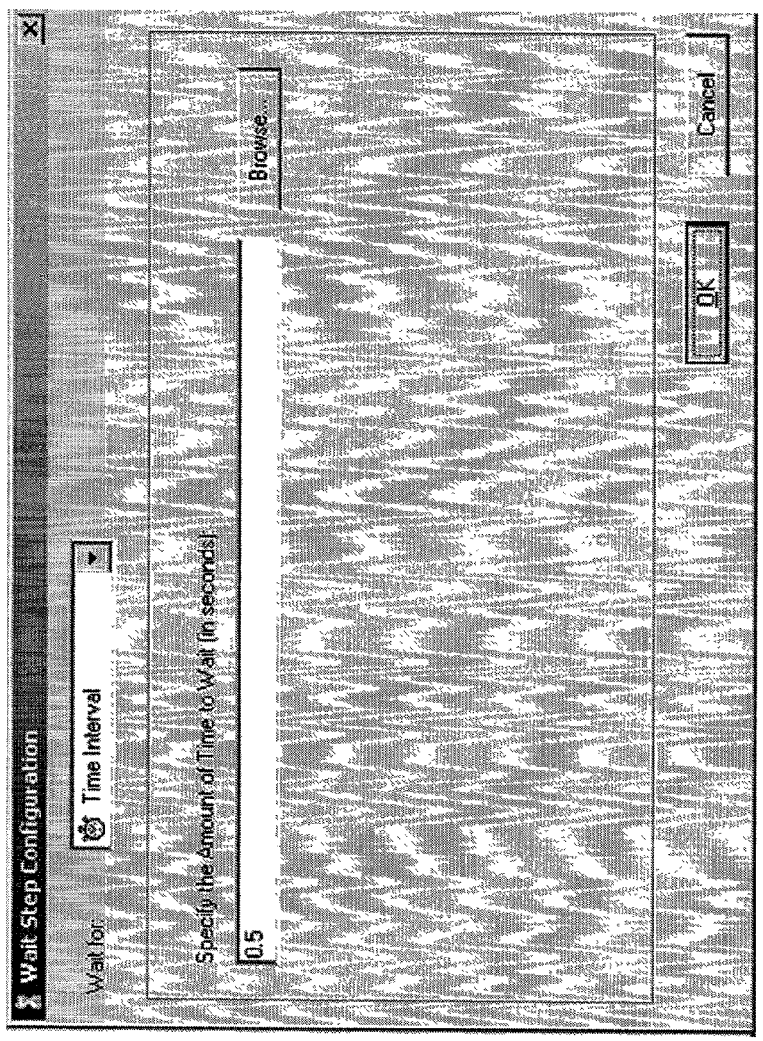

The Wait for Time Interval operation may be used to cause a thread to wait for a specified duration. The thread may sleep while waiting, thus relinquishing its processing time to other threads. FIG. 46 illustrates an exemplary dialog box for configuring a Wait step, in which a "Time Interval" option has been selected for the wait type. The following GUI controls enable the user to configure the Wait for Time Interval operation:

Specify the Amount of Time to Wait—This control may be used to specify a numeric expression that indicates the amount of time for the thread to wait in seconds.

Wait for Time Multiple Operation

Figure 47:
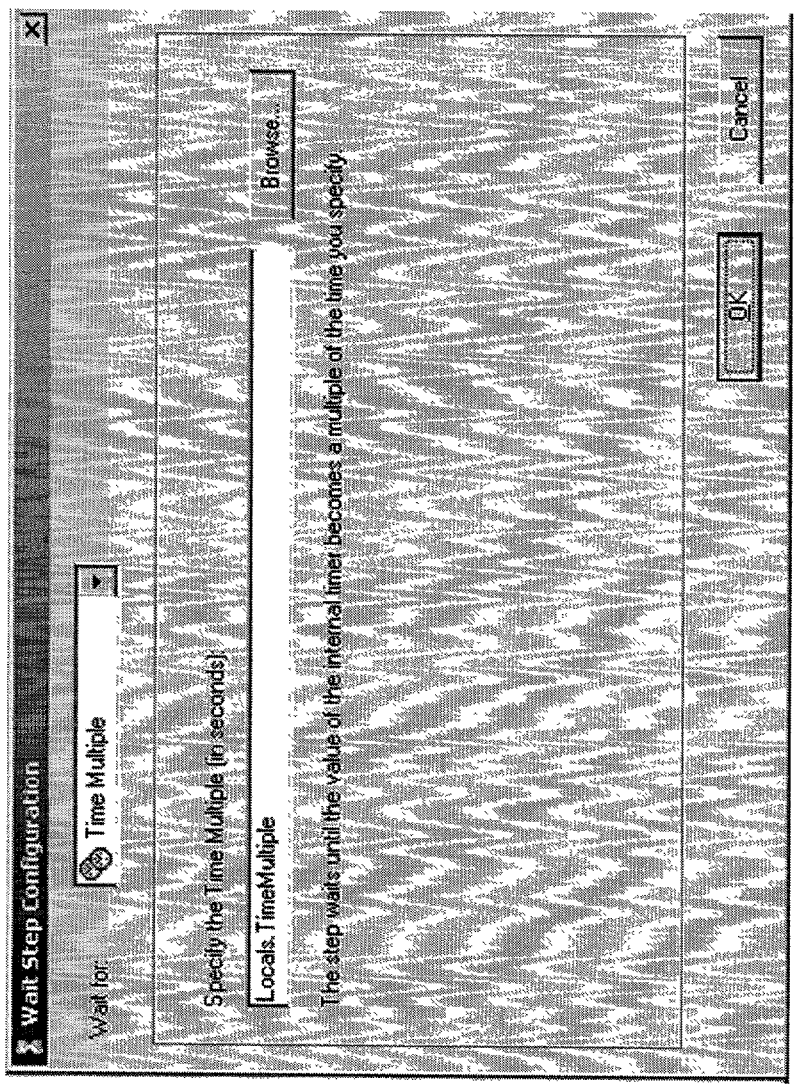

The Wait for Time Multiple operation may be used to cause a thread to wait until the value of the internal timer becomes a multiple of the specified time. A common use of the Wait for Time Multiple operation is to force a loop to cycle at a specific rate. FIG. 47 illustrates an exemplary dialog box for configuring a Wait step, in which a "Time Multiple" option has been selected for the wait type. The following GUI controls enable the user to configure the Wait for Time Multiple operation:

Specify the Time Multiple—This control may be used to specify a numeric expression that indicates the time multiple used in deciding how long to wait.

Wait for Thread Operation

Figure 48:
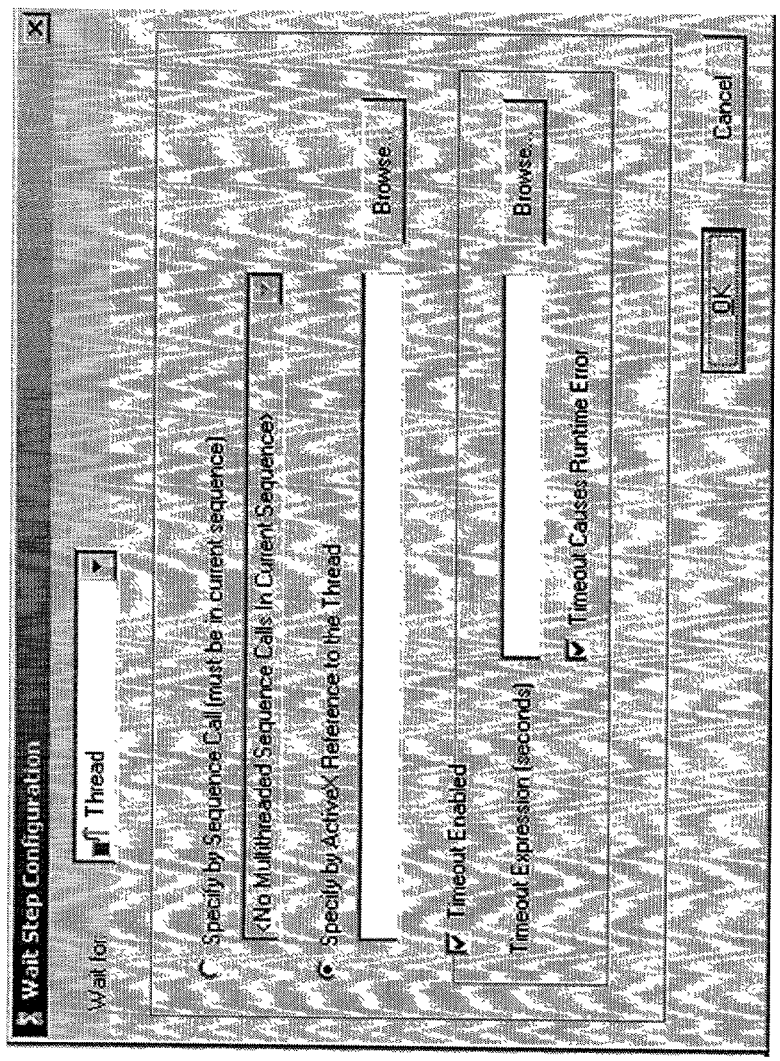

The Wait for Thread operation may be used to wait until an asynchronous sequence call thread completes and to retrieve its results. FIG. 48 illustrates an exemplary dialog box for configuring a Wait step, in which a "Thread" option has been selected for the wait type. The following GUI controls enable the user to configure the Wait for Thread operation:

Specify by Sequence Call—This control may be used to specify the thread to wait for by selecting an asynchronous sequence call within the same sequence as the wait step.

Specify by ActiveX Reference to Thread—This control may be used to specify the thread to wait for using an ActiveX reference to the thread. By specifying the thread with a reference variable, threads that other sequences and executions create can be referred to.

Timeout Enabled, Timeout Expression, Timeout, Causes Run-Time Error—These controls may be used to specify a timeout and timeout behavior when waiting for the thread to finish executing. If a timeout occurs, the property Step.Result.TimeoutOccurred is set to True.

Wait for Execution Operation

Figure 49:
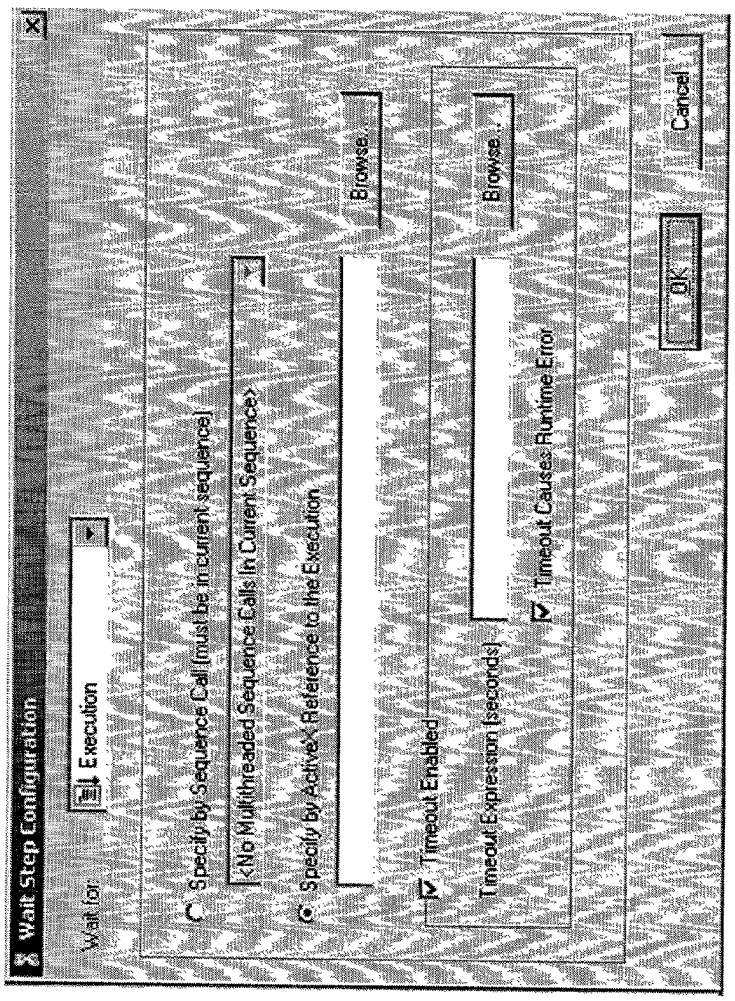

The Wait for Execution operation may be used to wait for the completion of an execution. FIG. 49 illustrates an exemplary dialog box for configuring a Wait step, in which an "Execution" option has been selected for the wait type. The following GUI controls enable the user to configure the Wait for Execution operation:

Specify an ActiveX Reference to the Execution—This control may be used to specify an ActiveX reference to the execution on which to wait.

Timeout Enabled, Timeout Expression, Timeout Causes Run-Time Error—These controls may be used to specify a timeout and timeout behavior when waiting for an execution. If a timeout occurs, the property Step.Result.TimeoutOccurred is set to True.

Wait Step Properties

Figure 50:
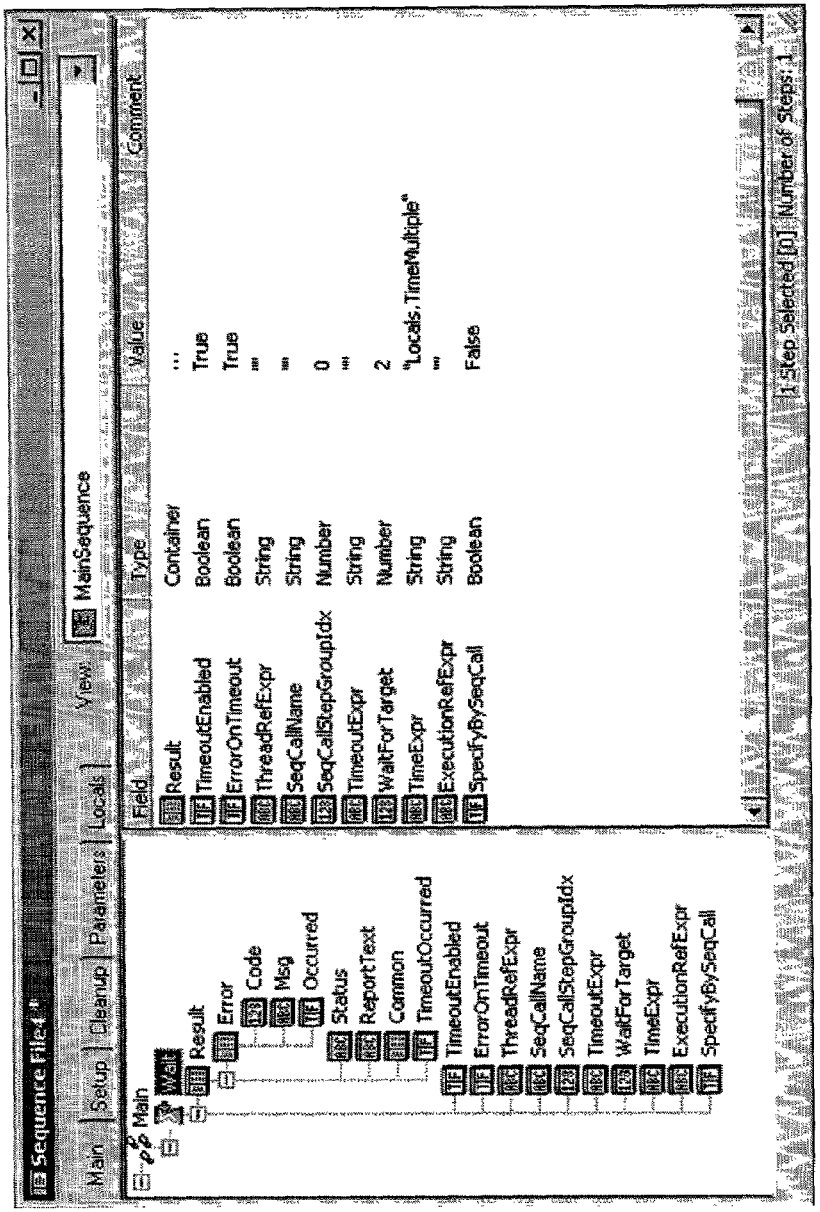

The Wait step type may define various Wait step properties in addition to the common custom properties. For example, FIG. 50 illustrates the following Wait step properties:

Step.Result.TimeoutOccurred is set to True if the Wait for Thread or Wait for Execution operation times out. This property exists only if the step is configured for one of these operations.

Step.TimeoutEnabled contains the timeout enabled setting for the Wait for Thread or the Wait for Execution operation.

Step.ErrorOnTimeout contains the Timeout Causes Run-Time Error setting for the Wait for Thread or the Wait for Execution operation.

Step.SpecifyBy contains the setting that the Wait for Thread operation uses to determine whether the step waits for a thread of a sequence call or waits for a thread object the user specifies using an ActiveX reference. In one embodiment, the valid values for this setting are SEQ_CALL, which indicates that the step specifies the thread by a sequence call, and $THREAD_{13}REF$, which indicates that the step specifies the thread with an ActiveX reference.

Step.ThreadRefExpr contains the thread reference expression for the Wait for Thread operation when the Step.SpecifyBy property is set to THREAD_REF.

Step.SeqCallName contains the name of the sequence call step that creates the thread the step waits for when the Step.SpecifyBy property is set to "SEQ_CALL".

Step.SeqCallStepGroupIdx contains the step group of the sequence call step that creates the thread that the step waits for when the Step.SpecifyBy property is set to SEQ_CALL. In one embodiment, the valid values are 0=Setup, 1=Main, 2=Cleanup.

Step.TimeoutExpr contains the timeout expression, in seconds, for the Wait for Thread or the Wait for Execution operation.

Step.WaitForTarget contains a value that specifies the type of wait operation the step performs. In one embodiment, the valid values are 0=Time Interval, 1=Time Multiple, 2=Thread, 3=Execution.

Step.TimeExpr contains the time expression for the Time Interval or Time Multiple operation of the step.

Step.ExecutionRefExpr contains the expression that evaluates to a reference to the execution on which the Wait for Execution operation waits.

Thread Priority Step Type

The Thread Priority step may be used to boost or lower the priority of a thread so that it receives more or less CPU time than other threads. The previous priority value of the thread may be saved and restored once the thread no longer requires the altered priority value.

Set Thread Priority Operation

Figure 51:
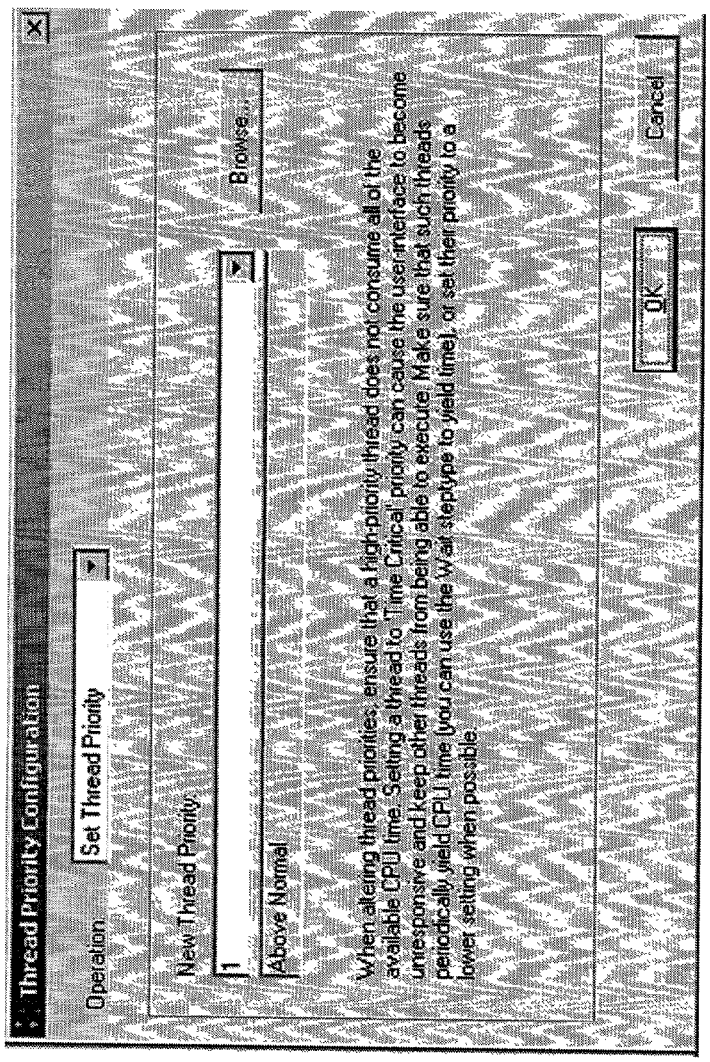

The Set Thread Priority operation may be used to raise or lower the priority of the current thread. FIG. 51 illustrates an exemplary dialog box for configuring a Thread Priority step, in which a "Set Thread Priority" option has been selected for the operation. The following GUI controls enable the user to configure the Set Thread Priority operation:

New Thread Priority—This control may be used to specify a numeric value expression that indicates the new priority for the thread. If the user specifies the priority as a numeric constant, the name that corresponds to that priority is shown in the indicator control below this control. The drop-down list for this control may be used to choose a priority constant for a predefined priority setting. In one embodiment, the predefined priority settings are: −15=Idle, −2=Low, −1=Below Normal, 0=Normal, 1=Above Normal, 2=High, and 15=Time Critical.

Get Thread Priority Operation

Figure 52:
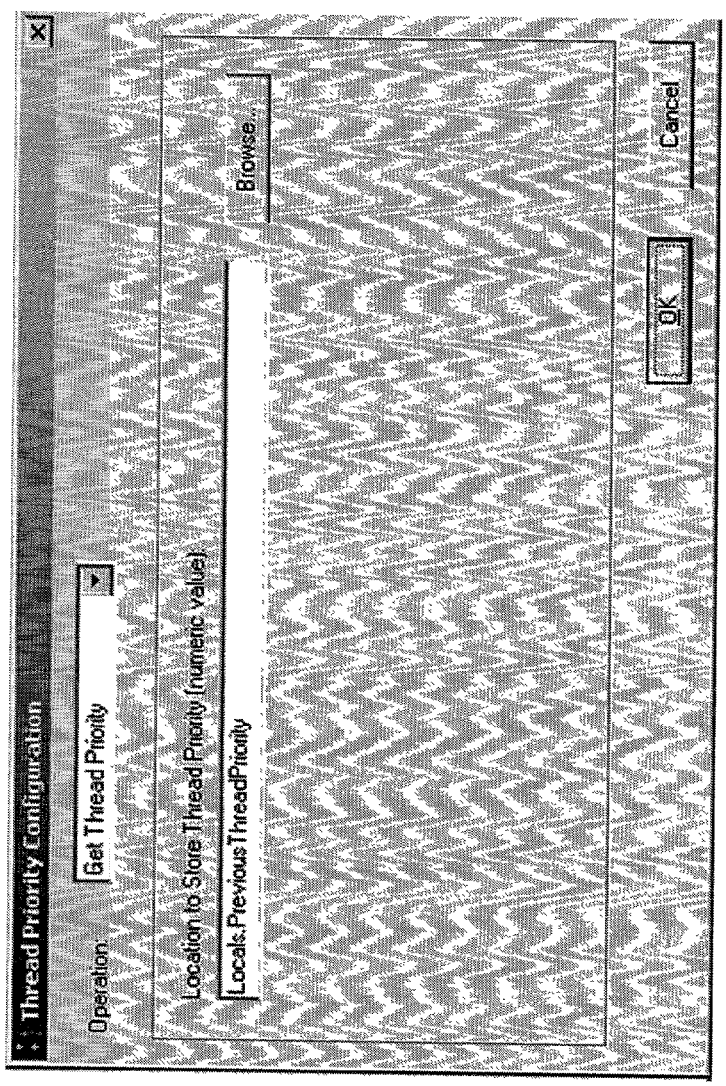

The Get Thread Priority operation, may be used to get the current priority setting for the current thread. FIG. 52 illustrates an exemplary dialog box for configuring a Thread Priority step, in which a "Get Thread Priority" option has been selected for the operation. The following GUI controls enable the user to configure the Get Thread Priority operation:

Location to Store Thread Priority—This control may be used to specify a location to store a numeric value specifying the priority setting for the current thread. When the user sets the thread priority for a sequence, the user may save the previous priority in the Setup step group and restore the priority in the Cleanup step group.

Thread Priority Step Properties

Figure 53:
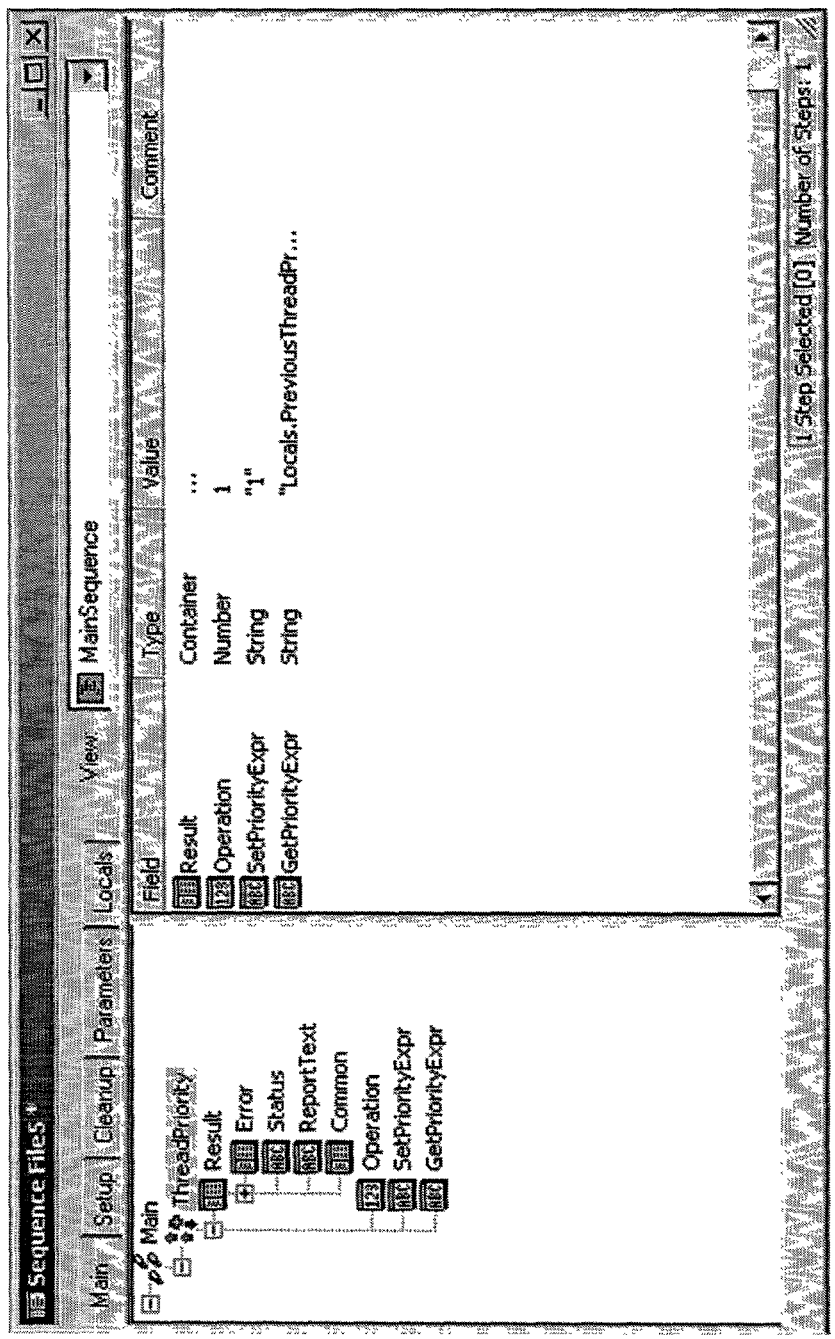

The Thread Priority step type may define various Thread Priority step properties in addition to the common custom properties. For example, FIG. 53 illustrates the following Thread Priority step properties:

Step.Operation contains a value that specifies the operation the step is set to perform. In one embodiment, the valid values are 0=Set Thread Priority, 1=Get Thread Priority.

Step.SetPriorityExpr specifies the thread priority expression for the Set Thread Priority operation.

Step.GetPriorityExpr specifies the location to store the thread priority for the Get Thread Priority operation.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for configuring a computer program to perform a synchronization object operation, the method comprising:

displaying a graphical user interface, wherein the graphical user interface is useable to specify a plurality of synchronization object operations for a first type of synchronization object, wherein the first type of synchronization object is operable to synchronize execution of multiple threads;

receiving user input via the graphical user interface to specify a first synchronization object operation of the plurality of synchronization object operations, wherein the user input is received to the graphical user interface before the program is executed;

automatically configuring the program to perform the first synchronization object operation specified by the user input; and executing the program after automatically configuring the program, wherein executing the program comprises performing the first synchronization object operation.

2. The method of claim 1, further comprising:

receiving user input indicating a desire to specify at least one of the plurality of synchronization object operations;

wherein said displaying the graphical user interface comprises displaying the graphical user interface in response to the user input indicating the desire to specify at least one of the plurality of synchronization object operations.

3. The method of claim 1, wherein the first synchronization object operation is performed in order to synchronize execution of multiple threads executing in the program.

4. The method of claim 1, wherein said automatically configuring the program to perform the first synchronization object operation comprises automatically configuring the program to reference executable program instructions for performing the first synchronization object operation.

5. The method of claim 1, wherein said automatically configuring the program to perform the first synchronization object operation comprises automatically including source code in the program, wherein the source code is operable to perform the first synchronization object operation.

6. The method of claim 1, wherein the first synchronization object operation comprises a "create" operation for creating a synchronization object of the first type;

wherein said automatically configuring the program to perform the first synchronization object operation comprises automatically configuring the program to create a synchronization object of the first type.

7. The method of claim 1, wherein the first synchronization object operation comprises one of: a "lock" operation for locking a first synchronization object of the first type; an "unlock" operation for unlocking a first synchronization object of the first type; or a "get status" operation for getting status information for a first synchronization object of the first type;

wherein the user input specifying the first synchronization object operation comprises user input identifying the first synchronization object on which to perform the first synchronization object operation.

8. The method of claim 1, wherein the first type of synchronization object comprises one of the following synchronization object types:

a mutex synchronization object;

a semaphore synchronization object;

a rendezvous synchronization object;

a queue synchronization object;

a notification synchronization object; or a batch synchronization object.

9. The method of claim 1, further comprising:

receiving user input via the graphical user interface to specify configuration information for the first synchronization object operation;

wherein said automatically configuring the program to perform the first synchronization object operation comprises automatically configuring the program to perform the first synchronization object operation in accordance with the configuration information.

10. The method of claim 9, wherein the configuration information comprises information of one or more of the following types:

a name of a synchronization object on which to perform the first synchronization object operation;

a timeout value for the first synchronization object operation.

11. A computer-readable memory medium comprising program instructions for configuring a computer program to perform a synchronization object operation, wherein the program instructions are executable to:

display a graphical user interface, wherein the graphical user interface is useable to specify a plurality of synchronization object operations for a first type of synchronization object, wherein the first type of synchronization object is operable to synchronize execution of multiple threads;

receive user input via the graphical user interface to specify a first synchronization object operation of the plurality of synchronization object operations, wherein the user input is received to the graphical user interface before the program is executed; and automatically configure the program to perform the first synchronization object operation specified by the user input.

12. The memory medium of claim 11, further comprising program instructions executable to:

receive user input indicating a desire to specify at least one of the plurality of synchronization object operations;

wherein said displaying the graphical user interface comprises displaying the graphical user interface in response to the user input indicating the desire to specify at least one of the plurality of synchronization object operations.

13. The memory medium of claim 11, wherein said automatically configuring the program to perform the first synchronization object operation comprises automatically configuring the program to reference executable program instructions for performing the first synchronization object operation.

14. The memory medium of claim 11, wherein said automatically configuring the program to perform the first synchronization object operation comprises automatically including source code in the program, wherein the source code is operable to perform the first synchronization object operation.

15. The memory medium of claim 11, wherein the first type of synchronization object comprises one of the following synchronization object types:

a mutex synchronization object;

a semaphore synchronization object;

a rendezvous synchronization object;

a queue synchronization object;

a notification synchronization object; or a batch synchronization object.

16. A system for configuring a computer program to perform a synchronization object operation, the system comprising:

a processor;

a memory storing program instructions;

a display;

wherein the processor is operable to execute the program instructions to:
  display on the display a graphical user interface, wherein the graphical user interface is useable to specify a plurality of synchronization object operations for a first type of synchronization object, wherein the first type of synchronization object is operable to synchronize execution of multiple threads;
  receive user input via the graphical user interface to specify a first synchronization object operation of the plurality of synchronization object operations wherein the user input is received to the graphical user interface before the program is executed; and
  automatically configure the program to perform the first synchronization object operation specified by the user input.

17. The system of claim 16, wherein the processor is further operable to execute the program instructions to:
  receive user input indicating a desire to specify at least one of the plurality of synchronization object operations;
  wherein said displaying the graphical user interface comprises displaying the graphical user interface in response to the user input indicating the desire to specify at least one of the plurality of synchronization object operations.

18. The system of claim 16,
  wherein said automatically configuring the program to perform the first synchronization object operation comprises automatically configuring the program to reference executable program instructions for performing the first synchronization object operation.

19. The system of claim 16,
  wherein said automatically configuring the program to perform the first synchronization object operation comprises automatically including source code in the program, wherein the source code is operable to perform the first synchronization object operation.

20. The system of claim 16, wherein the first type of synchronization object comprises one of the following synchronization object types:
  a mutex synchronization object;
  a semaphore synchronization object;
  a rendezvous synchronization object;
  a queue synchronization object;
  a notification synchronization object; or
  a batch synchronization object.

21. A computer-implemented method for creating a program in a computer system, wherein the program includes a first thread and a second thread, the method comprising:
  receiving user input indicating a desire to specify a synchronization object operation to synchronize execution of the first thread and the second thread;
  displaying a graphical user interface in response to the user input indicating the desire to specify the synchronization object operation, wherein the graphical, user interface is useable to specify a plurality of synchronization object operations;.
  receiving user input via the graphical user interface to specify a first synchronization object operation of the plurality of synchronization object operations, wherein the first synchronization object operation is operable to synchronize execution of the first thread and the second thread in the program, wherein the user input is received to the graphical user interface before the program is executed; and
  automatically configuring the program to perform the first synchronization object operation specified by the user input.

22. The method of claim 21,
  wherein said automatically configuring the program to perform the first synchronization object operation comprises automatically including source code in the program, wherein the source code is operable to perform the first synchronization object operation.

23. A memory medium comprising program instructions for configuring a computer program to perform a mutex operation, wherein the program instructions are executable to:
  display a graphical user interface, wherein the graphical user interface is useable to specify a plurality of mutex operations;
  receive user input via the graphical user interface to specify a first mutex operation of the plurality of mutex operations, wherein the user input is received to the graphical user interface before the program is executed; and
  automatically configure the program to perform the first mutex operation specified by the user input.

24. The memory medium of claim 23, wherein the first mutex operation comprises one or more of the following operations:
  a create operation for creating a new mutex;
  a lock operation for locking a mutex;
  an unlock operation for unlocking a mutex;
  a get status operation for obtaining information regarding a mutex.

25. The method of claim 23,
  wherein said automatically configuring the program to perform the first mutex operation comprises automatically including source code in the program, wherein the source code is operable to perform the first mutex operation.

26. A memory medium comprising program instructions for configuring a computer program to perform a semaphore operation, wherein the program instructions are executable to:
  display a graphical user interface, wherein the graphical user interface is useable to specify a plurality of semaphore operations;
  receive user input via the graphical user interface to specify a first semaphore operation of the plurality of semaphore operations, wherein the user input is received to the graphical user interface before the program is executed; and
  automatically configure the program to perform the first semaphore operation specified by the user input.

27. The method of claim 26,
  wherein said automatically configuring the program to perform the first semaphore operation comprises automatically including source code in the program, wherein the source code is operable to perform the first semaphore operation.

* * * * *